United States Patent
Tomono et al.

(10) Patent No.: US 9,619,235 B2
(45) Date of Patent: Apr. 11, 2017

(54) COMPRESSING DETECTED CURRENT AND PRECEDING INSTRUCTIONS WITH THE SAME OPERATION CODE AND OPERAND PATTERNS

(75) Inventors: Mitsuru Tomono, Kawasaki (JP); Hiroya Uehara, Yokohama (JP); Makiko Ito, Kawasaki (JP)

(73) Assignees: FUJITSU LIMITED, Kawasaki (JP); FUJITSU SEMICONDUCTOR LIMITED, Yokohama (JP)

( * ) Notice: Subject to any disclaimer, the term of this patent is extended or adjusted under 35 U.S.C. 154(b) by 1091 days.

(21) Appl. No.: 13/481,221

(22) Filed: May 25, 2012

(65) Prior Publication Data

US 2012/0311304 A1  Dec. 6, 2012

(30) Foreign Application Priority Data

Jun. 1, 2011   (JP) .................................. 2011-123851

(51) Int. Cl.
   *G06F 9/30*   (2006.01)
   *G06F 9/38*   (2006.01)

(52) U.S. Cl.
   CPC ...... *G06F 9/30178* (2013.01); *G06F 9/30145* (2013.01); *G06F 9/3816* (2013.01)

(58) Field of Classification Search
   CPC ............. G06F 9/30145; G06F 9/30152; G06F 9/30156; G06F 9/30178; G06F 9/3822
   See application file for complete search history.

(56) References Cited

U.S. PATENT DOCUMENTS

| | | |
|---|---|---|
| 2003/0033504 A1 | 2/2003 | Yamada et al. |
| 2004/0059892 A1 | 3/2004 | Paolucci |
| 2009/0024840 A1* | 1/2009 | Kazuma .................. 712/226 |

FOREIGN PATENT DOCUMENTS

| | | |
|---|---|---|
| JP | 07-182169 A | 7/1995 |
| JP | 2001-142696 A | 5/2001 |

(Continued)

OTHER PUBLICATIONS

K Geetha N.Ammasai Gounden. "Compressed Instruction Set Coding (CISC) for Performance Optimization of Hand Held Devices" ADCOM 2008.*

(Continued)

*Primary Examiner* — Jacob A Petranek
(74) *Attorney, Agent, or Firm* — Arent Fox LLP

(57) ABSTRACT

A processor accesses memory storing a compressed instruction sequence that includes compression information indicating that an instruction that with respect to the preceding instruction, has identical operation code and operand continuity is compressed. The processor includes a fetcher that fetches a bit string from the memory and determines whether the bit string is a non-compressed instruction, where if so, transfers the given bit string and if not, transfers the compression information; and a decoder that upon receiving the non-compressed instruction, holds in a buffer, instruction code and an operand pattern of the non-compressed instruction and executes processing to set to an initial value, the value of an instruction counter that indicates a count of consecutive instructions having identical operation code and operand continuity, and upon receiving the compression information, restores the instruction code based on the instruction code held in the buffer, the instruction counter value, and the operand pattern.

12 Claims, 63 Drawing Sheets

(56) References Cited

FOREIGN PATENT DOCUMENTS

| | | |
|---|---|---|
| JP | 2003-050695 A | 2/2003 |
| JP | 2004-355477 A | 12/2004 |
| JP | 2006-500658 A | 1/2006 |
| JP | 2008-299475 A | 12/2008 |
| JP | 2009-026106 A | 2/2009 |

OTHER PUBLICATIONS

Kelvin Lin, Jean Jyh-Jiun Shann and Chung-Ping Chung. "Code Compression by Register Operand Dependency" Proceedings of the Sixth Annual Workshop on Interaction between Compilers and Computer Architectures (INTERACT'02) 2002 IEEE.*

Japanese Office Action issued Nov. 4, 2014; Application No. 2011-123851, with English Translation.

Japanese Office Action issued on Mar. 24, 2015; Japanese Application No. 2011-123851.

* cited by examiner

FIG.6

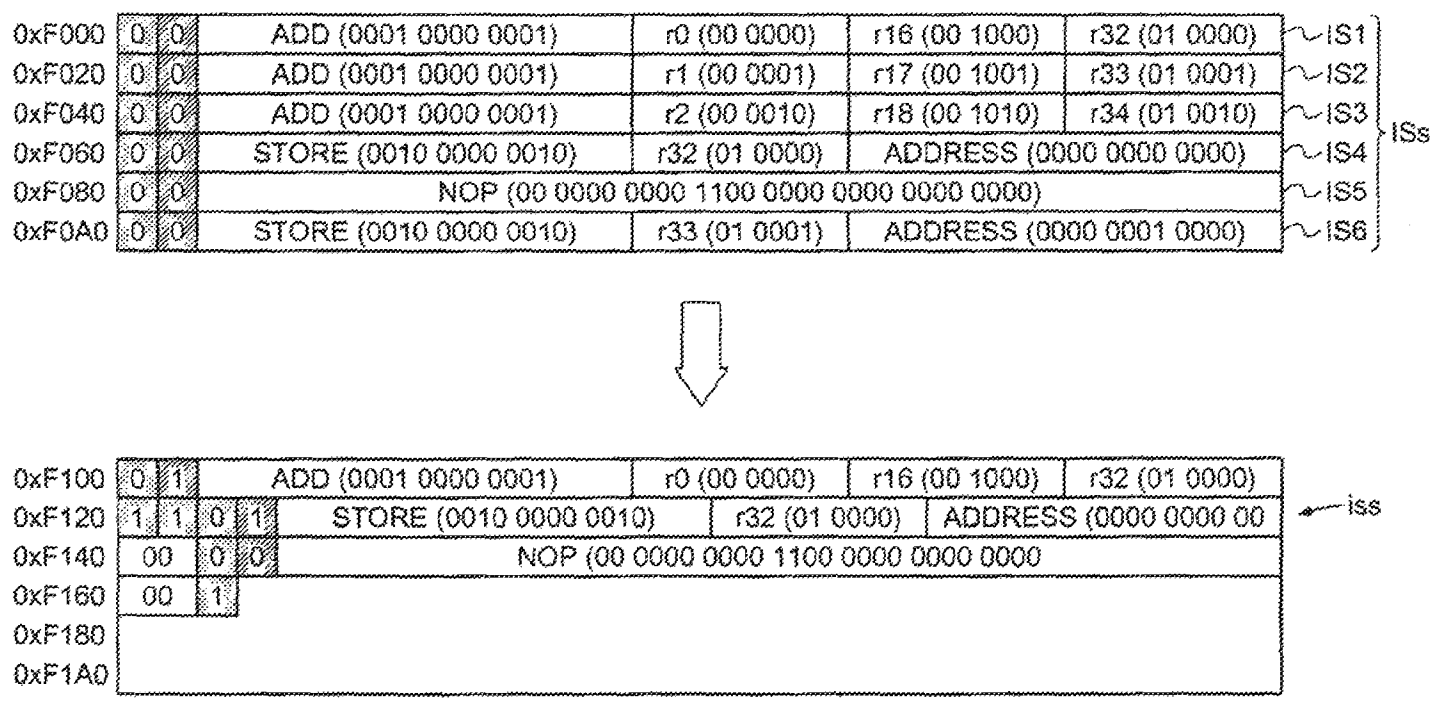

| | | | | | |
|---|---|---|---|---|---|
| 0xF000 | 0 | ADD (0001 0000 0001) | r0 (00 0000) | r16 (00 1000) | r32 (01 0000) ~IS1 |
| 0xF020 | 0 | ADD (0001 0000 0001) | r1 (00 0001) | r17 (00 1001) | r33 (01 0001) ~IS2 |
| 0xF040 | 0 | ADD (0001 0000 0001) | r2 (00 0010) | r18 (00 1010) | r34 (01 0010) ~IS3 ⎫ISs
| 0xF060 | 0 | STORE (0010 0000 0010) | r32 (01 0000) | ADDRESS (0000 0000 0000) | ~IS4 |
| 0xF080 | 0 | NOP (00 0000 0000 1100 0000 0000 0000 0000) | | | ~IS5 |
| 0xF0A0 | 0 | STORE (0010 0000 0010) | r33 (01 0001) | ADDRESS (0000 0001 0000) | ~IS6 |

⇒

| | | | | | |
|---|---|---|---|---|---|
| 0xF100 | 0 1 | ADD (0001 0000 0001) | r0 (00 0000) | r16 (00 1000) | r32 (01 0000) ~iss |
| 0xF120 | 1 1 0 1 | STORE (0010 0000 0010) | r32 (01 0000) | ADDRESS (0000 0000 0000) | |
| 0xF140 | 00 0 0 | NOP (00 0000 0000 1100 0000 0000 0000 0000) | | | |
| 0xF160 | 00 1 | | | | |
| 0xF180 | | | | | |
| 0xF1A0 | | | | | |

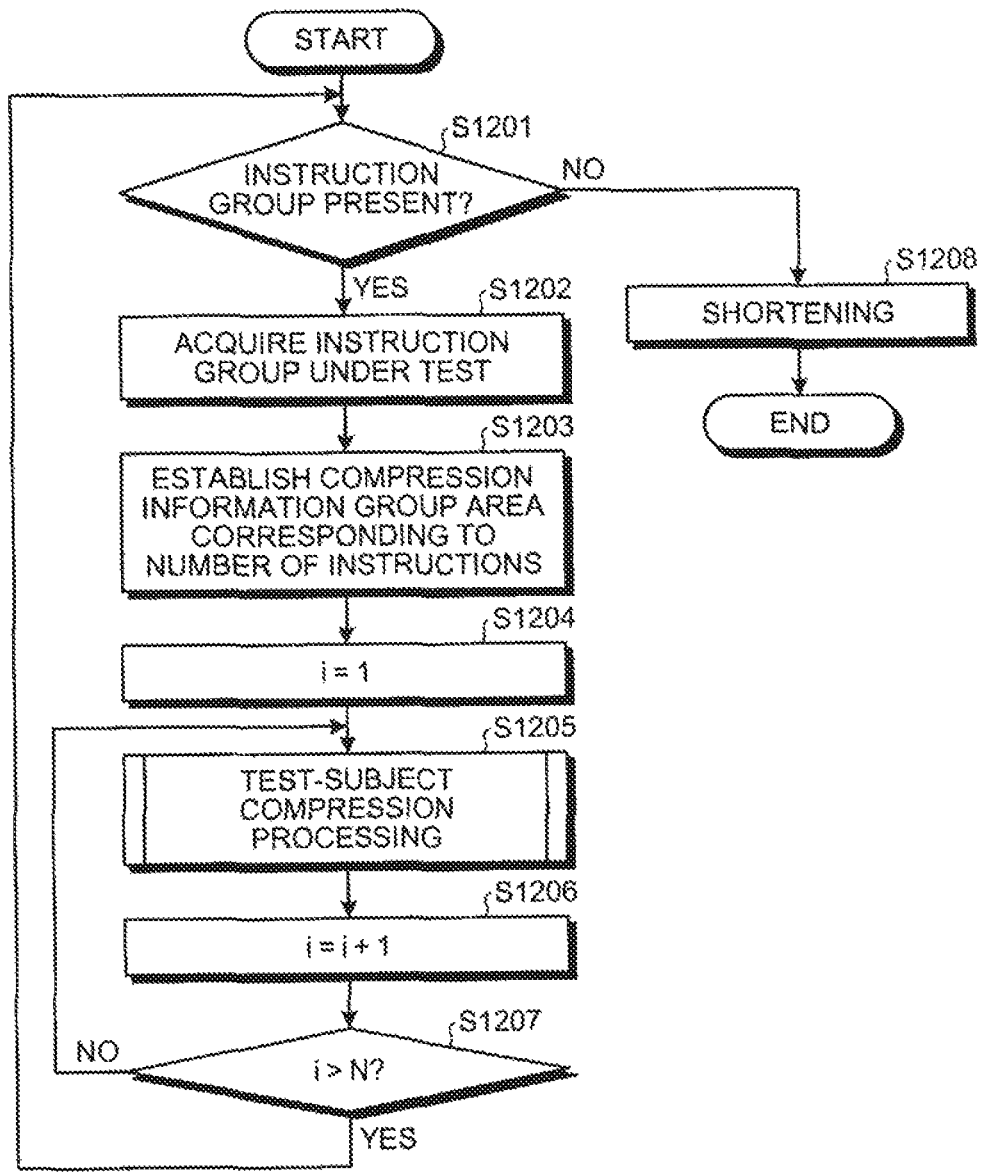

FIG.22

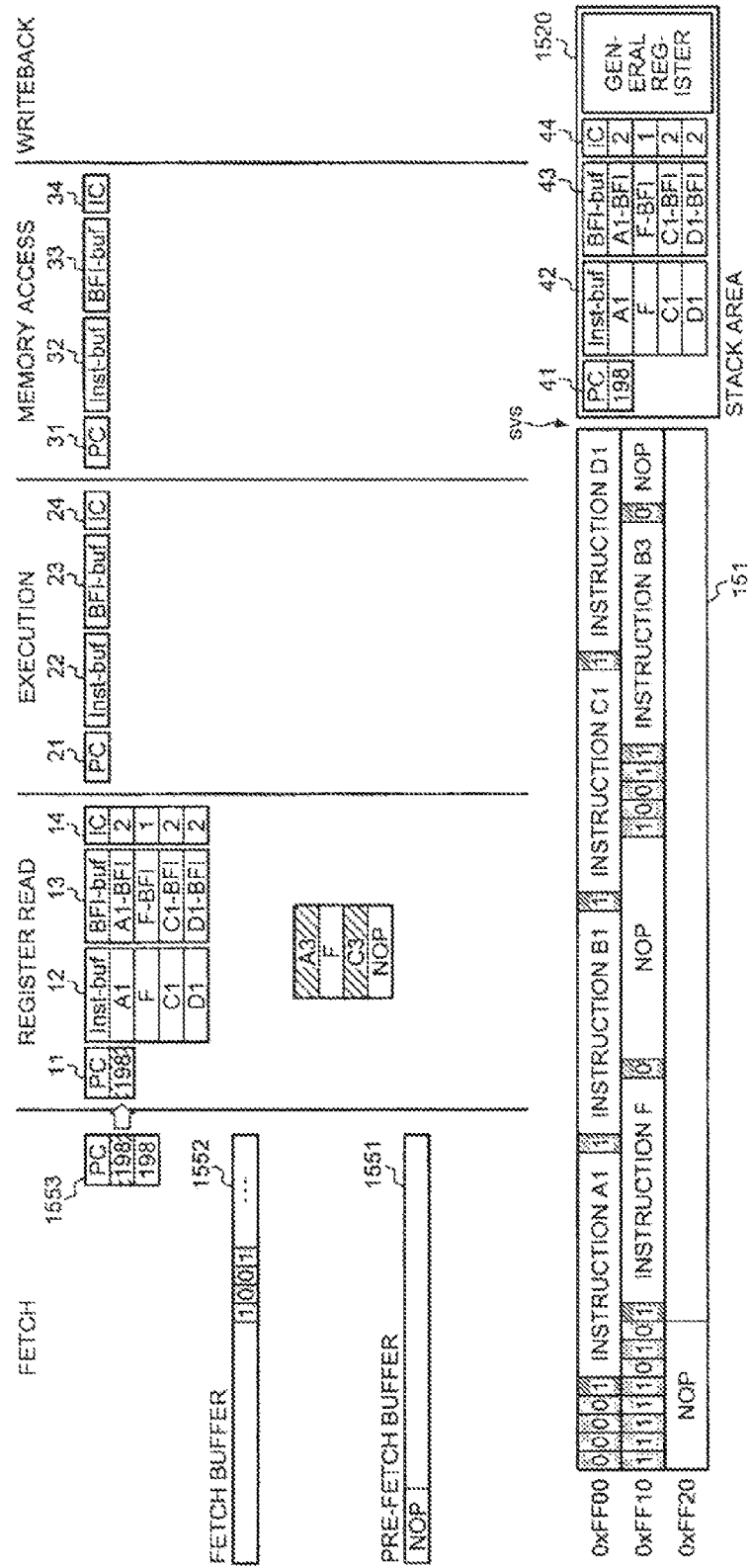

COMPRESSING DETECTED CURRENT AND PRECEDING INSTRUCTIONS WITH THE SAME OPERATION CODE AND OPERAND PATTERNS

CROSS REFERENCE TO RELATED APPLICATIONS

This application is based upon and claims the benefit of priority of the prior Japanese Patent Application No. 2011-123851, filed on Jun. 1, 2011, the entire contents of which are incorporated herein by reference.

FIELD

The embodiments discussed herein are related to a processor that executes an instruction, a processor that compresses an instruction, a computer product, a compression apparatus, and a compression method.

BACKGROUND

Conventionally, technologies have been disclosed that upon a compression determination instruction, issue an exclusive instruction to transition to a compression mode, and perform transition to a compression mode and a non-compression mode (see, for example, Japanese Laid-Open Patent Publication Nos. 2001-142696 and 2003-050696). During the compression mode, these technologies use a memory address that is different from that of the instruction memory (called a dictionary address, which is stored in compressed instruction code), refer to the dictionary memory, and restore an instruction.

Further, technology has been disclosed that stores a portion of the previous operation code and a portion of the operand, and by compensating deficient portions of compressed code by the stored code, restore the compressed code (see, for example, Japanese Laid-Open Patent Publication No. 2004-355477). This technology, for example, when the size of the instruction code is 32 bits, compresses the code to 16 bits.

Technology that compresses and curtails frequent no operation instructions in Very Long Instruction Words (VLIWs) and thereby reduces the instruction code size has been disclosed (for example, Japanese Laid-Open Patent Publication No. H7-182169).

Nonetheless, with the technologies according to Japanese Laid-Open Patent Publication Nos. 2001-142696 and 2003-050696, since the memory that is called dictionary memory, which is also different from the instruction memory, is used, a problem arises in that the number of memory accesses increases by the number of accesses to the dictionary memory and power consumption increases.

With the technology according to Japanese Laid-Open Patent Publication No. 2004-355477, since a portion of the preceding instruction code has to be stored for each instruction code, a problem arises in that compression efficiency is low. Further, with the technology according to Japanese Laid-Open Patent Publication No. H7-182169, only no operation instructions can be compressed. Thus, the instruction code compression efficiency is low and a problem arises in that curtailing of the memory access frequency is not sufficient as compared to before compression.

SUMMARY

According to an aspect of an embodiment, a processor has access to a memory storing therein a compressed instruction sequence that includes compression information indicating that an instruction having operation code identical to that of the preceding instruction and having operand continuity with the preceding instruction has been compressed. The processor includes a fetcher that fetches a given bit string from the memory and determines whether the given bit string is a non-compressed instruction, where upon determining the given bit string to be a non-compressed instruction, further transfers the given bit string and upon determining the given bit string to not be a non-compressed instruction, further transfers the compression information located at the head of the given bit string; and a decoder that upon receiving the non-compressed instruction transferred thereto from the fetcher, holds in a buffer, instruction code and an operand pattern of the non-compressed instruction and executes setting processing of setting to an initial value, the value of an instruction counter that indicates a consecutive count of consecutive instructions having identical operation code and operands with regularity, and upon receiving the compression information transferred thereto from the fetcher, restores the instruction code based on the instruction code held in the buffer, the value of the instruction counter, and the operand pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram depicting an example of compression processing according to the first example.

FIGS. 11A, 11B, and 11C depict an example of compression processing according to the second example.

FIG. 12 is a flowchart depicting an example of a procedure of compression processing by the compression apparatus according to the second example.

FIGS. 20 to 36 are diagrams of an example of pipeline processing according to a third embodiment.

FIGS. 56 to 64 are diagrams of an example of recovery processing for recovery from an interrupt.

DESCRIPTION OF EMBODIMENTS

Preferred embodiments of the present invention will be explained with reference to the accompanying drawings.

Figure 1:
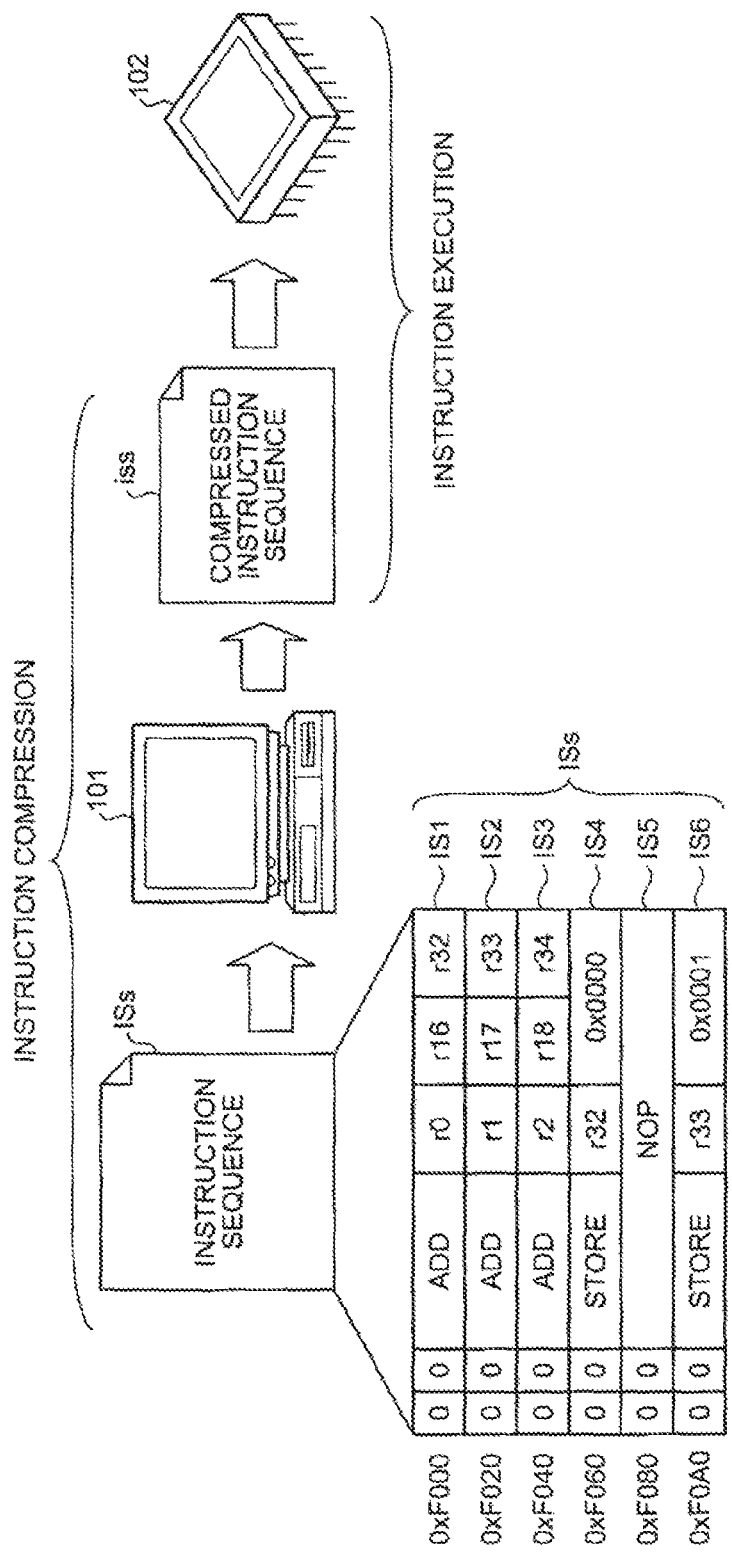
FIG. 1 is a diagram depicting the flow of instruction compression and instruction execution.

FIG. 1 is a diagram depicting the flow of instruction compression and instruction execution. In the present embodiment, instruction sequences are compressed by a compression program installed on a computer. An instruction sequence is a set of consecutive instructions, for example, stored in order of address in a storage device. In FIG. 1, as an example, instructions IS1 to IS6 are regarded as an instruction sequence. For the sake of convenience, herein an instruction in an instruction sequence is indicated as an "instruction IS".

Figure 2:
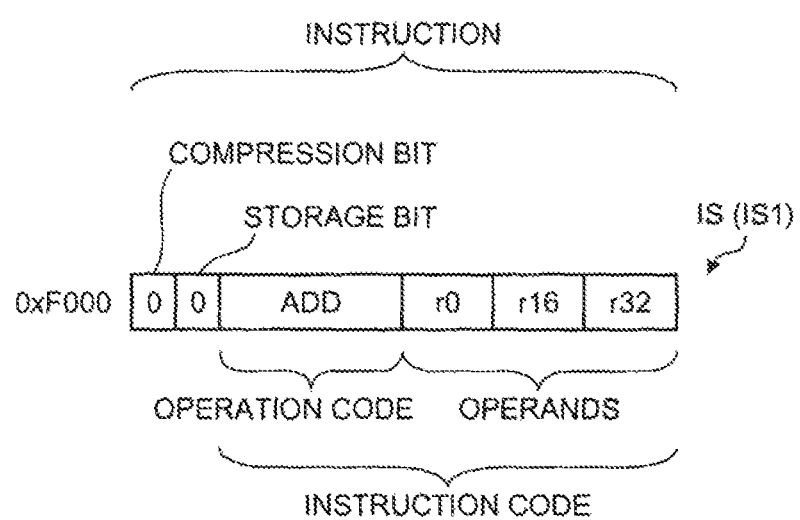
FIG. 2 is a diagram of the structure of an instruction IS.

FIG. 2 is a diagram of the structure of an instruction IS. In FIG. 2, instruction IS1 is taken as an example. An instruction IS is information where a compression bit and a storage bit are appended to operation code and operands. As an example, the instruction width is assumed to be 32 bits.

The compression bit is compression information that indicates whether the instruction IS is to be compressed. For example, when the compression bit is "1", compression is indicated and when the compression bit is "0", no-compression is indicated. Before compression, the compression bit is assumed to indicate no-compression ("0"). The storage bit is storage information that indicates whether the instruction IS to be stored as a restoration source instruction. For example, when the storage bit is "1", storage is indicated and when the storage bit is "0", no-storage is indicated. Before compression, the storage bit is assumed to indicate no-storage ("0").

In FIG. 1, a compression apparatus 101 is a computer on which a compression program is installed. The compression apparatus 101 compresses instruction sequences ISs. The compression apparatus 101 performs compression, when 2 instructions having consecutive addresses further have the same operation code and operands that have continuity. For example, both operation codes among the consecutive instructions IS1, IS2 are ADD and the operands increase by 1. Consequently, instruction IS2 is compressed.

Similarly, the instruction IS3 is also compressed. Compression between the instructions IS3 and IS4; the instructions IS4 and IS5; and the instructions IS5 and IS6 is not performed. Further, with regard to the instruction IS6, instruction IS5 is disregarded and consequent to the relation with the instruction IS4, compression is performed. Details of the compression are described hereinafter.

Furthermore, an instruction group that has been compressed by the compression apparatus 101 is referred to as a compressed instruction group iss. A compressed instruction group iss includes both (non-compressed) instructions that are restoration sources and compressed instructions that can be restored by referring to a restoration source instruction. A processor 102, by fetching a compressed instruction group iss, restores the compressed instructions and executes the instructions. Details of the execution will be described hereinafter. The processor 102 may be a central processing unit (CPU) in the compression apparatus 101 or may be a CPU of a computer different from the compression apparatus 101. The processor 102 may further be a digital signal processor (DSP).

A first embodiment will be described. In the first embodiment, the instruction compression depicted in FIG. 1 will be described.

Figure 3:
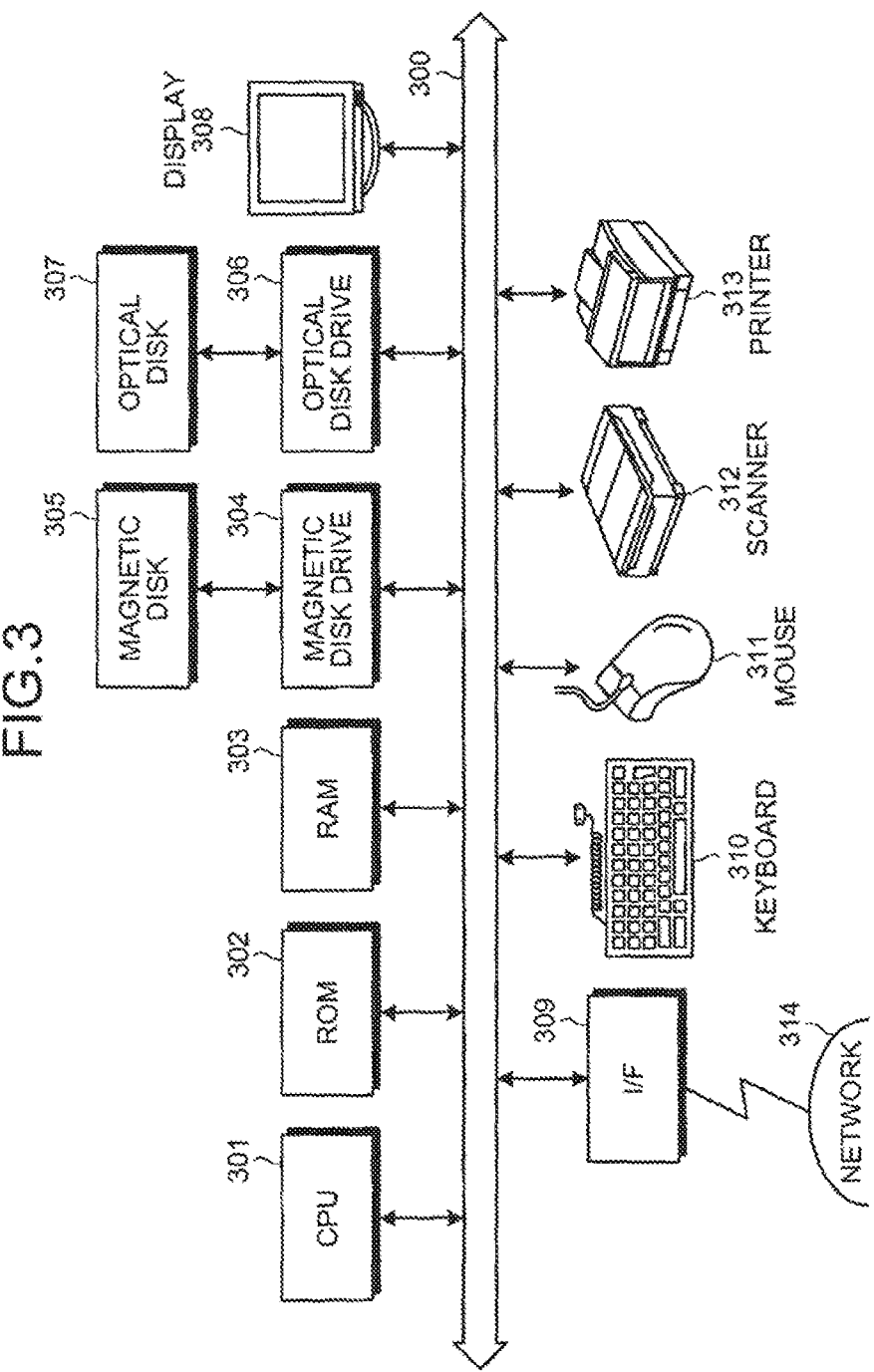
FIG. 3 is a block diagram of a hardware configuration of a compression apparatus according to a first embodiment.

FIG. 3 is a block diagram of a hardware configuration of the compression apparatus 101 according to the first embodiment. As depicted in FIG. 3, the compression apparatus 101 includes a CPU 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, a mouse 311, a scanner 312, and a printer 313, respectively connected by a bus 300.

The CPU 301 governs overall control of the compression apparatus 101. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The display 308 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The scanner 312 optically reads an image and takes in the image data into the compression apparatus 101. The scanner 312 may have an optical character reader (OCR) function as well. The printer 313 prints image data and text data. The printer 313 may be, for example, a laser Printer or an ink jet printer.

Instructions include regular instructions and instruction groups that include multiple instructions such as a VLIW. In a first example, a case will be described where an instruction sequence that is subsequent to a regular instruction is compressed. In a second example, a case will be described where a sequence of instruction groups subsequent to an instruction group that includes multiple instructions, is compressed.

Figure 4:
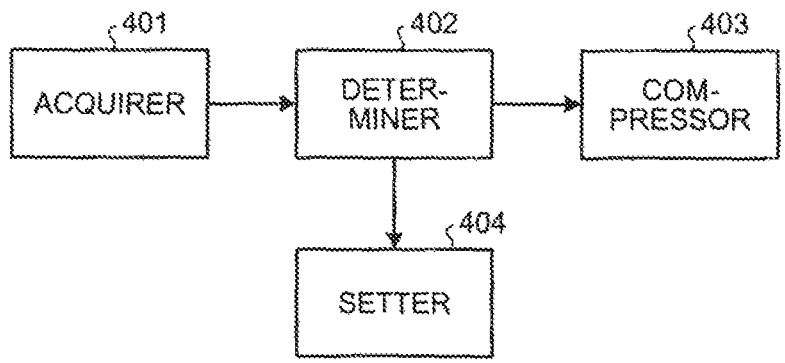
FIG. 4 is a block diagram depicting an example of a functional configuration of the compression apparatus according to a first example.

FIG. 4 is a block diagram depicting an example of a functional configuration of the compression apparatus 101 according to the first example. The compression apparatus 101 includes an acquirer 401, a determiner 402; a compressor 403, and a setter 404. These functions (the acquirer 401 to the setter 404) forming a controller, for example, are realized by executing on the CPU 301, a program stored in a storage device such as the ROM 302, the RAM 303, the magnetic disk 305, and the optical disk 307 depicted in FIG. 3, or by the I/F 309.

The acquirer 401 acquires a given instruction as a test subject from among an instruction sequence. For example, the acquirer 401 reads in an instruction sequence such as that in FIG. 1, sequentially according to address, one instruction at a time. For example, beginning with the instruction IS1 at the head address 0xF000, the acquirer 401 acquires the instructions in the sequence of IS1, IS2, IS3, IS4, IS5, IS6.

The determiner 402 determines whether the operation code of the test subject acquired by the acquirer 401 and the operation code of the instruction preceding the test subject are identical; and determines whether operands of the test subject and operands of the preceding instruction have continuity. The test subject is the instruction IS read in at the current reading. The preceding instruction is the instruction IS that was read in at the reading immediately preceding the current reading. For example, if the test subject is the instruction IS2, the preceding instruction is the instruction IS1. When the test subject is the instruction IS1, there is no preceding instruction. Continuity among operands is a state in which like operands vary in a regular manner.

An operand pattern is embedded in the operation code. The operand pattern indicates the operand structure and includes the operand type, the operand count, and the starting position of the head operand. For example, in the case of the instruction IS1, the operand type is register and the operand count is 3. Further, assuming that operation code is 12 bits, the starting position of the head operand is the 15th bit from the head of the instruction IS1. This operand pattern, for example, is assumed to be embedded in the upper bit string of the operation code.

At the determiner 402, when the operand patterns of the test subject and of the preceding instruction are identical and the operand values are consecutive, continuity is determined. When the operand patterns of the test subject and of the preceding instruction are not identical, non-continuity is determined without checking the operand values.

For example, in the case of the instructions IS1, IS2, the operands of the instruction IS1 are r0, r16 and r32; and the operands of the instruction IS2 are r1, r17 and r33. Thus, since the register addresses increase by 1 between the instructions IS1 and IS2, the operands have continuity. "+1" indicating the increase by 1 is stored in a continuity buffer. Similarly, between the instructions IS2 and IS3, and the instructions IS1 and IS2, the register addresses increase by 1 and the continuity buffer values match. Therefore, the successive operands have continuity. When there is no continuity, the continuity buffer is initialized.

In this manner, when the register numbers and memory addresses vary with continuity, there is continuity among operands. In the example depicted in FIG. 1, for the instructions IS1 to IS3, the operation codes are determined to be identical and continuity among the operands is determined.

When the storage bit of the test subject instruction IS is "0" (no-storage), the continuity buffer is maintained as is. For example, the instruction IS5 subsequent to the instruction IS4 is no operation instruction (NOP) and as described hereinafter, the storage bit of the instruction IS5 is set as "0". In this case, when the instruction IS6 is restored by the processor 102, since the storage bit of the instruction IS5 is "0" and is not restored, by further tracing back to the instruction IS4, it is determined whether the operation codes of the instructions IS4 and IS6 are identical and whether the operands have continuity.

Operand continuity is not limited to regular increases of the register numbers and addresses, etc., and may be increments by a variable as well as decrements. If the magnitude of increase/decrease is the same for each instruction, the magnitude of increase/decrease need not be 1. Further, if the register numbers are the same, continuity is determined because, for example, in the case of values set to specify an instruction operation, the same register (register number) may be specified. In this case, the magnitude of increase/decrease is 0. In the case of immediate value as well, if the magnitude of increase/decrease is the same, continuity is determined. Further, when changes are by a constant rule (for example, corresponds to expressions depicted in FIG. 16), continuity is determined. Additionally, when immediate values are the same value, continuity is determined.

When identicalness and continuity are not determined, the determiner 402, based on the operation code type of the test subject, may determine whether the test subject is an instruction that is to be stored as a restoration source instruction. Among the instructions are system instructions without operands like HALT, RET, RFE, EXTW, and NOP. Such system instructions are not used as restoration sources for compressed instructions.

Figure 5:
FIG. 5 is a diagram of an example of a storage determining table T.

FIG. 5 is a diagram of an example of a storage determining table T. As depicted in FIG. 5, the storage determining table T includes a storage flag for each operation code. Thus, according to the operation code of the test subject, whether the test subject is to be stored as a restoration source instruction can be determined. For example, when the operation code of the instruction IS1 is ADD, the storage flag is "1" (storage) and consequently, it is determined that the test subject is to be stored as a restoration source instruction.

When the operation code of the test subject is HALT, the storage flag is "0" (no-storage) and consequently, it is determined that the test subject is not to be stored as a restoration source instruction. The storage determining table T is stored in a storage device such as the ROM 302, the RAM 303, the magnetic disk 305, and the optical disk 307 depicted in FIG. 3.

The compressor 403, when identicalness and continuity have been determined by the determiner 402, compresses the test subject. For example, the compressor 403, when identicalness and continuity have been determined by the determiner, appends to the test subject, compression information indicating that the test subject is to be compressed, and deletes the instruction code in the test subject. For example, in the case of compression, the compressor 403 sets the compression bit of the test subject to "1" (compression), making the test subject a compressed instruction. In other words, in the case of compression, the storage bit and the instruction code are completely deleted, leaving only the compression bit. As a result, for example, an instruction of a given bit width (e.g., 32 bits, 64 bits, 128 bits, etc.) can be compressed to 1 bit:

The setter 404, when non-identicalness and non-continuity have been determined by the determiner 402, sets for the test subject, compression information indicating that the test subject is not to be compressed and storage information indicating that the test subject is to be stored as an instruction not subject to compression. For example, when non-identicalness and non-continuity have been determined by the determiner 402, the setter 404 sets the test subject to not be subject to compression. Therefore, the setter 404 sets the compression bit of the test subject to "0" (no-compression). Further, since the test subject is not to be compressed, the setter 404 sets the storage bit of the test subject to "1" (storage). As a result, when the subsequent instruction is compressed, the non-compressed test subject becomes the restoration source of the subsequent instruction.

Further, when non-identicalness and non-continuity have been determined by the determiner 402 and storage has been determined by the determiner 402, the setter 404 sets, for test subject, compression information indicating that the test subject is not to be compressed and further sets storage information indicating that the test subject is to be stored as a restoration source instruction. For example, the setter 404 sets the compression bit of the test subject to "0" (no-compression) and further sets the storage bit of the test subject to "1" (storage). Consequently, when the subsequent instruction is compressed, the non-compressed test subject becomes the restoration source of the subsequent instruction.

On the other hand, when non-identicalness, non-continuity, and no-storage are determined by the determiner 402, the setter 404 sets for the test subject, information indicating that the test subject is not to be compressed and further sets information indicating that the test subject is not to be stored as a restoration source instruction. For example, the setter 404 sets the compression bit of the test subject to "0" (no-compression) and sets the storage bit of the test subject to "0" (no-storage), whereby the non-compressed test subject does not become a restoration source of the subsequent instruction.

FIG. 6 is a diagram depicting an example of compression processing according to the first example. FIG. 5 depicts an example of compression of the instruction group depicted in FIG. 1. The compression apparatus 101 reads in the instruction IS1 of address 0xF000. Since there is no instruction preceding the instruction IS1, the compression bit of the instruction IS1 is "0" (no-compression). Further, since the operation code of the instruction IS1 is ADD, the storage bit of the instruction IS1 is "1" (storage). Thus, for the instruction IS1, after compression, the storage bit changes from "0" to "1".

The instruction IS2 has the same operation code as the preceding instruction IS1 and operand continuity. Consequently, the compression bit becomes "1" and all else is deleted. The instruction IS3 has the same operation code as the preceding instruction IS2 and operand continuity. Consequently, the compression bit becomes "1" and all else is deleted.

The instruction IS4 does not have the same operation code as the preceding instruction IS3. Consequently, the compression bit is set to "0". Further, the operation code of the instruction IS4 is STORE and thus, the instruction IS4 is to be stored as a restoration source instruction. Therefore, the storage bit is set to "1". Hence, for the instruction IS4, after compression, the storage bit changes from "0" to "1".

The instruction IS5 does not have the same operation code as the preceding instruction IS4. Consequently, the compression bit is set to "0". Further, the instruction IS5 is a NOP instruction and thus, is not to be stored as a restoration source instruction. Therefore, the storage bit is set to "0". Thus, for the instruction IS5, after compression, the same command as before compression is stored.

The instruction IS6 does not have the same operation code as the preceding instruction IS5, but the storage bit of the preceding instruction IS5 is set to "0" and consequently, the instruction IS4 is regarded as the preceding instruction. In this case, the instruction IS6 has the same operation code as the preceding instruction IS4 and operand continuity. Consequently, the compression bit of the instruction IS6 becomes "1" and all else is deleted. In this manner, in the present embodiment, the more consecutive test subjects having the same operation code as the preceding instruction and operand continuity there are, the higher the compression efficiency is. In this case, the updated operand becomes 0x0001. However, depending on the data size and/or memory size handled by the instruction, the value of the instruction counter 14 may be multiplied by a coefficient by a decoder block (156).

Figure 7:
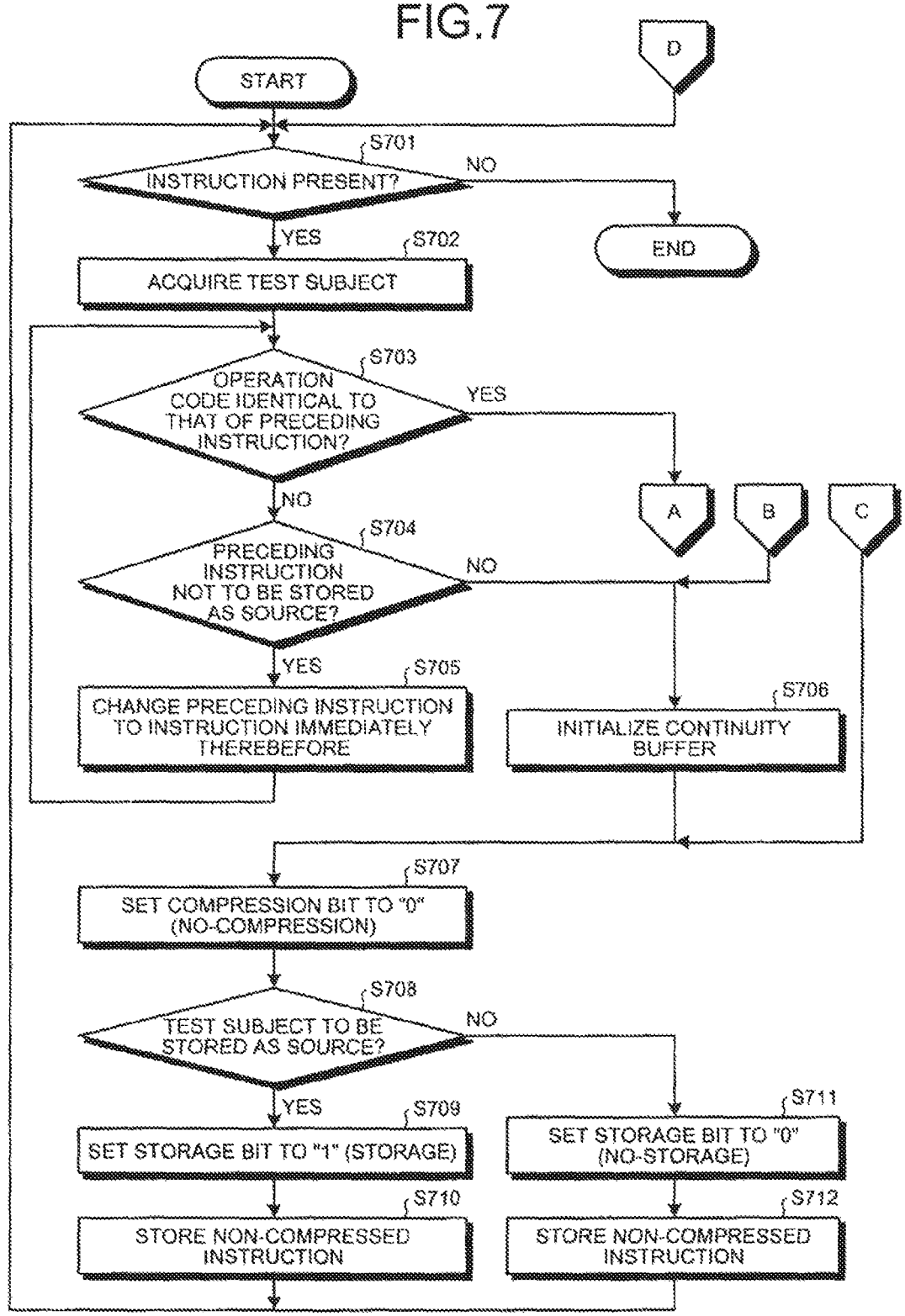
FIG. 7 is a first part of a flowchart depicting a procedure of compression processing by the compression apparatus according to the first example.

FIG. 7 is a first part of a flowchart depicting a procedure of compression processing by the compression apparatus 101 according to the first example. The compression apparatus 101 determines whether an instruction is present in an instruction group (step S701). If no instruction is present (step S701: NO), the compression processing ends. On the other hand, if an instruction is present (step S701: YES), the compression apparatus 101, via the acquirer 401, acquires a test subject (step S702) and via the determiner 402, determines whether the test subject has the same operation code as the preceding instruction (step S703). A case where the operation codes are identical (step S703: YES) is described with in FIG. 8.

If the operation codes are not identical (step S703: NO), the compression apparatus 101, via the determiner 402, refers to the storage bit of the preceding instruction and determines whether the preceding instruction is an instruction that is not to be stored as a restoration source instruction (step S704). If the preceding instruction is an instruction that is not to be stored as a restoration source instruction (step S704: YES), the preceding instruction is a system instruction without an operand. Accordingly, the operation codes of the test subject and of the instruction immediately before the preceding instruction (the preceding instruction when the preceding instruction of the current test subject was the test subject) may be identical and there may be operand continuity. Therefore, the compression apparatus 101, via the setter 404, changes the preceding instruction to the instruction immediately before the preceding instruction (step S705), and returns to step S703.

At step S705, for example, if the test subject is the instruction IS6 depicted in FIG. 6, the preceding instruction is the NOP instruction IS5. Since an NOP is not to be stored as a restoration source instruction, the instruction IS4, which was 1 instruction before the preceding instruction IS5 (NOP), is regarded as the preceding instruction.

If the preceding instruction is not an instruction that is not to be stored as a restoration source instruction (step S704: NO), i.e., is an instruction to be stored as a restoration source instruction, the compression apparatus 101, via the setter 404, initializes the continuity buffer (step S706), and sets the compression bit of the test subject to "0" (step S707).

The compression apparatus 101, via the determiner 402, determines whether the test subject is to be stored as a restoration source instruction (step S708). For example, in the storage determining table T, if the storage flag corresponding to the operation code of the test subject is "1", storage as a restoration source instruction is indicated; and if "0", such storage is not indicated.

If the test subject is to be stored as a restoration source instruction (step S708: YES), the compression apparatus 101, via the setter 404, sets the storage bit of the test subject to "1" (step S709). The compression apparatus 101 stores to a compression buffer, a non-compressed instruction having a compression bit of "0", a storage bit of "1", an operation code identical to that of the test subject and operands (step S710); and then, returns to step S701.

At step S708, if the test subject is not to be stored as a restoration source instruction (step S708: NO), the compression apparatus 101, via the setter 404, sets the storage bit of the test subject to "0" (step S711). The compression apparatus 101 stores to the compression buffer, a non-compressed instruction having a compression bit of "0", a storage bit of "0", an operation code that is identical to that of the test subject and operands (step S712). In other words, the compression apparatus 101 stores the test subject as is and returns to step S701.

Figure 8:
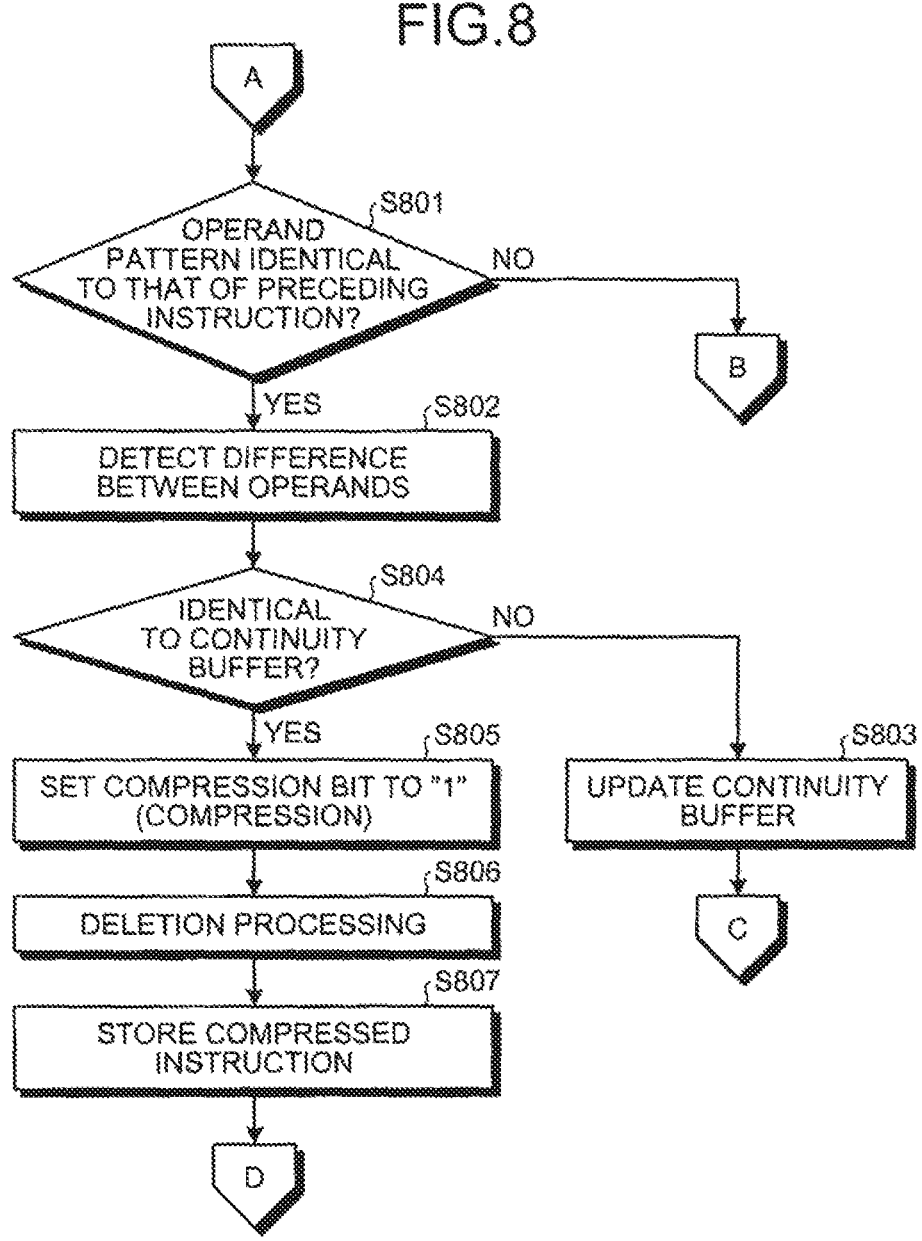
FIG. 8 is a second part of a flowchart depicting the compression procedure by the compression apparatus.

FIG. 8 is a second part of a flowchart depicting the compression procedure by the compression apparatus 101. At step S703 depicted in FIG. 7, if the operation codes are identical (step S703: YES), the compression apparatus 101, via the determiner 402, determines whether the operand patterns of the preceding instruction of and of the test subject are identical (step S801). If the operand patterns are not identical (step S801: NO), the operands are not consecutive and the test subject is excluded as a compression subject. Consequently, the compression apparatus 101 transitions to step S706 depicted in FIG. 7, and via the setter 404, initializes the continuity buffer.

If the operand patterns are identical (step S801: YES), the compression apparatus 101 detects differences between the operands of the preceding instruction and the operands of the test subject (step S802). For example, when the preceding instruction is the instruction IS1 and the test subject is the instruction IS2, the difference is "+1". Similarly, when the preceding instruction is the instruction IS2 and the test subject is the instruction IS3, the difference is "+1".

The compression apparatus 101, via the determiner 402, determines whether the detected difference and the value of the continuity buffer are identical (step S804). When the detected difference and the continuity buffer value are not identical (step S804: NO), the continuity buffer is initialized and the compression apparatus 101, via the setter 404, updates the continuity buffer to the detected difference (step S803), and transitions to step S707.

When the detected difference and the continuity buffer value are identical (step S804: YES), such as when the preceding instruction is the instruction IS2 and the test subject is the instruction IS3, the compression apparatus 101, via the compressor 403, sets the compression bit of the test subject to "1" (step S805). Thereafter, the compression apparatus 101, via the compressor 403, deletes the bit string (storage bit, instruction code) subsequent to the compression bit of the test subject (step S806). Thus, the compression apparatus 101 stores to the compression buffer, a compressed instruction that includes only the compression bit (=1) (step S807), and transitions to step S701.

Thus, the compression apparatus 101 enables high compression of an instruction group by compressing instructions (test subjects) that with respect to the preceding instruction, have the same operation code and operand continuity. For example, when there are M successive m-bit instructions meeting the compression conditions, in an uncompressed state, there are (m×M) bits. Whereas, after compression by the compression apparatus 101, only the head instruction is not compressed and the subsequent instructions are compressed to 1 bit (i.e., the compression bit).

Therefore, the compressed size becomes (m+M−1) bits. Thus, when the size is reduced by compression, since the maximum amount of compressed instructions equivalent to the bus width can be fetched collectively, the number of accesses to the memory can be reduced and power consumption can be reduced. Further, system instructions such as NOPs have no operands and consequently, such instructions are not subject to storage as a restoration source instruction, enabling the instructions to be excluded from restoration sources and thereby, enabling improvement of the restoration processing efficiency.

The second example will be described. In the second example, compression of an instruction sequence group of consecutive instruction groups executed in parallel such as a VLIW will be described.

Figure 9:
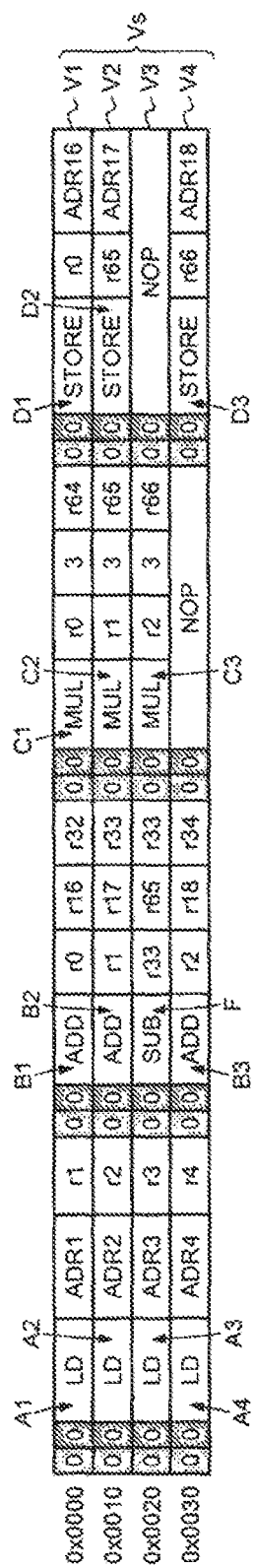
FIG. 9 is a diagram of one example of a sequence of instruction groups according to a second example.

FIG. 9 is a diagram of one example of a sequence of instruction groups according to the second example. Here, a VLIW will be described as an example. In a sequence of instruction groups Vs, multiple VLIW instructions having multiple instructions (4 in FIG. 9) such as those depicted in FIG. 1 are present. Further, in the sequence of instruction groups Vs, an instruction at the same position in each of the instruction sequences is framed by a bold line. For example, in the instruction sequence V1 to V4 of the sequence of instruction groups Vs, the head instruction A1 at address 0x0000, the head instruction A2 at address 0x0010, the head instruction A3 at address 0x0020, and the head instruction A4 at address 0x0030 are instructions at the same position. Further, in the sequence of instruction groups Vs depicted in FIG. 9, as an example, 1 instruction has 32 bits as in the first example, and since 1 group is assumed to be configured by a sequence of 4 instructions, 1 group has 128 bits. The structure of the instruction is identical to that depicted in FIG. 2.

Figure 10:
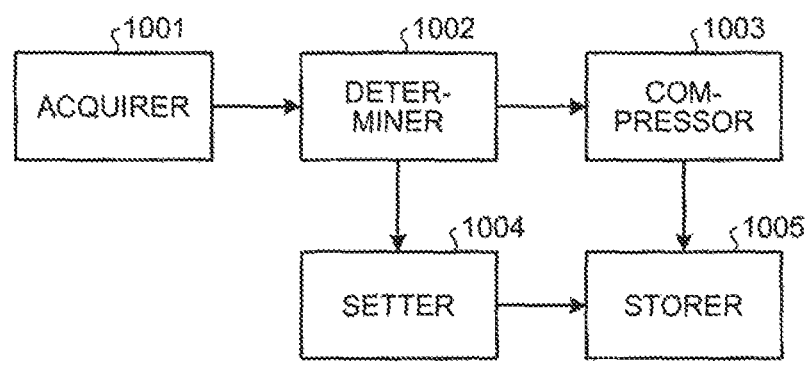
FIG. 10 is a block diagram depicting an example of a functional configuration of the compression apparatus according to the second example.

FIG. 10 is a block diagram depicting an example of a functional configuration of the compression apparatus 101 according to the second example. As depicted in FIG. 10, the compression apparatus 101 includes an acquirer 1001, a determiner 1002, a compressor 1003, a setter 1004, and a storer 1005. These functions (the acquirer 1001 to the setter 1004) forming a controller, for example, are realized by executing on the CPU 301, a program stored in storage device such as the ROM 302, the RAM 303, the magnetic disk 305, and the optical disk 307 depicted in FIG. 3, or by the I/F 309.

The acquirer 1001 acquires a given instruction as a test subject from an instruction group under test, among the sequence of instruction groups. For example, from the head address 0x0000 of the sequence of instruction groups, the acquirer 1001 sequentially acquires instruction groups V1, V2, V3, and V4. Further, when the instruction group Vi is acquired, the acquirer 1001 sequentially acquires an instruction A1, an instruction B1, an instruction C1, and an instruction D1. After the acquisition of the instruction D1, the instruction group V2 at the next address 0x0010 is assumed to be acquired.

The determiner 1002 executes determination processing identical to the determiner 402 of the first example. However, in the second example, since instructions are handled in units of instruction groups, the preceding instruction of the test subject is not the immediately preceding instruction, but rather the instruction at the same position in the preceding instruction group. For example, the preceding instruction of the instruction B2 at address 0x0010 is not the instruction A1 at address 0x0010, but rather the instruction B1 at the same position in the preceding instruction group V1. Further, the compressor 1003 executes compression processing that is identical to that of the compressor 403 of the first example.

The setter 1004 executes setting processing identical to the setter 404 of the first example. However, similar to the determiner 1002, the preceding instruction of the test subject is not the instruction immediately preceding instruction, but rather the instruction at the same position in the preceding instruction group. In the second example, a continuity buffer is set for each position of the instructions in the instruction groups. For example, the instructions A1 to A4 are at different positions in the instruction group and thus, a continuity buffer is prepared for each position. In other words, in the example depicted in FIG. 9, 4 continuity buffers are set.

The storer 1005 stores a compression information group obtained from the test subjects of the instruction group under test and subsequent to the compression information group, further stores non-compressed test subjects among the instruction group under test and for which storage information has been set. In the first example, compressed instructions and non-compressed instructions are written to the compression buffer simply in the order of writing. However, in the second example, for each instruction group, the compression bits of the instructions in the instruction group are collectively placed at the head. A string of compression bits collected in this manner is referred to as a "compression information group".

The storer 1005 establishes an area for the compression information group in the compression buffer, and from the head instruction of the instruction group under test, writes the compression bits. When the compression bit is "0" (no-compression), the non-compressed instruction including the storage bit, operation code, and operands is written subsequent to the compression information group.

In this manner, the storer 1005, for each instruction group, writes a compression information group and 0 or more non-compressed instructions to the compression buffer. However, if even 1 instruction is compressed in the instruction groups, empty areas arise and by performing shifts according to the empty areas, the compressed sequence of instruction groups can be shortened. By such shortening, the number of fetches performed can be reduced, enabling increased processing speed at the processor 102 and reduced power consumption.

Figures 11A, 11B, 11C:
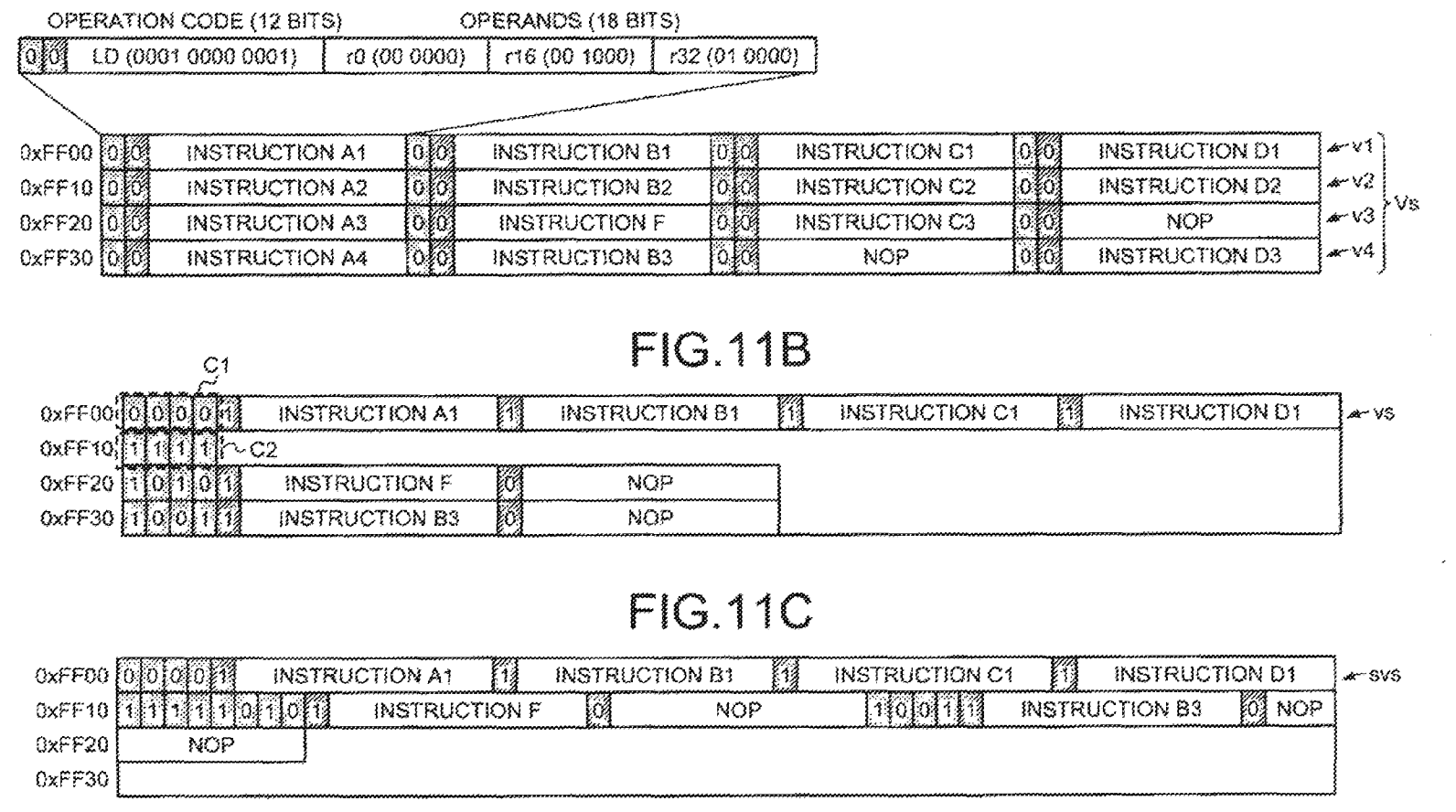

FIGS. 11A, 11B, and 11C are diagrams of an example of the compression processing according to the second example. FIGS. 11A to 11C depict an example where the sequence of instruction groups depicted in FIG. 9 is compressed. FIG. 11A depicts the sequence of instruction groups before compression; FIG. 11B depicts the sequence of instruction groups after compression; and FIG. 11C depicts the compressed sequence of instruction groups after shortening.

In FIG. 11A, the compression apparatus 101 reads in the instruction group V1 at address 0x0000, decodes the instruction group V1, and reads in the instruction A1. Since the instruction group V1 has no preceding instruction group, the instruction A1 has no preceding instruction. Consequently, the compression bit of instruction A1 is "0" (no-compression). In FIG. 11B, the head bit of a compression information group C1 of the instruction group V1 is set to "0". Since the instruction group V1 is the head instruction group, the subsequent instructions B1, C1, D1 have the same results.

In FIG. 11A, the compression apparatus 101, upon completing the compression processing for the instruction group V1 at address 0x0000, reads in (as the instruction group under test) the instruction group V2 at the next address 0x0010, decodes the instruction group V2, and reads in the instruction A2. Since the preceding instruction group of the instruction group V2 is the instruction group V1, the preceding instruction of the instruction A2 is the instruction A1. Since the instruction A2 satisfies the compression conditions (same operation code and operand continuity) of the determiner 1002, the compression apparatus 101 sets the compression bit of the instruction A2 to "1" (compression). Accordingly, as depicted in FIG. 11B, the head bit of a compression information group C2 of the instruction group V1 is set to "1", and the storage bit, the operation code, and the operands are deleted. The subsequent instructions B2, C2, and D2 of the instruction group V2 have the same results.

For the instruction group V3 at address 0x0020, the instructions A3 and C3 are compressed, while the instructions F and NOP are not. Similarly, for the instruction group V4 at address 0x0030, the instructions A4 and D3 are compressed, while the instructions B3 and NOP are not. Although the preceding instruction of the instruction D3 is the NOP of the instruction group V3, in the case of an NOP, since the continuity buffer holds the difference of the instruction therebefore (i.e., the instruction D2), the instruction D3 is compressed.

By shortening the state depicted in FIG. 11B to the state depicted in FIG. 11C, the shortened sequence of compressed instruction groups sys is stored at addresses 0xF100 to 0xF120, where address 0xF130 is an empty area. Accordingly, in the state depicted in FIG. 11A, assuming the bus width is 128, 4 memory accesses are required. However, in the state depicted in FIG. 11C, the memory access count is 3, thereby enabling a reduction of the memory access count.

FIG. 12 is a flowchart depicting an example of a procedure of compression processing by the compression apparatus 101 according to the second example. The compression apparatus 101 determines whether an instruction group is present in a sequence of instruction groups (step S1201). If an instruction group is present (step S1201: YES), the compression apparatus 101, via the acquirer 1001, acquires an instruction group as an instruction group under test (step S1202); and establishes in the compression buffer, a compression information group area of N-bits, where N=the number of instructions in the instruction group under test (in the example depicted in FIG. 9, N=4) (step S1203). The compression apparatus 101 sets an index i, which indicates the position of the instruction in the instruction group under test, as i=1 (step S1204). In the example depicted in FIG. 9, from the left i=1, 2, 3, 4(=N).

Subsequently, the compression apparatus 101 executes test-subject compression processing (step S1205). In the test-subject compression processing (step S1205), compression processing of the test subject, which is the i-th instruction of the instruction group under test, is executed. Contents of the compression processing are described with reference to FIGS. 13 and 14.

When the test-subject compression processing (step S1205) is executed, the compression apparatus 101 increments i (step S1206), and determines whether i>N is true (step S1207). If i>N is not true (step S1207: NO), the compression apparatus 101 returns to the test-subject compression processing (step S1205). On the other hand, if i>N is true (step S1207: YES), the compression apparatus 101 returns to step S1201.

At step S1201, if no instruction group is present (step S1201: NO), the compression apparatus 101, via the storer 1005, bit-shifts the compressed instruction group stored in the compression buffer, and thereby shortens the compressed instruction group (the bit-shifting being performed according to the empty areas as depicted in FIG. 11C) (step S1208), ending the compression processing.

Figure 13:
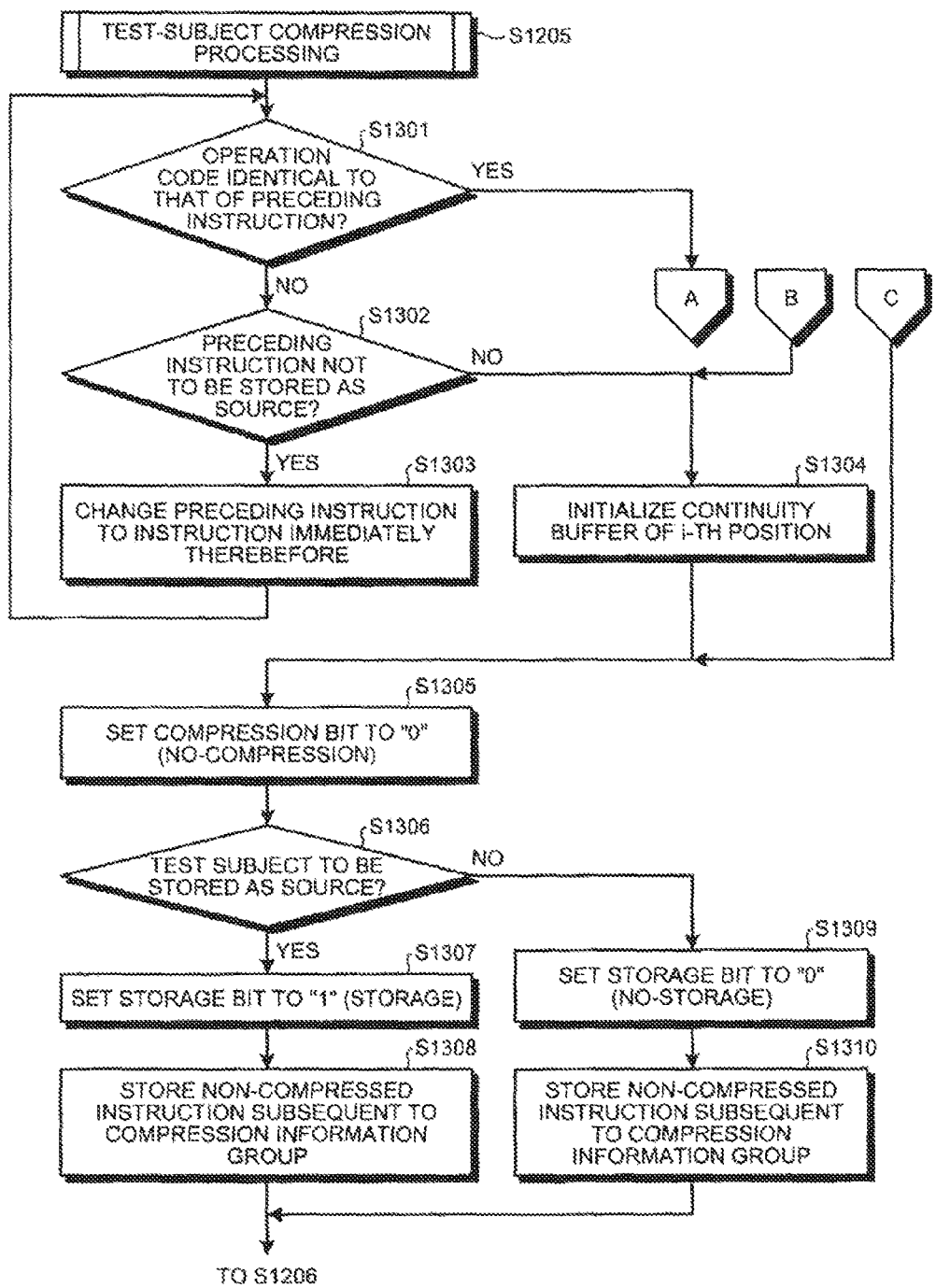
FIG. 13 is a first part of a flowchart depicting an example of a procedure of test-subject compression processing (step S1205) depicted in FIG. 12.
Figure 14:
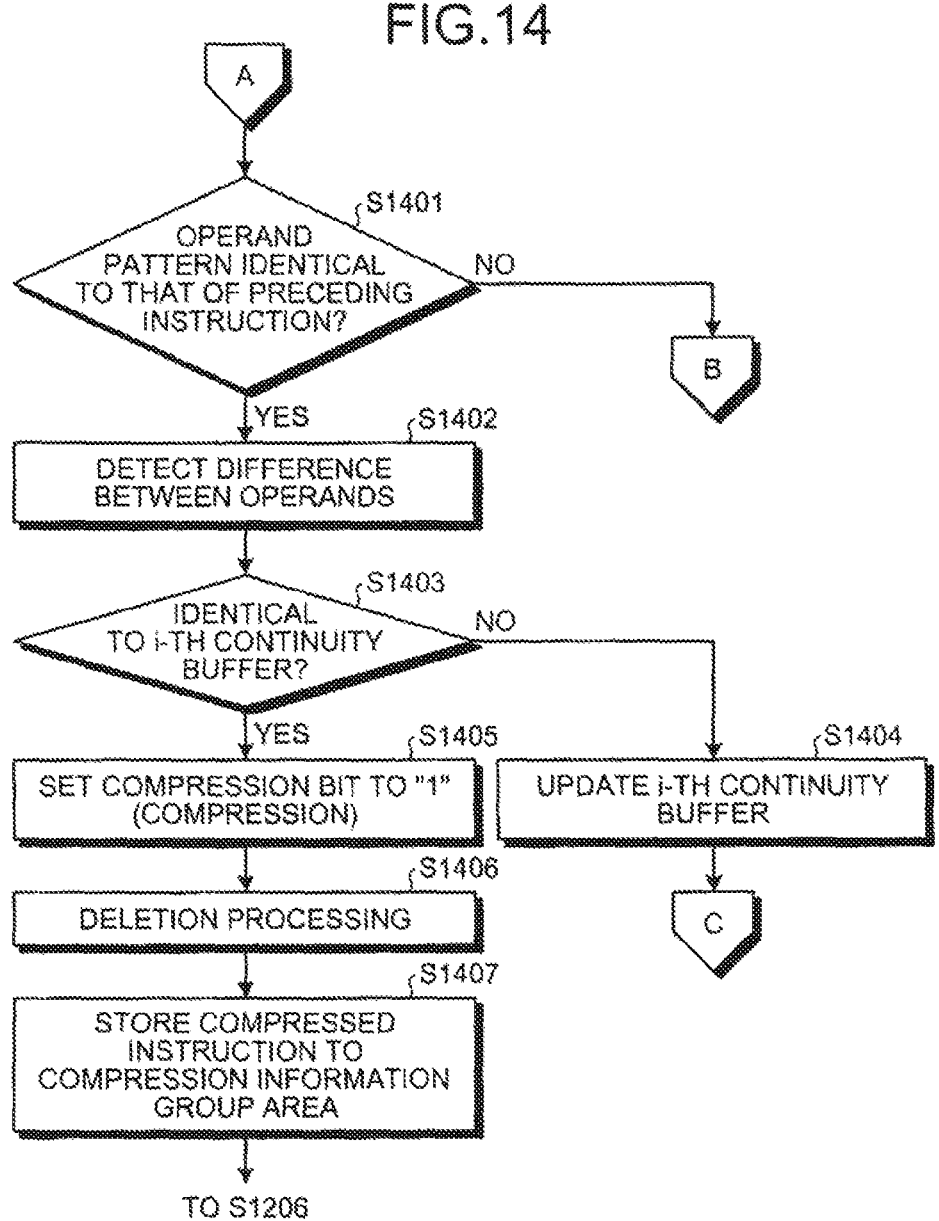
FIG. 14 is a second part of a flowchart of the example of the procedure of the test-subject compression processing (step S1205) depicted in FIG. 12.

FIG. 13 is a first part of a flowchart depicting an example of a procedure of the test-subject compression processing (step S1205) depicted in FIG. 12. In FIG. 13, the compression apparatus 101, via the determiner 1002, determines whether test subject has the same operation code as the preceding instruction (step S1301). If the operation code is the same (step S1301: YES), the processing described with reference to FIG. 14 is performed.

On the other hand, if the operation code is not the same (step S1301: NO), the compression apparatus 101, via the determiner 1002, refers to the storage bit of the preceding instruction, and determines whether the preceding instruction is an instruction that is not to be stored as a restoration source instruction (step S1302). If the preceding instruction is an instruction that is not to be stored as a restoration source instruction (step S1302: YES), the preceding instruction is a system instruction without operands and consequently, the test subject and the instruction at the same position in the instruction group before the instruction group preceding the instruction group under test may have the same operation code and operand continuity. Therefore, the compression apparatus 101, via the setter 1004, changes the preceding instruction to the instruction at the same position in the instruction group therebefore (step S1303), and returns to step S1301.

For example, if the test subject is the instruction D3 depicted in FIG. 11A, the preceding instruction is an NOP of the instruction group V3. Since an NOP is not stored as a restoration instruction, the instruction D2 at the same position in the instruction group V2, which is the instruction group before that of the preceding instruction (NOP), is regarded as the preceding instruction.

Further, if the preceding instruction is not an instruction that is not to be stored as a restoration source (step S1302: NO), i.e., is an instruction to be stored as a restoration source instruction, the compression apparatus 101, via the setter 1004, initializes the continuity buffer of the i-th position (step S1304), and sets the compression bit of the test subject to "0" (step S1305).

The compression apparatus 101, via the determiner 1002, determines whether the test subject is an instruction that is to be stored as a restoration source instruction (step S1306). For example, the compression apparatus 101 refers to the storage determining table T and if the storage flag concerning the operation code for the test subject is "1", determines that the instruction is to be stored and if "0", determines that the instruction is not to be stored as a restoration resource instruction.

If the instruction is to be stored as a restoration source instruction (step S1306: YES), the compression apparatus 101 sets the storage bit of the test subject to "1" (step S1307). The compression apparatus 101, via the storer 1005, stores the compression bit "0" to the i-th bit position in the compression information group area in the compression buffer. Further, for storage bits of "1", the compression apparatus 101, via the storer 1005, stores subsequent to the compression information group in the compression buffer, the operation code and operands that are identical to those of the test subject (step S1308). Thus, a non-compressed instruction concerning the test subject is stored and the compression apparatus 101 returns to step S1206.

At step S1306, if the instruction is not to be stored as a restoration source instruction (step S1306: NO), the compression apparatus 101 sets the storage bit of the test subject to "0" (step S1309). The compression apparatus 101 stores the compression bit "0" to the i-th bit position in the compression information group area of the compression buffer. For storage bits of "0", the compression apparatus 101 stores subsequent to the compression information group in the compression buffer, the operation code and operands that are identical to those of the test subject (step S1310). Thus, a non-compressed instruction concerning the test subject is stored and the compression apparatus 101 returns to step S1206.

FIG. 14 is a second part of a flowchart of the example of the procedure of the test-subject compression processing (step S1205) depicted in FIG. 12. In FIG. 14, when the operation code is the same at step S1301 depicted in FIG. 13 (step S1301: YES), the compression apparatus 101, via the determiner 1002, determines whether the operand patterns of the preceding instruction and the test subject are identical (step S1401). If the operand patterns are not identical (step S1401: NO), the operands have no continuity and the test subject is not be subject to compression. Therefore, the compression apparatus 101 transitions to step S1304 in FIG. 12 and via the setter 1004, initializes the i-th position continuity buffer.

On the other hand, if the operand patterns are identical (step S1401: YES), the compression apparatus 101 detects differences between the operands of the preceding instruction and the operands of the test subject (step S1402). For example, in the case of the preceding instruction A1 and the test subject instruction A2, the difference is "+1". Similarly, in the case of the preceding instruction A2 and the test subject instruction A3, the difference is "+1".

The compression apparatus 101, via the determiner 1002, determines whether the detected difference and the continuity buffer value are identical (step S1403). When the detected difference and the i-th position continuity buffer value are not identical (step S1403: NO), the compression apparatus 101 updates the i-th position continuity buffer to the detected difference (step S1404) and transitions to step S1305.

When the detected difference and the i-th position continuity buffer value are identical (step S1403: YES), such as in the case of the preceding instruction A2 and the test subject instruction A3, the compression apparatus 101, via the compressor 1003, sets the compression bit of the test subject to "1" (step S1405). The compression apparatus 101, via the compressor 1003, deletes the bit string (storage bit, instruction code) subsequent to the compression bit of the test subject (step S1406), whereby the compression apparatus 101 stores to the i-th position of the compression information group area of the compression buffer, a compressed instruction formed of merely the compression bit (=1) (step S1407). Thereafter, the compression apparatus 101 transitions to step S1206.

Thus, by compressing a test subject that, with respect to the preceding instruction, has the same operation code and operand continuity, the compression apparatus 101 enables high compression of a sequence of instruction groups. For example, M consecutive instruction groups of N instructions of m-bits and satisfying the compression conditions, is (m×N×M) bits in a non-compressed state; whereas, subsequent to compression by the compression apparatus 101, the head instruction group alone is not subject to compression and the instructions of the subsequent instruction group are compressed to 1 bit (compression bit).

Consequently, the compressed size becomes (m×N+(M−1)×N) bits. Thus, when the size is reduced by compression, since the maximum amount of compressed instructions equivalent to the bus width can be fetched collectively, the number of accesses to the memory can be reduced and power consumption can be reduced. Further, system instructions such as NOPs have no operands and consequently, such instructions are not subject to storage as a restoration source instruction, enabling the instructions to be excluded from restoration sources and thereby, enabling improvement of the restoration processing efficiency.

A second embodiment will be described. In the second embodiment, the instruction execution depicted in FIG. 1 will be described. In the second embodiment, the processor 102 depicted in FIG. 1, while reading in an instruction sequence, performs execution processes concerning non-compressed instructions; and for compressed instructions, restores each instruction by referring to the restoration source instruction and executes the instruction. In this manner, by fetching a compressed instruction sequence, the number of fetches performed, i.e., the number of memory access can be reduced and power consumption can be reduced.

Figure 15:
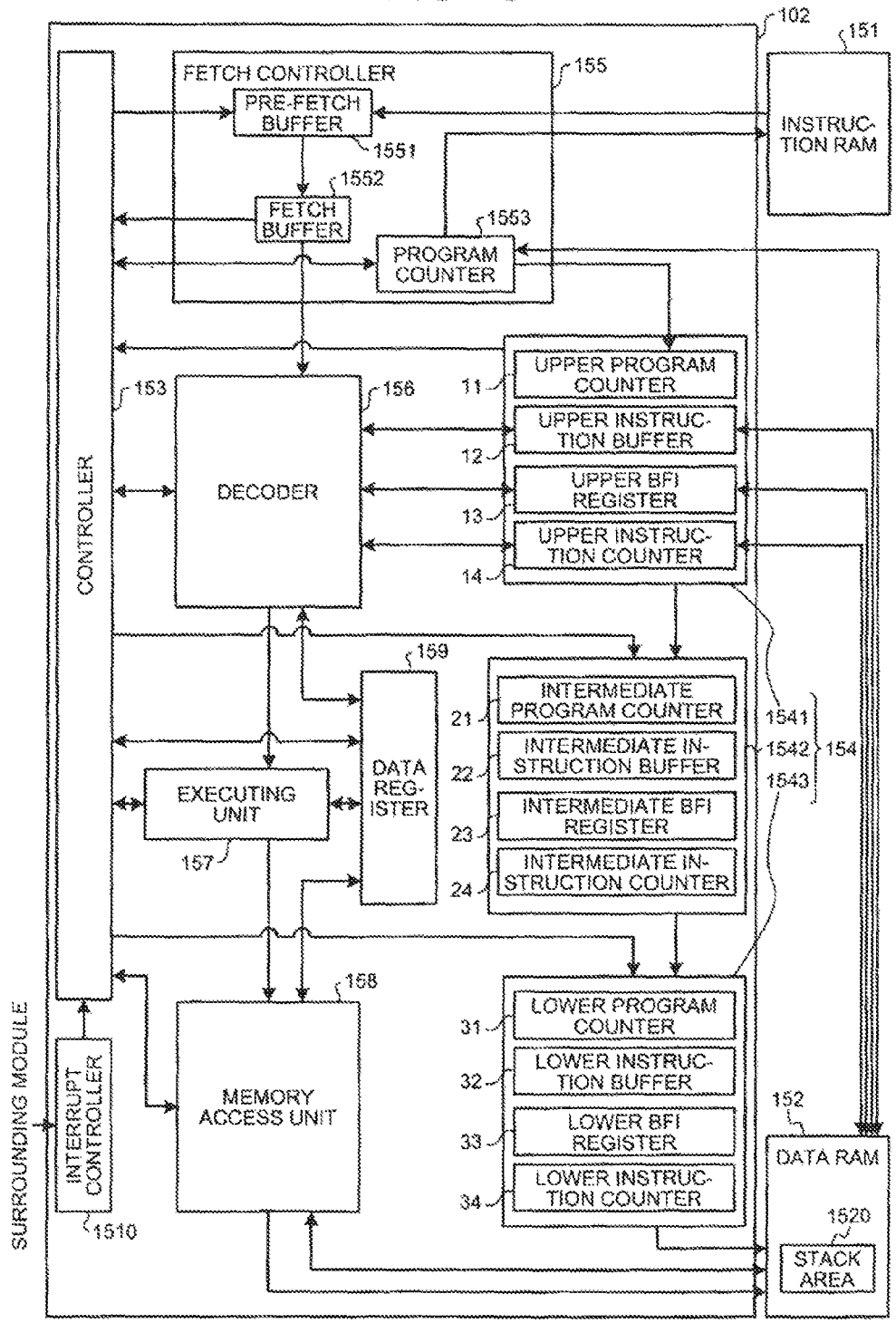
FIG. 15 is a block diagram depicting an example of a hardware configuration of a processor depicted in FIG. 1.

FIG. 15 is a block diagram depicting an example of a hardware configuration of the processor 102 depicted in FIG. 1. The processor 102 is connected to an instruction RAM 151 and a data RAM 152, via a bus, enabling access thereto. The bus width, for example, is assumed to be 32 bits. The instruction RAM 151 stores therein the compressed instruction sequence iss depicted in FIG. 6, the compressed instruction sequence group vs depicted in FIG. 11B, or the compressed instruction sequence group sys depicted in FIG. 11C. The processor 102 is further connected to other surrounding modules (not depicted) such as an input apparatus, an output apparatus, a communication apparatus, a DSP, another CPU, enabling access respectively thereto.

The processor 102 includes a controller 153, a recovery register group 154, a fetch controller 155, a decoder 156, an executing unit 157, a memory access unit 158, a data register 159, and an interrupt controller 1510.

The controller 153 is connected to the interrupt controller 1510, the fetch controller 155, the decoder 156, the executing unit 157, the memory access unit 158, the recovery register group 154, and the data register 159 (hereinafter, collectively referred to as "connection destinations"). The controller 153 controls the connection destinations, and transfers data from a given connection destination to another connection destination. Further, the controller 153 controls a pipeline between the fetch controller 155, the decoder 156, the executing unit 157, and the memory access unit 158.

The recovery register group 154 is configured by an upper recovery register 1541, an intermediate recovery register 1542, and a lower recovery register 1543 connected in series. The upper recovery register 1541 is connected to the fetch controller 155 and the decoder 156; the intermediate recovery register 1542 is connected to the executing unit 157; and the lower recovery register 1543 is connected to the memory access unit 158.

The recovery registers respectively include a program counter 11, 21, 31; an instruction buffer 12, 22, 32; a bit field information (BFI) register 13, 23, 33; and an instruction counter 14, 24, 34. The program counters 11, 21, 31 hold therein values that are counted by the fetch controller 155 and transferred from upstream. The instruction buffers 12, 22, 32 hold therein instruction codes obtained by the decoder 156. The BFI registers 13, 23, 33 hold therein the operand patterns of the instruction codes obtained by the decoder 156. The instruction counters 14, 24, 34 indicate the number of consecutive times that the operation codes are identical and the operands are regularly consecutive. The value held by the upper recovery register 1541 is taken on by the intermediate recovery register 1542; the value held by the intermediate recovery register 1542 is taken on by the lower recovery register 1543.

The fetch controller 155 includes a prefetch buffer 1551, a fetch buffer 1552, and a program counter 1553. Here, the bit width of the prefetch buffer 1551 and the fetch buffer 1552 is equivalent to the bus width. The fetch controller 155 prefetches from the instruction RAM 151, data of the bus width and stores the data to the prefetch buffer 1551.

When the fetch buffer 1552 has empty areas, the fetch controller 155 sequentially transfers to the fetch buffer 1552, data that remains in the prefetch buffer 1551, the transferring being from the head data (first in, first out). When the head bit of the data held by the fetch buffer 155 is "0" (i.e., compression bit=0), the fetch controller 155 determines the instruction to be a non-compressed instruction. In this case, the fetch controller 155 transfers to the decoder 156, a bit string of a number of bits equivalent to the non-compressed instruction.

On the other hand, when the head bit of the data held in the fetch buffer 1552 is "1" (i.e., compression bit=1), the fetch controller 155 determines the instruction to be a compressed instruction. In this case, the fetch controller 155 transfers to the decoder 156, bits of a number equivalent to the compressed instruction (the bit value is compression information="1", indicating compression).

The program counter 1553 counts the position of the compressed instruction sequence fetched from the instruction RAM 151. For example, at the fetch controller 155, if a non-compressed instruction is determined, the program counter 1553 increments the value of the program counter 1553 by the bit length of the non-compressed instruction (for example, in the case of 32 bits, by 32). On the other hand, at the fetch controller 155, if a compressed instruction is determined, the program counter 1553 increments the value of the program counter 1553 by the bit length of the compressed instruction (for example, in the case of 1, by 1).

When data is transferred from the fetch buffer 1552, the fetch controller 155 shifts the remaining data toward the head. When the fetch buffer 1552 is empty, the fetch controller 155 fetches data equivalent to the bit width of the prefetch buffer 1551. When the value of the program counter 1553 is updated, the fetch controller 155 transfers to the upper program counter 11, the updated value of the program counter 1553.

The decoder 156 is connected to the upper recovery register 1541 in the recovery register group 154, enabling access thereto. The upper recovery register 1541 includes the upper program counter 11, the upper instruction buffer 12, the upper BFI register 13, and the upper instruction counter 14. When the value of the program counter 1553 in the fetch controller 155 is updated and transferred, the decoder 156 updates the value of the upper program counter 11 to the updated value of the program counter 1553.

The decoder 156 interprets the instruction transferred from the fetch controller 155 and passes the instruction to the executing unit 157. The instruction transferred from the fetch controller 155 includes 2 types, a non-compressed instruction and a compressed instruction. For example, when the head bit of data transferred from the fetch controller 155 is "0" (i.e., compression bit=0), the decoder 156 determines the instruction to be a non-compressed instruction. On the other hand, when the head bit of data transferred from the fetch controller 155 is "1" (i.e., compression bit=1), the decoder determines the instruction to be a compressed instruction.

If the transferred instruction is determined to be a non-compressed instruction, the decoder 156 extracts the instruction code from the non-compressed instruction and transfers the extracted instruction code to the executing unit 157. For example, if the instruction IS1 at address 0xF100 and depicted in FIG. 5 is transferred, the instruction code (operation code ADD, operands r0, r16, r32) excluding the head 2 bits "01" is transferred to the executing unit 157.

If the transferred instruction is determined to be a non-compressed instruction, the decoder 156, according to the storage bit, which is the second bit from the head, determines whether storage to the upper instruction buffer 12 is to be performed with respect to the transferred instruction. If the instruction is determined to not be subject to storage (storage bit=0), storage to the upper instruction buffer 12 and the upper BFI register 13 is not performed.

On the other hand, if the transferred instruction is determined to be subject to storage, the decoder 156 interprets the operand pattern of the instruction code and writes the operand pattern to the upper BFI register 13. For example, if the operand pattern is written to the upper bit of the operation code, the operand pattern is written to the upper BFI register 13. For example, in the case of the instruction IS1 at address 0xF100 and depicted in FIG. 6, the operand pattern written to the upper BFI register 13 is information indicating that the type of operand is register, the operand count is 3, the starting position of the head operand is the 15th bit from the head of the instruction code.

Further, if the transferred instruction is to be subject to storage, the decoder 156 writes the instruction code to the upper instruction buffer 12. For example, if the instruction IS1 at address 0xF100 and depicted in FIG. 6 is transferred, the instruction code (operation code ADD, operands r0, r16, r32) exclusive of the head 2 bits "01", is written to the upper instruction buffer 12.

Further, if the transferred instruction is determined to be subject to storage, the decoder 156 sets the instruction counter to the initial value. For example, the decoder 156 sets the initial value as 1. The instruction counter is incremented by 1 each time a compressed instruction is transferred, and returns to the initial value if a non-compressed instruction is transferred.

Further, if the transferred instruction is determined to be a compressed instruction, the decoder 156, for example, in the case of 1-bit compression information, restores the instruction to the original instruction based on the current values of the upper BFI register 13, the upper instruction buffer 12, and the upper instruction counter 14. For example, if the head bit (left end) "1" at address 0xF120 depicted in FIG. 6 is transferred, the instruction code (operation code ADD and operands r1, r17, r33) in the instruction IS2 is restored.

Similarly, if the second bit "1" from the head (left end) at address 0xF120 depicted in FIG. 6 is transferred, the instruction code (operation code ADD and operands r2, r18, r34) in the instruction IS3 is restored. Details of the restoration processing will be described hereinafter. The decoder 156 transfers the restored instruction to the executing unit 157. If the decoder 156 has restored an instruction, after transferring the instruction to the executing unit 157, the decoder increments the instruction counter by 1.

If a non-compressed instruction or a restored instruction is transferred to the executing unit 157, the decoder 156 transfers the values of the upper recovery register 1541 to the intermediate recovery register 1542, whereby the values of the intermediate recovery register 1542 are updated, enabling the instruction code transferred to the executing unit 157 and the values of the intermediate recovery register 1542 to be synchronized.

The executing unit 157 executes the instruction code transferred thereto from the decoder 156 and writes the instruction code to the data register 159 specified by the operands. The executing unit 157 transfers the instruction code to the memory access unit 158. Here, the executing unit 157, via the controller 153, transfers each value in the intermediate recovery register 1542 to the lower recovery register 1543. As a result, the values of the lower recovery register 1543 are updated, enabling the instruction code transferred to the memory access unit 158 and the value of the lower recovery register 1543 to be synchronized.

If the instruction code transferred from the executing unit 157 includes the address of the data RAM 152, which is the access destination, the memory access unit 158 accesses the data RAM 152. For example, if the operation code of the transferred instruction code is LOAD, data is read in from the address of the data RAM 152 indicated in the instruction code and is written to the data register 159 specified by the operand. If the operation code of the transferred instruction code is STORE, the value of the data register 159 specified by the data operand is written to the data RAM 152 address indicated in the instruction code.

The interrupt controller 1510 detects an interrupt signal from a surrounding module. The interrupt controller 1510 informs the controller 153 of the detected interrupt signal, whereby the controller 153 preferentially causes execution of the interrupting instruction with respect to the fetch controller 155, the decoder 156, the executing unit 157 and the memory access unit 158. In this case, the memory access unit 158 causes the values of the lower recovery register 1543 to be saved in a stack area 1520 of the data RAM 152.

The interrupt controller 1510 detects an interrupt processing completion signal from a surrounding module. The interrupt controller 1510 informs the controller 153 of the detected interrupt signal, whereby the controller 153 causes, with respect to the fetch controller 155, the decoder 156, the executing unit 157, and the memory access unit 158, the execution of recovery processing for recovering the state before the interrupt. For example, the instruction code at the time of the interrupt at the memory access unit 158 is recovered at the decoder 156 by using the values of the lower register, stored to the stack area 1520 of the data RAM 152. The recovery processing of restoring the state before an interrupt will be described in detail hereinafter.

An operand updater in the decoder 156 will be described in detail. According to the operand pattern held in the upper the BFI register 13, the operand updater extracts the operands held in the upper instruction buffer 12, 1 operand at a time. From the extracted operands and the value of the instruction counter, the operand updater updates the extracted operands. The contents of the updating processing, for example, are as follows.

$$\text{Operand}=\text{Operand OP } X \quad (1)$$

$$X=IC \text{ or } (IC \text{ OP } K) \quad (2)$$

$$OP=+ \text{ or} - \text{or} * \text{ or } / \text{ or} >> \text{ or} << \quad (3)$$

Where, K=coefficient

In equation 1, the left-hand term "Operand" is the updated operand, the right-hand term "Operand" is the operand before updating. In equations 1 and 2, "OP" is an operation, and as prescribed by equation 3, is an arithmetic operator and a shift operation is performed. "X" is a variable and "IC" is the value of the upper instruction counter 14. "X" is the value "IC" of the upper instruction counter 14 or a value resulting from an operation involving a constant K and the value "IC" of the upper instruction counter 14.

For example, when the operand (register number, variable) increases by 1 for each instruction, the value of the instruction counter increases by 1, whereby "OP" is OP="+", and X=IC is set. As a result, equation 1 becomes as follows.

$$\text{Operand} = \text{Operand} + IC \tag{4}$$

When the operand (register number, variable) increases by 2 for each instruction, the value of the instruction counter increases by 1, whereby "OP" is OP="+", and K=1 is set. As a result, equation 1 becomes as follows.

$$\text{Operand} = \text{Operand} + IC + 1 \tag{5}$$

When the operand (register number, variable) decreases by 1 for each instruction, the value of the instruction counter increases by 1, whereby in equation 2, OP="*" and K=−1 is set, and in equation 1, "OP" is set as OP="+". As a result, equation 1 becomes as follows.

$$\text{Operand} = \text{Operand} + \{IC*(-1)\} \tag{6}$$

The way that the operand regularly changes for each instruction, i.e., concerning the combination of "OP" and "K", is specified by the instruction code. Such circuit configuration can be built from combinational circuits. Hereinafter, an example will be described in detail.

Figure 16:
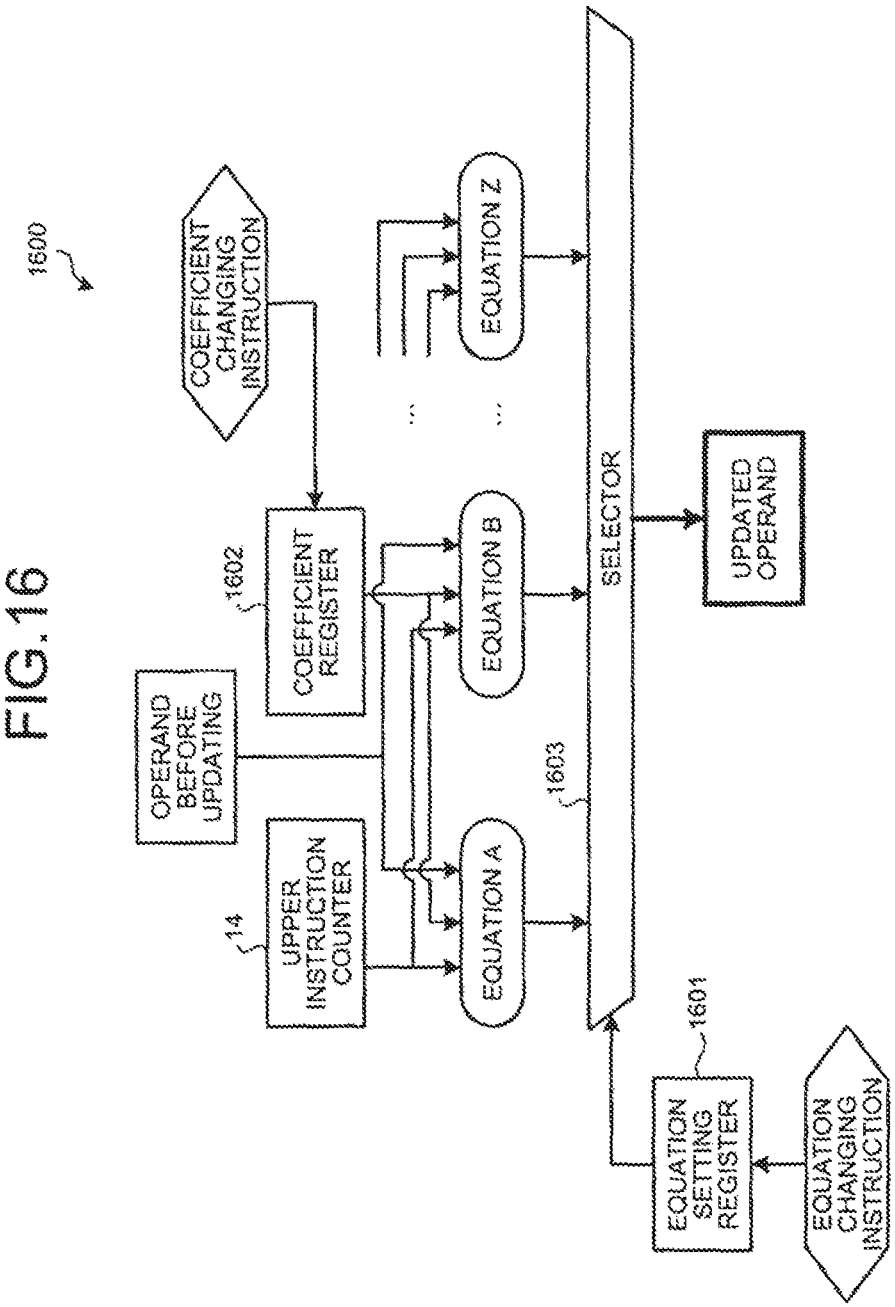
FIG. 16 is a diagram of a first configuration example of an operand updater.

FIG. 16 is a diagram of a first configuration example of the operand updater. In FIG. 16, an operand updater 1600 is configured by equations A to Z, an equation setting register 1601, a coefficient register 1602, and a selector 1603. Each of the equations A to Z is configured by combinational circuits. When there is an equation changing instruction, equation-setting code that selects any equation from among the equations A to Z is written to the equation setting register 1601. When there is a coefficient changing instruction, a value K is written to the coefficient register 1602.

In each of the equations A to Z, the operand before updating (right-hand term Operand of equation 1), the value IC of the upper instruction counter 14, and the value K of the coefficient register 1602 are input. The equation-setting code written in the equation setting register 1601 is input to the selector 1603. Output from the selector is the updated operand (left-hand term Operand of equation 1).

For example, as a non-compressed instruction, an equation changing instruction and a coefficient changing instruction are in the compressed instruction sequence depicted in FIG. 6, at the address before 0xF100; the value of the operand (selection code specifying the equation to be used from among the equations A to Z) of the equation changing instruction is held in the equation setting register 1601; and the value K=0 of the operand of the coefficient changing instruction is held in the coefficient register 1602.

For example, in the case of the instruction IS1 at 0xF100, equation A is assumed to be equation 4. The selection code of equation A is held in the equation setting register 1601. As a result, the value IC of the instruction counter, the register number r0, which is the operand before updating, and the coefficient K=0 are input, and according to equation 4, the updated operand becomes r1. The same is true concerning r16 and r32.

Figure 17:
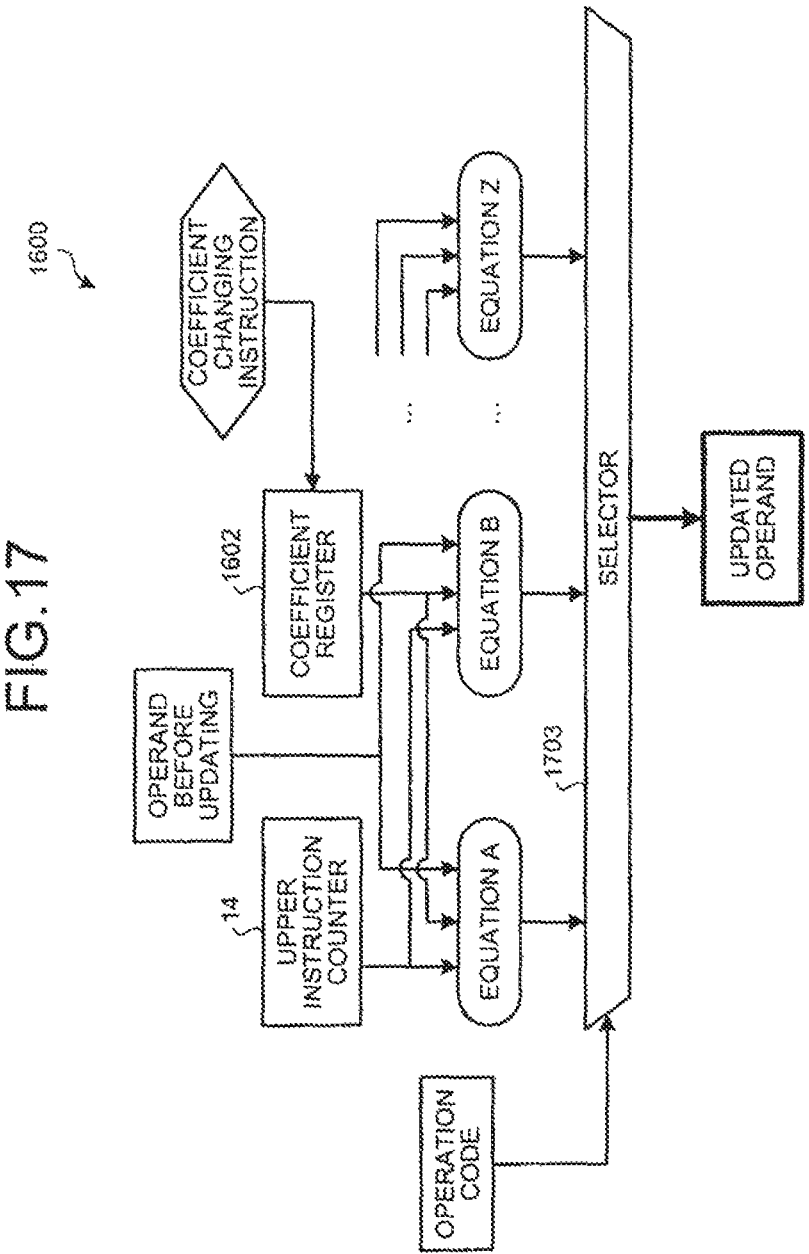
FIG. 17 is a diagram of a second configuration example of the operand updater.

FIG. 17 is a diagram of a second configuration example of the operand updater 1600. FIG. 16 depicts an example where an equation changing instruction and a coefficient changing instruction are included in a compressed instruction sequence. FIG. 17 depicts an example where the operation code (or a portion thereof) of a restoration source instruction is the selection code of the equations A to Z. For example, when the operation code is ADD, selection code selecting equation A is set. When the operation code is STORE, selection code selecting equation B is set by a selector 1703. In such a configuration, instructions equivalent to the equation changing instructions become unnecessary, enabling efficient compression to be facilitated.

Figure 18:
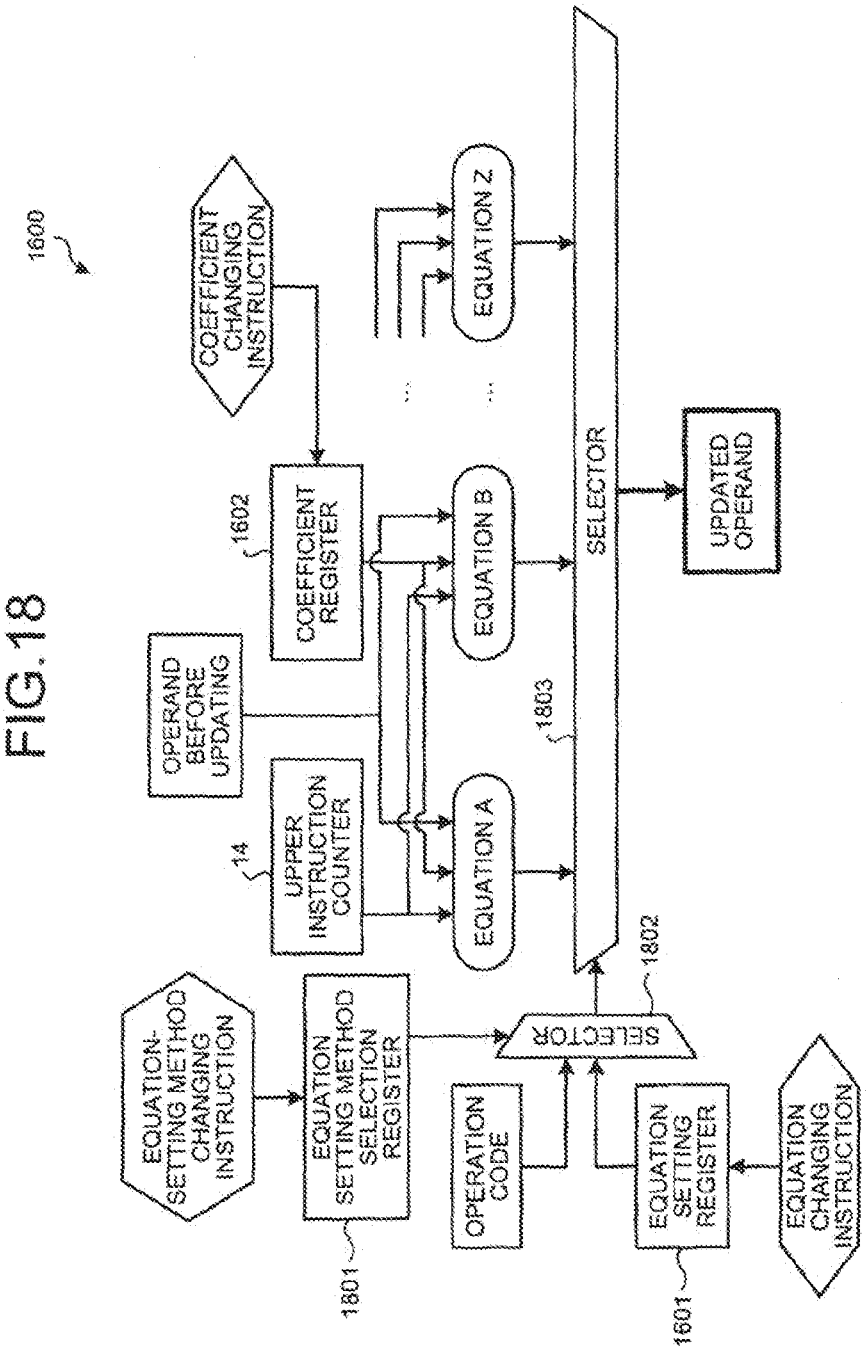
FIG. 18 is a diagram of a third configuration example of the operand updater.

FIG. 18 is a diagram of a third configuration example of the operand updater 1600. FIG. 18 depicts an example of a configuration enabling selection of an equation setting method of setting any one among the configuration example depicted in FIG. 16 and the configuration example depicted in FIG. 17. Since the configuration example depicted in FIG. 16 can be selected, the configuration example can be selected even in a case where the operation codes differ and the operations are the same.

For example, the operand updater 1600 includes an equation setting method selection register 1801, and selectors 1802, 1803. When there is an equation-setting method changing instruction, selection code selecting any one of the operation code and the equation-setting code written in the equation setting register, is written in the equation setting method selection register 1801. According to the selection code written in the equation setting method selection register 1801, a selector 1802 selects any one among the operation code and the equation-setting code written in the equation setting register. According to a selection signal from the selector 1802, a selector 1803 selects the corresponding equation from among the equations A to Z and updates the operand. In each of the configuration examples depicted in FIGS. 16 to 18, the operand updater 1600 can handle the regular changes of the operands, for each instruction.

Figure 19:
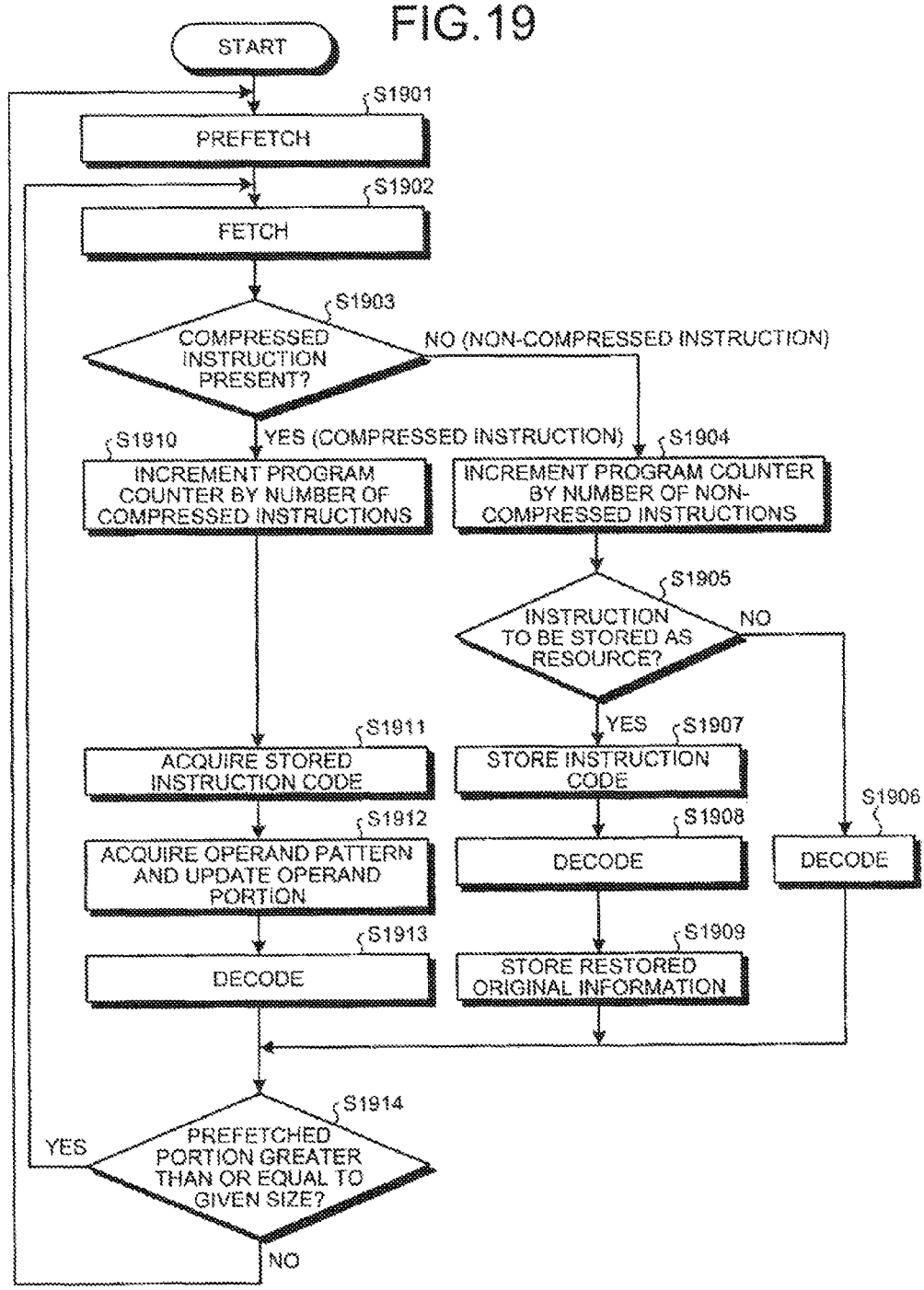
FIG. 19 is a flowchart of processing by the processor.

FIG. 19 is a flowchart of processing by the processor 102. The processor 102, via the fetch controller 155, performs prefetching (step S1901) and fetching (step S1902). The processor 102, via the fetch controller 155, refers to the head bit of the fetch buffer, and determines whether a bit string in the fetch buffer is a compressed instruction or a non-compressed instruction (step S1903). If the bit string is a non-compressed instruction (step S1903: NO), the processor 102, via the prefetch buffer 1551, increments the value of the program counter by the number of non-compressed instructions (step S1904).

Thereafter, the processor 102, via the decoder 156, determines whether the non-compressed instruction is to be stored as a restoration source instruction (step S1905). For example, the processor 102 refers to the storage bit (the second bit from the head) and if the storage bit is "1", determines that the non-compressed instruction is to be stored as a restoration source instruction, and if the storage bit is "0", determines that the non-compressed instruction is not to be stored as a restoration source instruction.

If the non-compressed instruction is not to be stored as a restoration source instruction (step S1905: NO), the processor 102, via the decoder 156, decodes the non-compressed instruction (step S1906) and transitions to step S1914. On the other hand, if the non-compressed instruction is to be stored as a restoration source instruction (step S1905: YES), the processor 102, via the decoder 156, stores to the upper instruction buffer 12, the instruction code in the non-compressed instruction (step S1907). Thereafter, the processor 102, via the decoder 156, decodes the non-compressed instruction (step S1908), stores the operand pattern of the non-compressed instruction to the upper BFI register 13, initializes the upper instruction counter 14 (step S1909), and transitions to step S1914.

At step S1903, if the bit string is a compressed instruction (step S1903: YES), the processor 102, via the fetch controller 155, increments the value of the program counter by the number of compressed instructions (step S1910). The processor 102, via the decoder 156, acquires the instruction code held in the upper instruction buffer 12 (step S1911).

Thereafter, the processor 102 acquires the operand pattern from the upper BFI register 13 and thereby, identifies the operand to be updated and based on the value of the upper instruction counter 14, updates each of the operands to be updated, via the operand updater 1600 (step S1912). The processor 102, via the decoder 156, combines the operation code in the instruction code acquired from the upper instruction buffer 12 and the updated operand; and thereby, restores the compressed instruction to the instruction before compression (step S1913). The processor 102 transitions to step S1914.

The processor 102, at step S1914, determines whether the bit length of the bit string prefetched by the fetch controller 155 is at least a given size (step S1914), and if the bit length is the given size or greater (step S1914: YES), returns to step S1902 and performs fetching (step S1902).

On the other hand, if the bit length is not the given size or greater (step S1914: NO), the processor 102 returns to step S1901 and performs prefetching (step S1901). Thus, by the operation of the fetch controller 155 and the decoder 156, a non-compressed instruction is normally decoded and transferred to the executing unit 157; and a compressed instruction is restored to the original instruction and transferred to the executing unit 157.

Pipeline processing according to the second embodiment will be described. In the pipeline processing, instruction fetching by the fetch controller 155, register read by the decoder 156, execution by the executing unit 157, and memory access by the memory access unit (stage before commit) are executed. In the pipeline processing, as described above, at the register read stage by the decoder 156, the operand is updated, the instruction code before compression is restored, and recovery processing in the case of an interrupt is executed. In a third embodiment, pipeline processing of a compressed instruction sequence compressed by the first example will be described; and in a fourth embodiment, pipeline processing of a sequence of compressed instruction groups compressed by the second example will be described.

Figure 20:
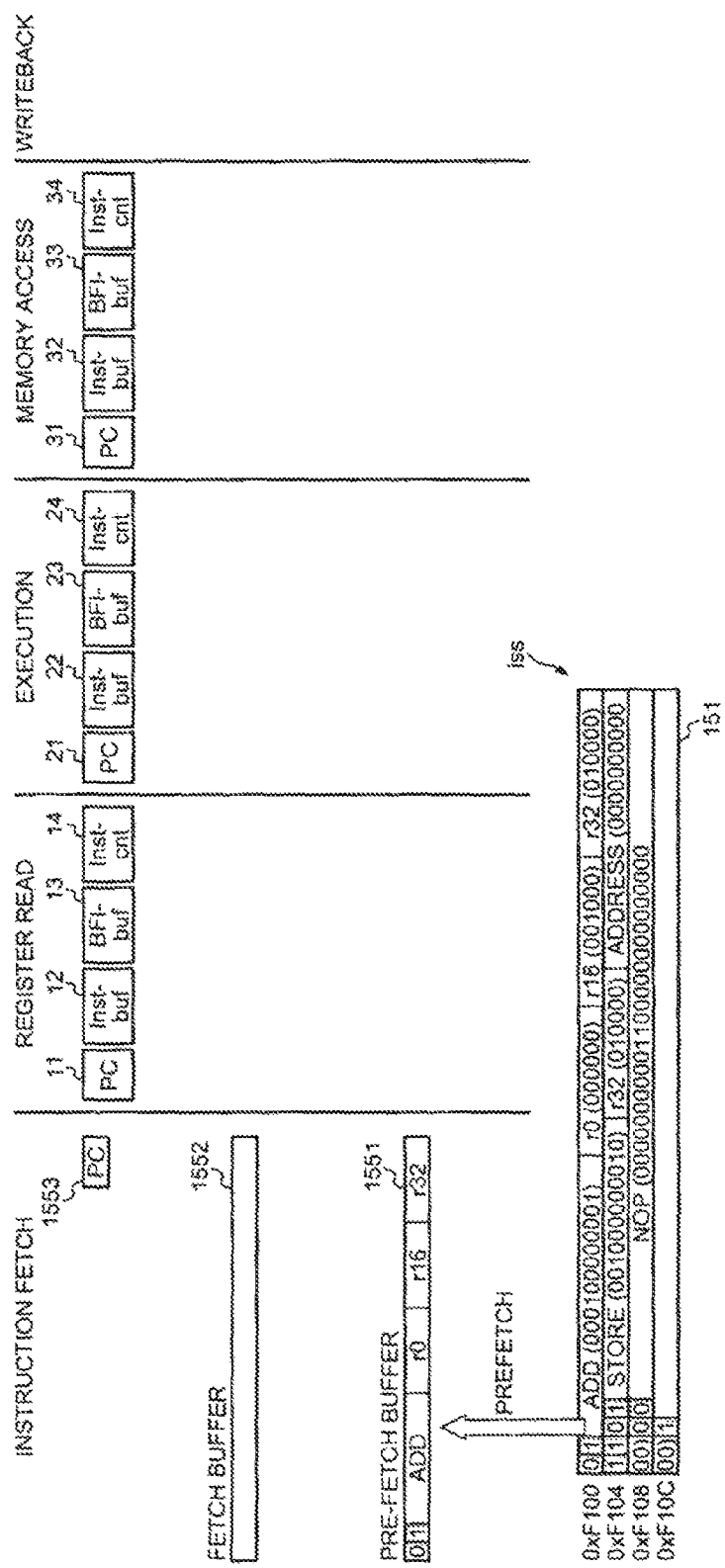

FIGS. 20 to 36 are diagrams of an example of pipeline processing according to the third embodiment. In FIG. 20, the fetch controller 155 prefetches and holds in the prefetch buffer 1551, the bit string (instruction IS1) at address 0xF100 of the instruction RAM 151.

Figure 21:
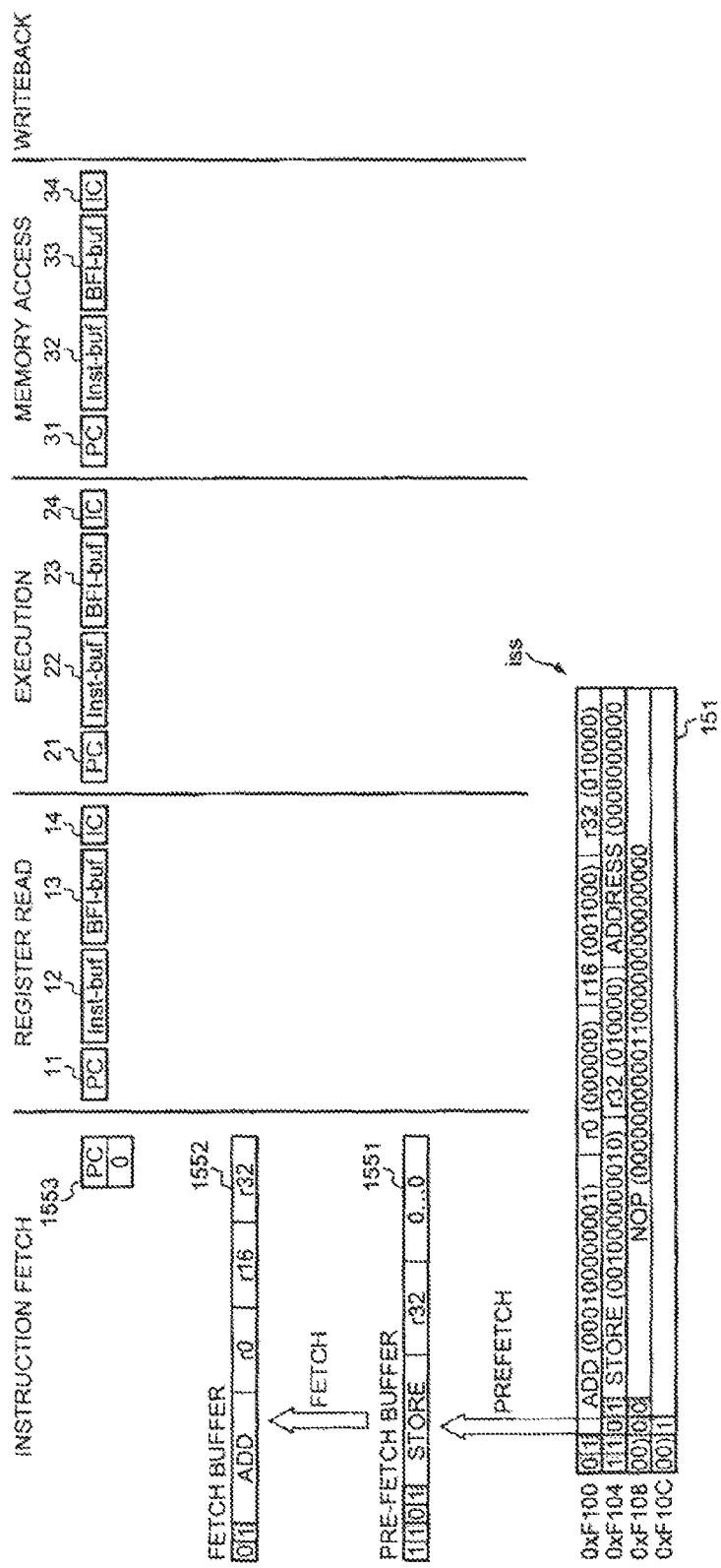

In FIG. 21, the fetch controller 155 fetches from the prefetch buffer 1551 and holds in the fetch buffer, the bit string (instruction IS1) of address 0xF100 of the instruction RAM 151. The fetch controller 155, prefetches and holds in the prefetch buffer 1551, which has become empty consequent to the fetching, the bit string at address 0xF104 of the instruction RAM 151.

Figure 22:
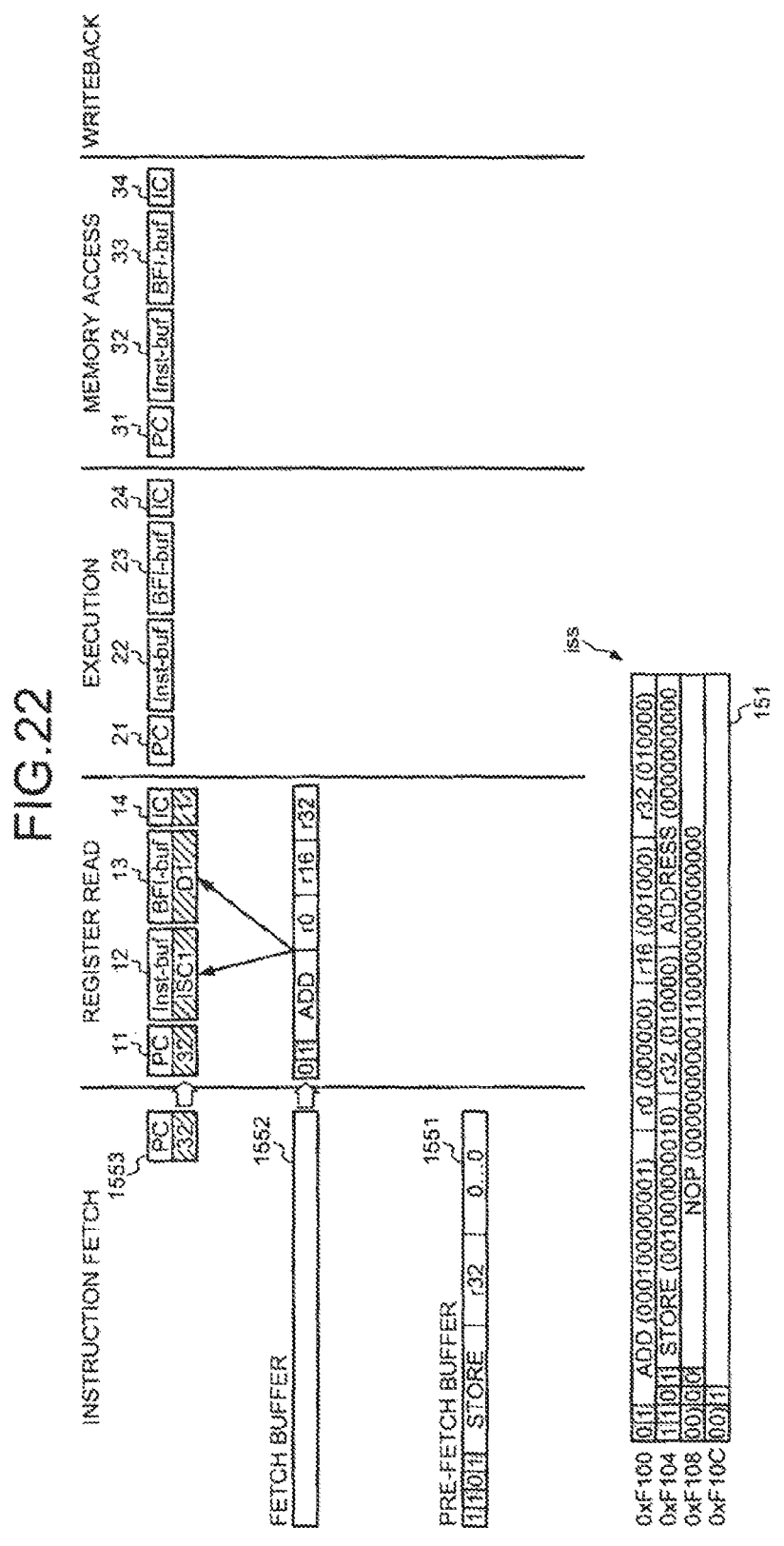

In FIG. 22, the fetch controller 155 determines whether the bit string (instruction IS1) of address 0xF100 and held in the fetch buffer is a non-compressed instruction. For example, the fetch controller 155 determines whether the head bit of the fetch buffer (compression bit) is "0" (no-compression) or "1" (compression). In the case of the bit string of address 0xF100, since the head bit is "0", the bit string of address 0xF100 is determined to be a bit string of a non-compressed instruction. In this case, the fetch controller 155 transfers the entire bit string in the fetch buffer to the decoder 156.

The fetch controller 155 updates the program counter by the number of transferred bits. In this case, since the transferred bit string is 32 bits, the value of the program counter becomes "32". The fetch controller 155 transfers the updated value "32" of the program counter to the upper program counter 11 of the decoder 156.

The decoder 156, upon receiving the non-compressed instruction transferred from the fetch controller 155, refers to the storage bit, which is the second bit from the head of non-compressed instruction. In this case, since the value of the storage bit is "1" (storage), the decoder 156 holds in the upper instruction buffer 12, the instruction code ISC1 (operation code: ADD, operand: r0, r16, r32) in the non-compressed instruction. The decoder 156 holds the operand pattern D1 of the instruction code ISC1 in the upper BFI register 13. The decoder 156, since a non-compressed instruction has been transferred thereto, sets the upper instruction counter 14 to the initial value of "1". The decoder 156 sets the program counter value transferred from the fetch controller 155 as the value of the upper program counter 11.

Figure 23:
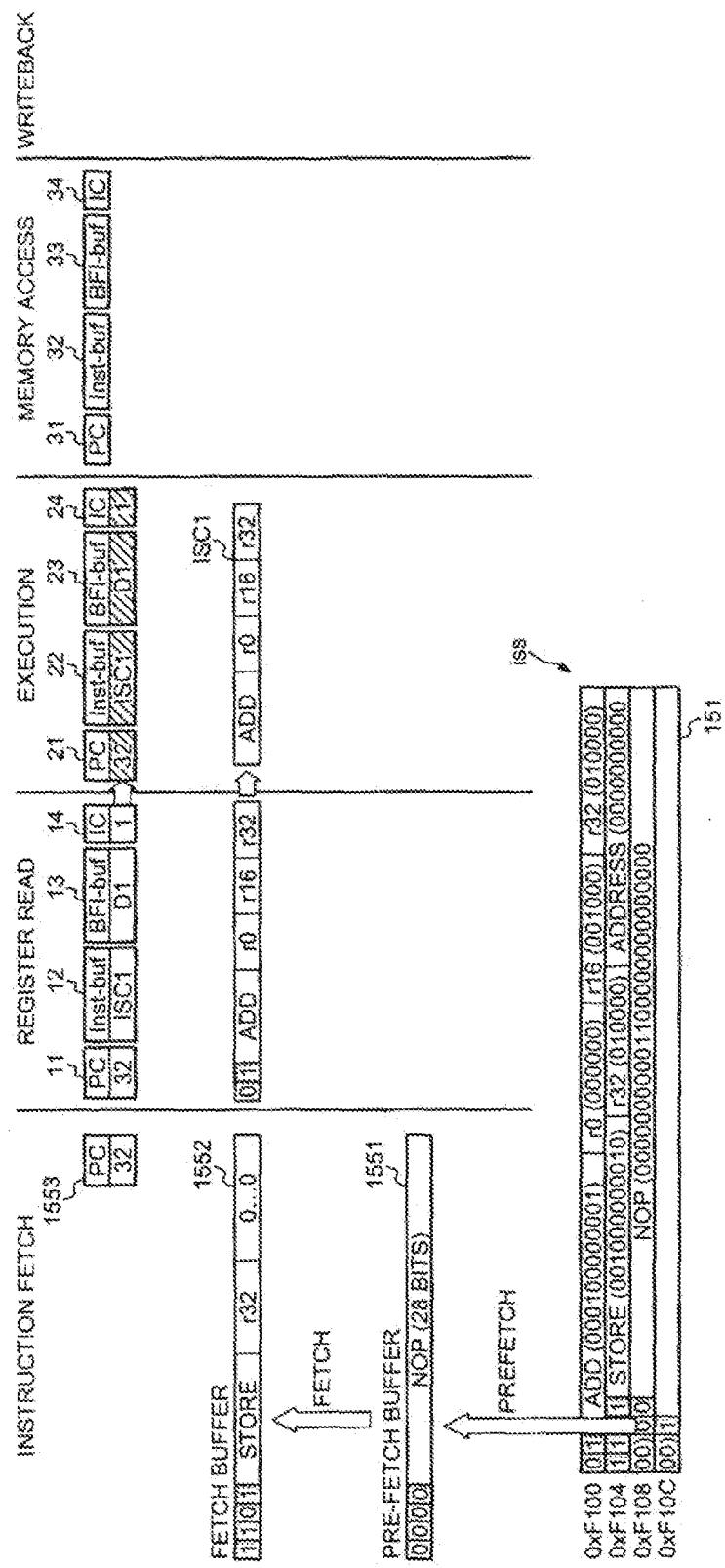

In FIG. 23, the fetch controller 155 fetches from the prefetch buffer 1551 and holds in the fetch buffer 1552 that has become empty, the bit string of address 0xF104. The fetch controller 155 prefetches and holds in the prefetch buffer 1551, which has become empty consequent to the fetching, the bit string at address 0xF10C in the instruction RAM 151.

The decoder 156 transfers the instruction code ISC1 and the values of the upper recovery register 1541 to the executing unit 157. The executing unit 157 updates the intermediate recovery register 1542 to the values of the upper recovery register 1541. By referring to the data register 159 and the data RAM 152, the executing unit 157 executes the instruction code ISC1 transferred from the decoder 156.

Figure 24:
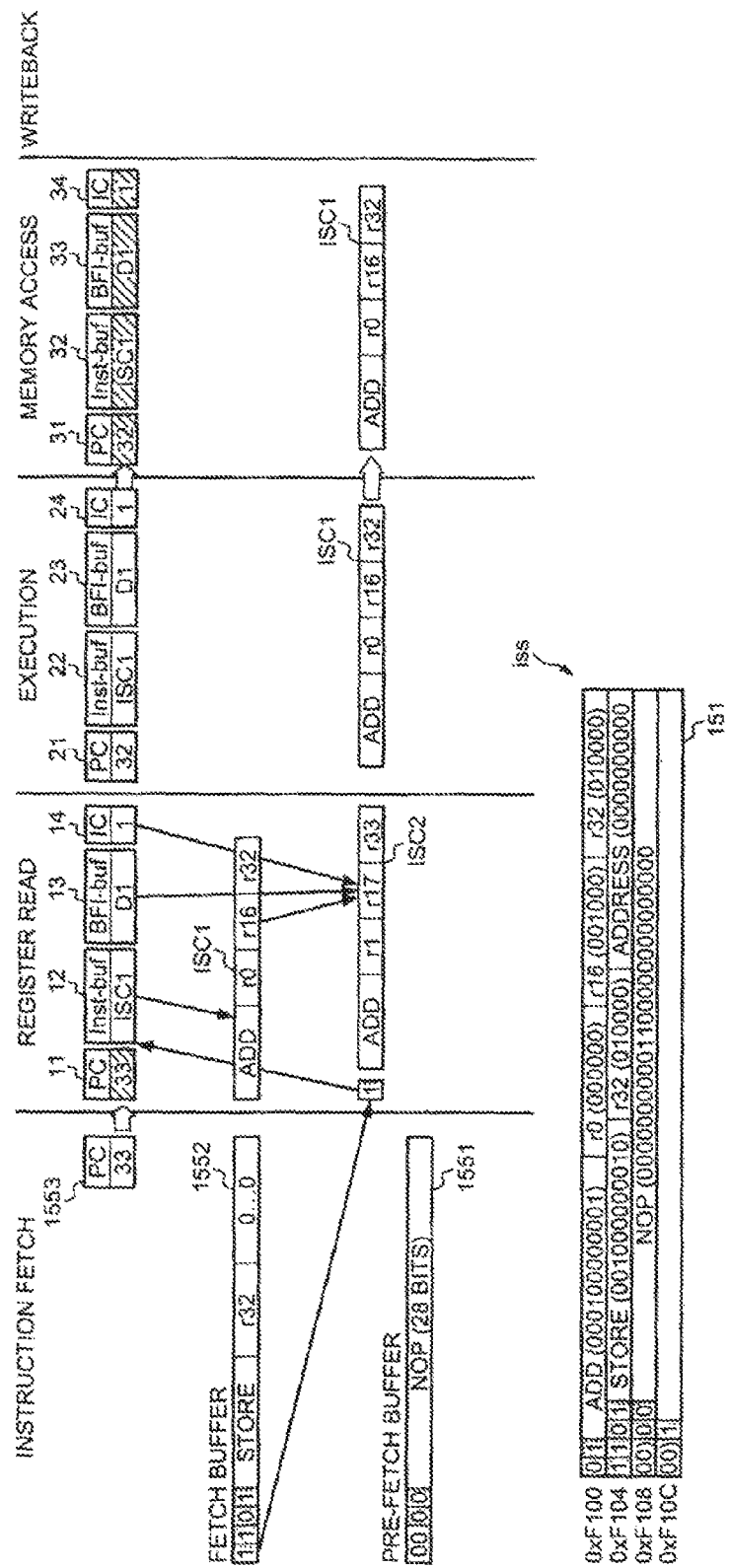

In FIG. 24, the fetch controller 155 determines whether the bit string of address 0xF104 and held in the fetch buffer is a non-compressed instruction. In the case of the bit string of address 0xF104, since the head bit is "1", the head bit of the bit string of address 0xF104 is a compressed instruction. In this case, the fetch controller 155 transfers the head bit (=1) of the fetch buffer to the decoder 156.

The fetch controller 155 updates the program counter by the number of transferred bits. In this case, since the transferred bit string is the head bit (1 bit), the value of the program counter becomes "33". The fetch controller 155 transfers the updated value "33" of the program counter to the upper program counter 11 of the decoder 156.

The decoder 156, upon receiving the compressed instruction transferred from the fetch controller 155, reads out the instruction code ISC1 held in the upper instruction buffer 12, the operand pattern D1 held in the BFI register, and the value "1" of the instruction counter. The decoder 156, via the operand updater 1600, updates the operands of the read instruction code ISC1, whereby, the decoder 156 restores the original instruction code ISC2 (operation code: ADD, operands: r1, r17, r33).

The executing unit 157 transfers the instruction code ISC1 and the values of the intermediate recovery register 1542 to the memory access unit 158. The memory access unit 158 updates the lower recovery register 1543 to the values of the intermediate recovery register 1542. The memory access unit 158 accesses the data RAM 152, according to the operation code of the transferred instruction code. In the case of the instruction code ISC1, since the data RAM 152 address is not in the operands, the data RAM 152 is not accessed.

Figure 25:
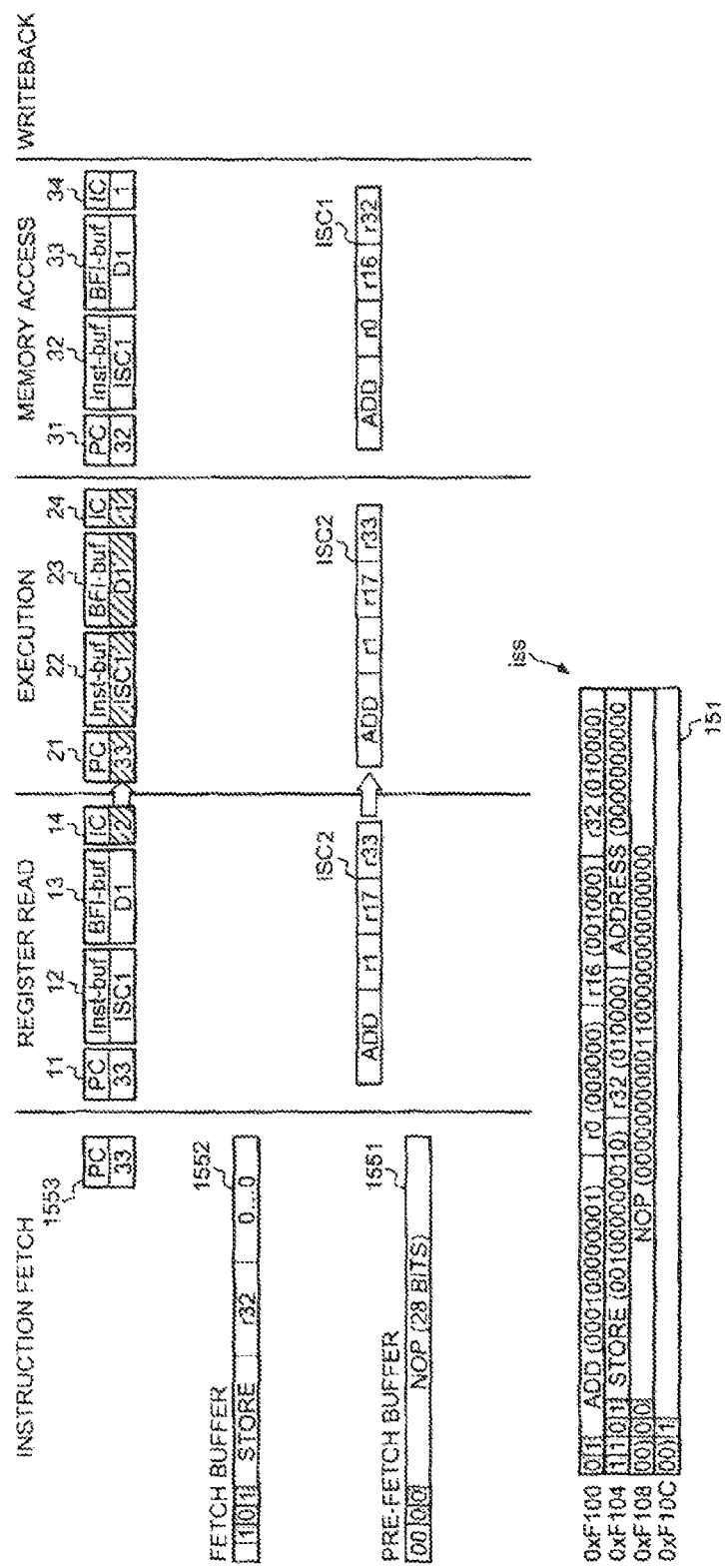

In FIG. 25, the decoder 156 transfers the restored instruction code ISC2 and the values of the wooer recovery register 1541 to the executing unit 157. The decoder 156, after the transfer, increments the value of the upper instruction counter 14 by 1. The executing unit 157 updates the intermediate recovery register 1542 to the values of the upper recovery register 1541. Accordingly, the values of the upper recovery register 1541 and the values of the intermediate recovery register 1542 only differ for the value "2" of the upper instruction counter 14 and the value "1" of the intermediate counter 24. By referring to the data register 159 and the data RAM 152, the executing unit 157 executes the instruction code ISC2 transferred from the decoder 156.

Figure 26:
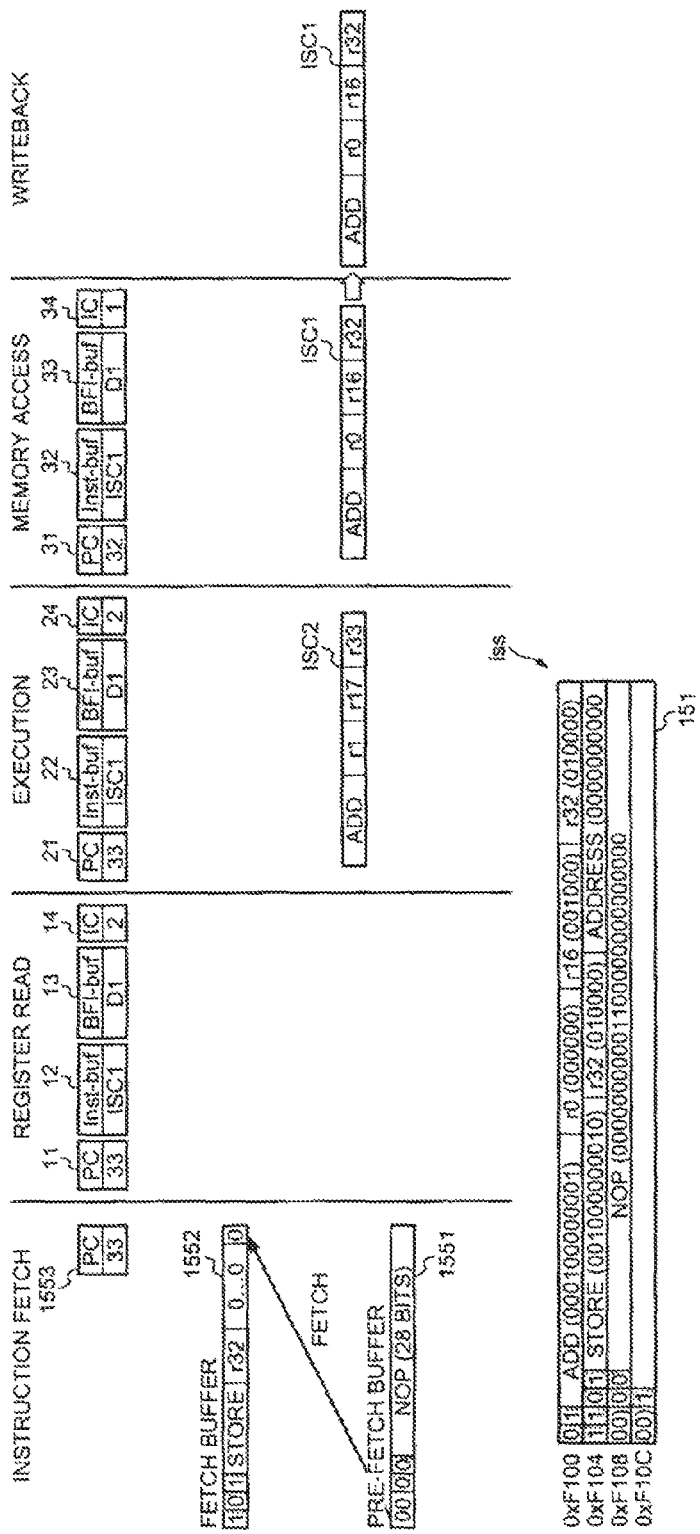

In FIG. 26, since 1 bit has become empty consequent to the transfer of the 1-bit compressed instruction as depicted in FIG. 24, the fetch controller 155 shifts the bit string (31 bits) remaining in the fetch buffer by 1 bit, and fetches and holds in the empty area (1 bit), the head bit of the prefetch buffer 1551. At the memory access unit 158, when the instruction code ISC1 is processed, processing (writeback) other than commit stage processing is performed.

Figure 27:
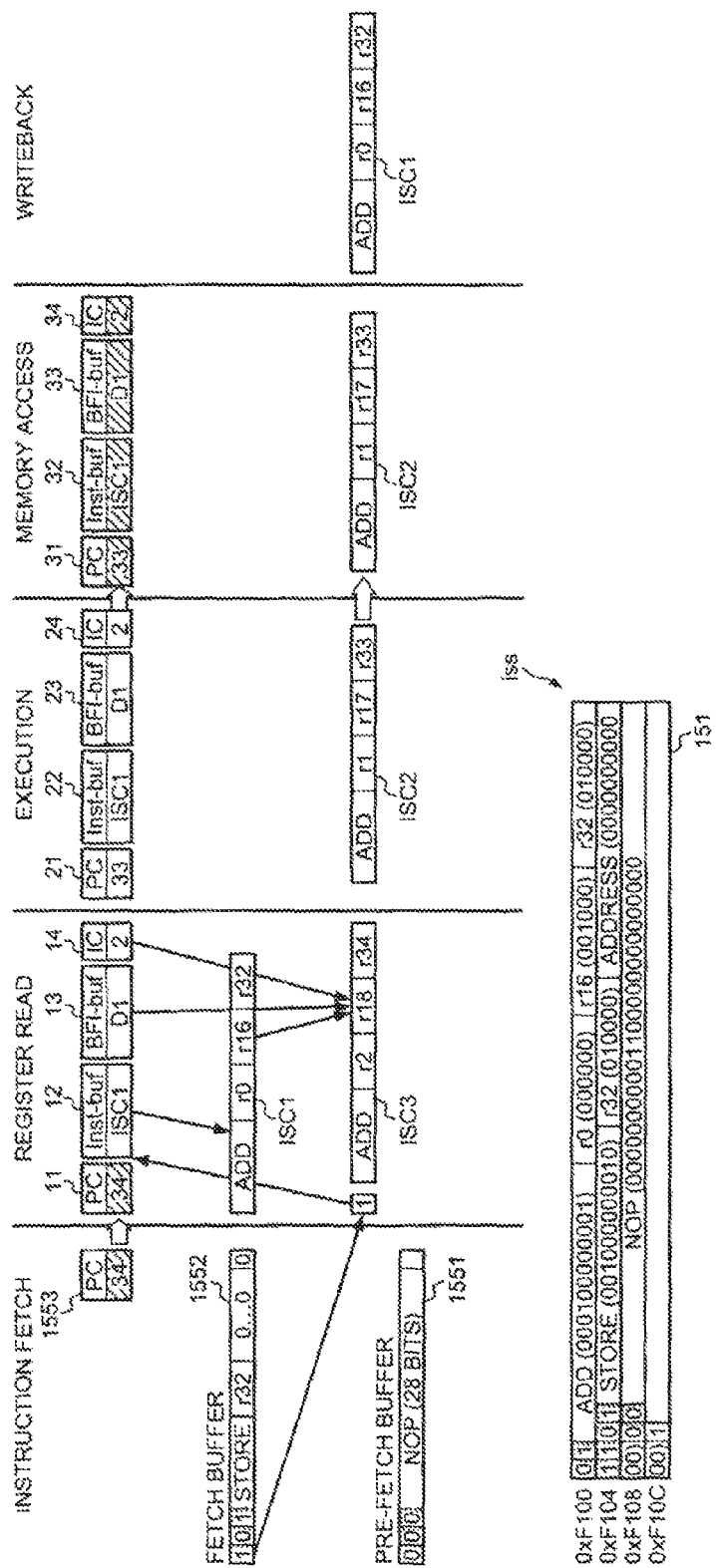

In FIG. 27, the fetch controller 155 determines whether the bit string in the fetch buffer is a non-compressed instruction. In the case of this bit string, since the head bit is "1", the head bit of the bit string held in the fetch buffer is determined to be a compressed instruction. In this case, the fetch controller 155 transfers the head bit (=1) in the fetch buffer to the decoder 156.

The fetch controller 155 updates the program counter by the number of transferred bits. In this case, since the transferred bit string is the head bit (1 bit), the value of the program counter becomes "34". The fetch controller 155 transfers the updated program counter value "34" to the upper program counter 11 of the decoder 156.

The decoder 156, upon receiving the compressed instruction transferred from the fetch controller 155, reads out the instruction code ISC1 held in the upper instruction buffer 12, the operand pattern D1 held in the BFI register, and the instruction counter value "2". The decoder 156, via the operand updater 1600, updates the operands of the read instruction code ISC1, whereby the decoder 156 restores the original instruction code ISC3 (operation code: ADD, operands: r2, r18, r34).

The executing unit 157 transfers the instruction code ISC2 and the value of the intermediate recovery register 1542 to the memory access unit 158. The memory access unit 158 updates the lower recovery register 1543 to the values of the intermediate recovery register 1542. The memory access unit 158 accesses the data RAM 152, according to the operation code of the transferred instruction code. In the case of the instruction code ISC2, since the data RAM 152 address is not included in the operands, the data RAM 152 is not accessed.

Figure 28:
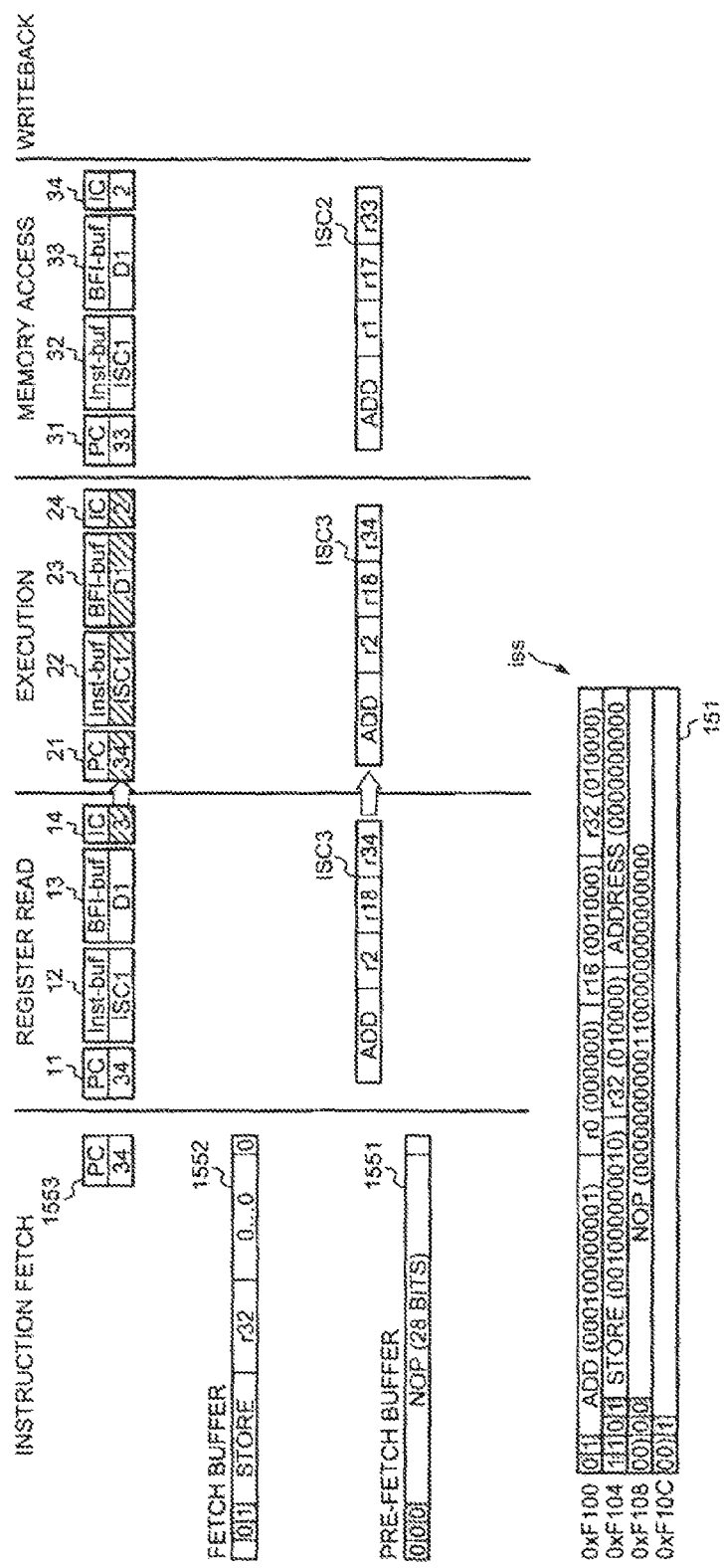

In FIG. 28, the decoder 156 transfers the restored instruction code ISC3 and the value of the upper recovery register 1541 to the executing unit 157. The decoder 156, after the transfer, increments the value of the upper instruction counter 14 by 1. The executing unit 157 updates the intermediate recovery register 1542 to the values of the upper recovery register 1541. Accordingly, the values of the upper recovery register 1541 and the values of the intermediate recovery register 1542 only differ for the value of "3" for the upper instruction counter 14 and the value of "2" for the intermediate instruction counter 24. By referring to the data register 159 and the data RAM 152, the executing unit 157 executes the instruction code ISC3 transferred from the decoder 156.

Figure 29:
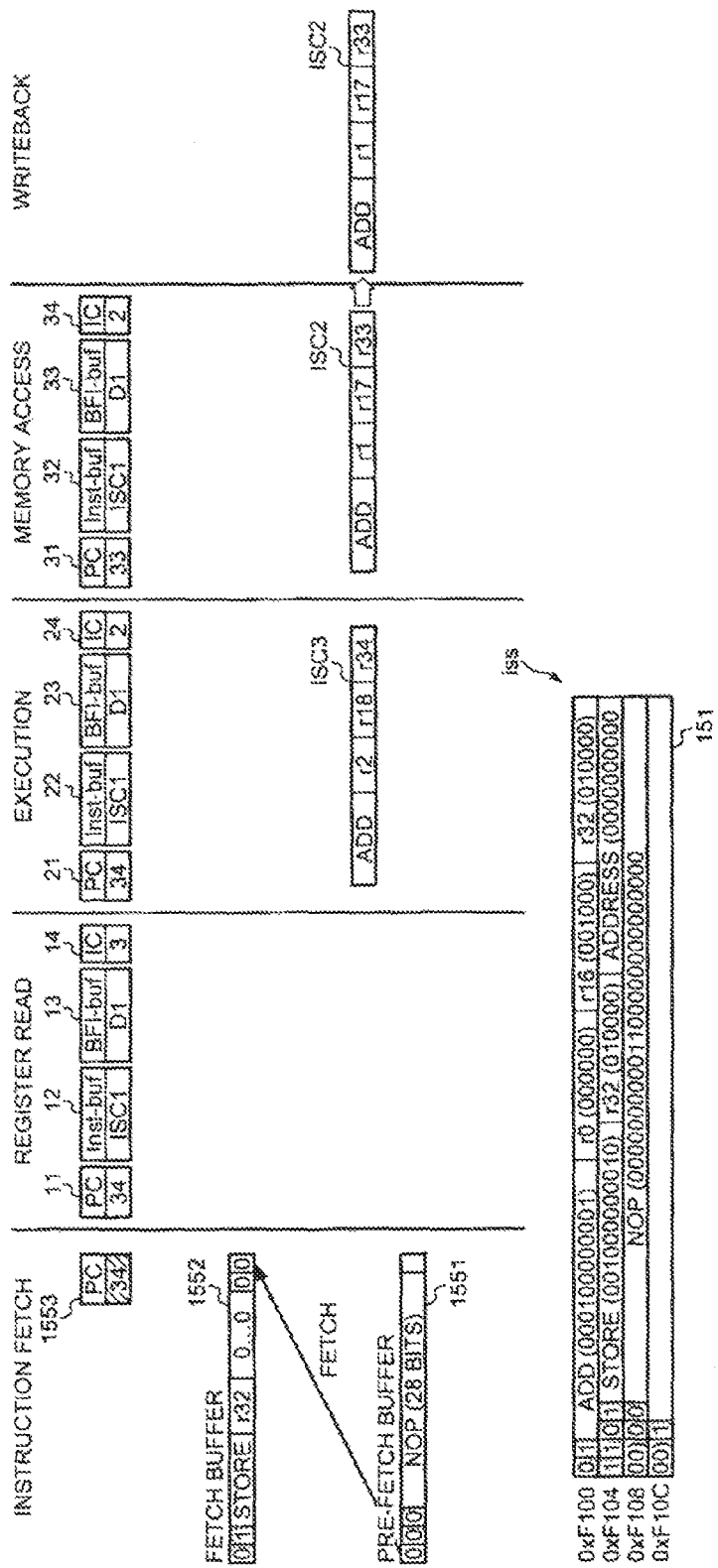

In FIG. 29, since 1 bit has become empty consequent to the transfer of the 1-bit compressed instruction as depicted in FIG. 28, the fetch controller 155 shifts the bit string (31 bits) remaining in the fetch buffer by 1 bit, and fetches and holds in the empty area (1 bit), the head bit of the prefetch buffer 1551. At the memory access unit 158, when the instruction code ISC2 is processed, processing (writeback) other than commit stage processing is performed.

Figure 30:
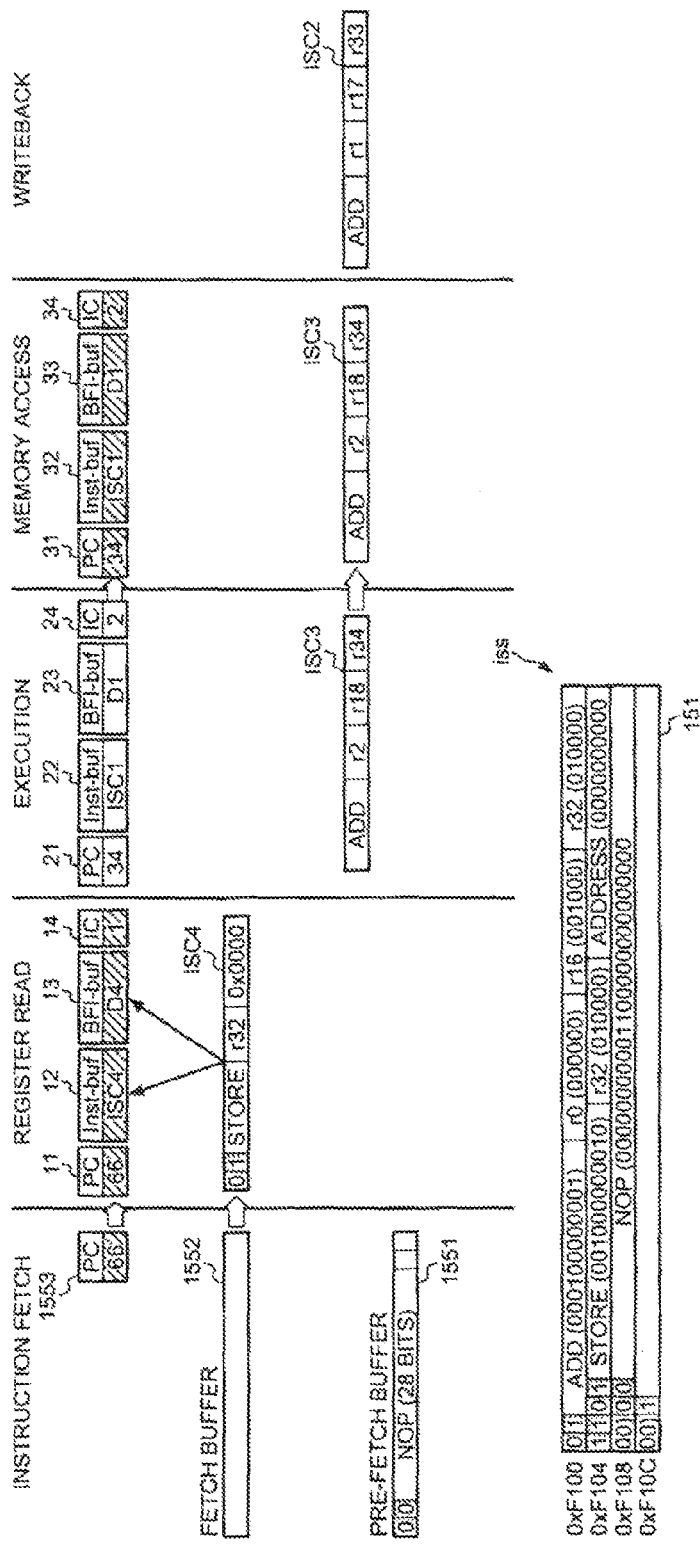

In FIG. 30, the fetch controller 155 determines whether the bit string in the fetch buffer is a non-compressed instruction. In the case of this bit string, since the head bit is "0", the bit string in the fetch buffer 1552 is determined to be a bit string of a non-compressed instruction. In this case, the fetch controller 155 transfers the entire bit string in the fetch buffer to the decoder 156.

The fetch controller 155 updates the program counter 1553 by the number of bits transferred. In this case, since the transferred bit string is 32 bits, the value of the program counter 1553 becomes "66". The fetch controller 155 transfers the updated program counter value "66" to the upper program counter 11 of the decoder 156.

The decoder 156, upon receiving the non-compressed instruction transferred from the fetch controller 155, refers to the storage bit, which is the second bit from the head of the non-compressed instruction. In this case, since the value of the storage bit is "1" (storage), the instruction code ISC4 (operation code: STORE, operands: r32, 0x0000) in the non-compressed instruction are held in the upper instruction buffer 12. The decoder 156 holds the operand pattern D4 of the instruction code ISC4 in the upper BFI register 13. The decoder 156, since a non-compressed instruction has been transferred thereto, sets the instruction counter 14 to the initial value of "1". The decoder 156 sets the program counter value "66" transferred thereto from the fetch controller 155, as the upper program counter 11 value "66".

Figure 31:
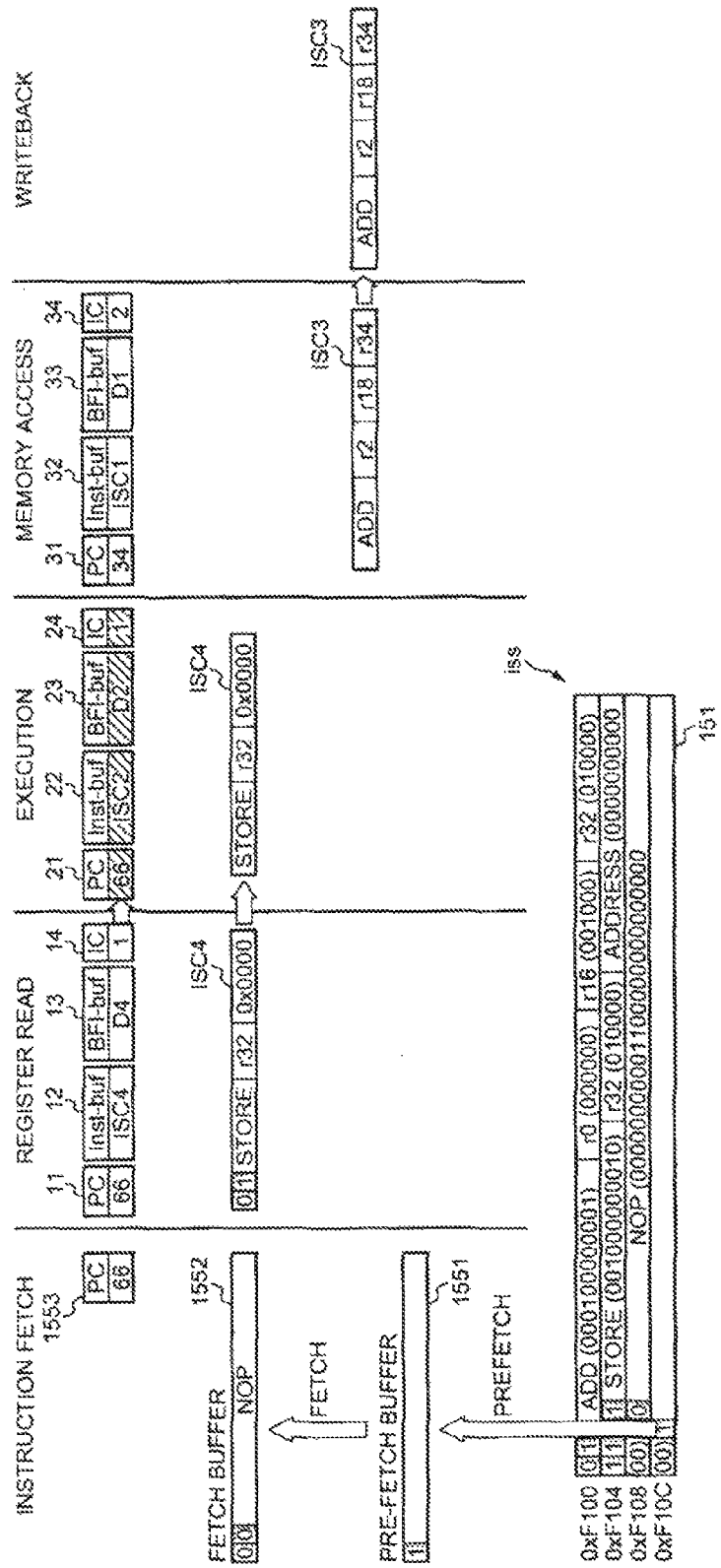

In FIG. 31, the fetch controller 155 fetches the 30-bit bit string in the prefetch buffer 1551 (see FIG. 30). The fetch controller 155 prefetches and holds in the prefetch buffer 1551, which has become empty, the bit string "001" at address 0xF160 in the instruction RAM 151. Since 2 bits have become empty in the fetch buffer, the fetch controller 155 fetches and holds in the fetch buffer, the first 2 bits "00" among the 3 bits in prefetch buffer. As a result, the instruction IS5 is fetched and held in the fetch buffer.

The decoder 156 transfers the instruction code ISC4 and the value of the upper recovery register 1541 to the executing unit 157. The executing unit 157 updates the intermediate recovery register 1542 to the values of the upper recovery register 1541. By referring to the data register 159 and the data RAM 152, the executing unit 157 executes the instruction code ISC4 transferred from the decoder 156. At the memory access unit 158, when the instruction code ISC3 is processed, processing (writeback) other than commit stage processing is performed.

Figure 32:
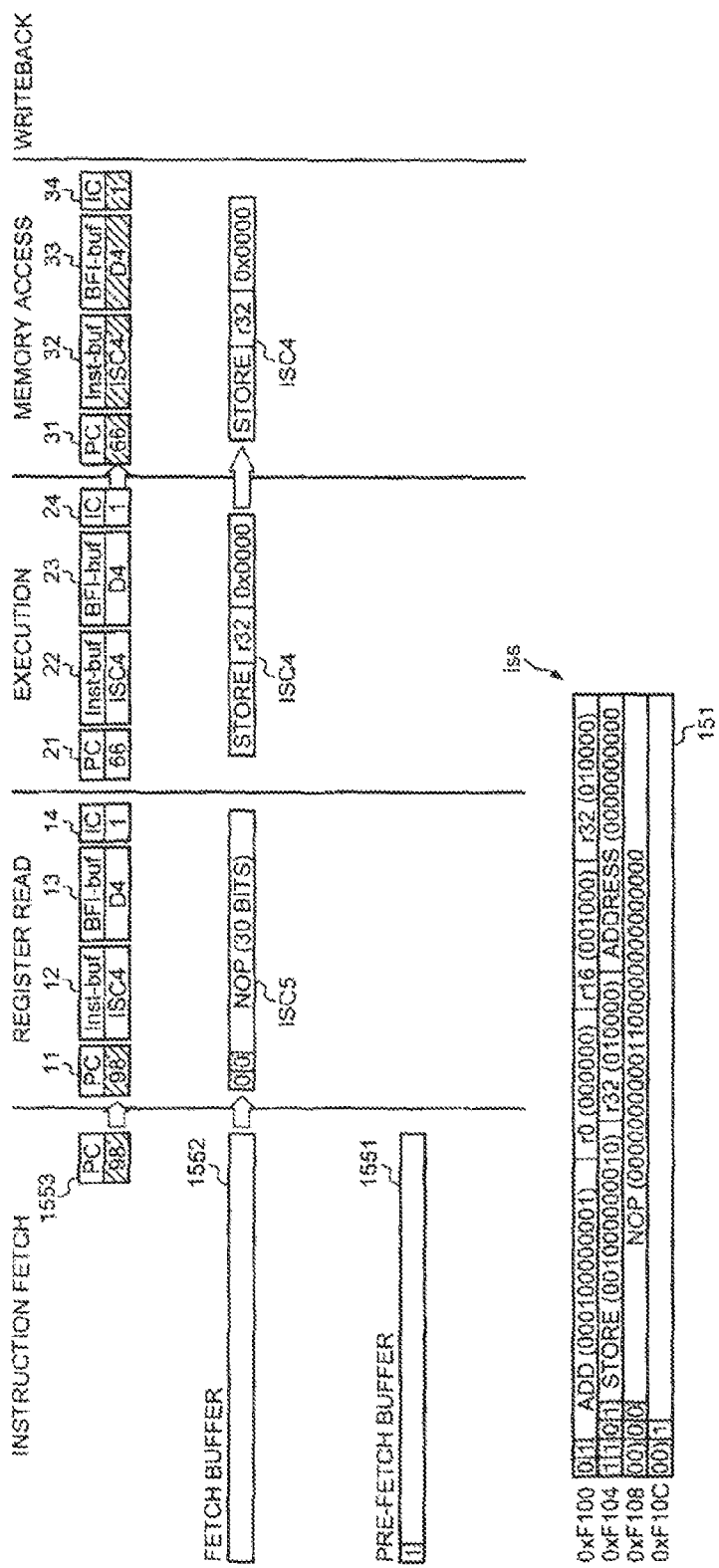

In FIG. 32, the fetch controller 155 determines whether the bit string (instruction IS5) of address 0xF160 and held in the fetch buffer 1552 is a non-compressed instruction. In the case of the bit string of address 0xF160, since the head bit is "0", the bit string of address 0xF160 is determined to be a bit string of a non-compressed instruction (instruction IS5). In this case, the fetch controller 155 transfers the entire bit string (instruction IS5) in the fetch buffer 1552 to the decoder 156.

The fetch controller 155 updates the program counter by the number of transferred bits. In this case, since the transferred bit string is 32 bits, the program counter value becomes "98". The fetch controller 155 transfers the updated program value "98" to the upper program counter 11 of the decoder 156.

The decoder 156, upon receiving the non-compressed instruction transferred from the fetch controller 155, refers to the storage bit, which is the second bit from the head of the non-compressed instruction (instruction IS5). In this case, since the value of the storage bit is "0" (no-storage), the instruction code ISC5 (NOP) in the non-compressed instruction is not held in the upper instruction buffer 12. Similarly, the operand pattern of the instruction code ISC5 (NOP) is not held in the upper BFI register 13.

Thus, for system instruction code such as the instruction code ISC5 (NOP), by excluding system instruction code from operand updating processing, operands can be updated from the value of the upper recovery register 1541 and the subsequent instruction code. The decoder 156, since a non-compressed instruction has been transferred thereto, sets the upper instruction counter 14 to the initial value of "1". The decoder 156 sets the program counter value "98" from the fetch controller 155, as the upper program counter 11 value "98".

The executing unit 157 transfers the instruction code ISC4 and the value of the intermediate recovery register 1542 to the memory access unit 158. The memory access unit 158 updates the lower recovery register 1543 to the values of the intermediate recovery register 1542. The memory access unit 158 accesses the data RAM 152, according to the operation code of the transferred instruction code. In the case of the instruction code ISC4, since the data RAM 152 address 0x0000 is in the operands, the data RAM 152 address 0x0000 is accessed (STORE).

Figure 33:
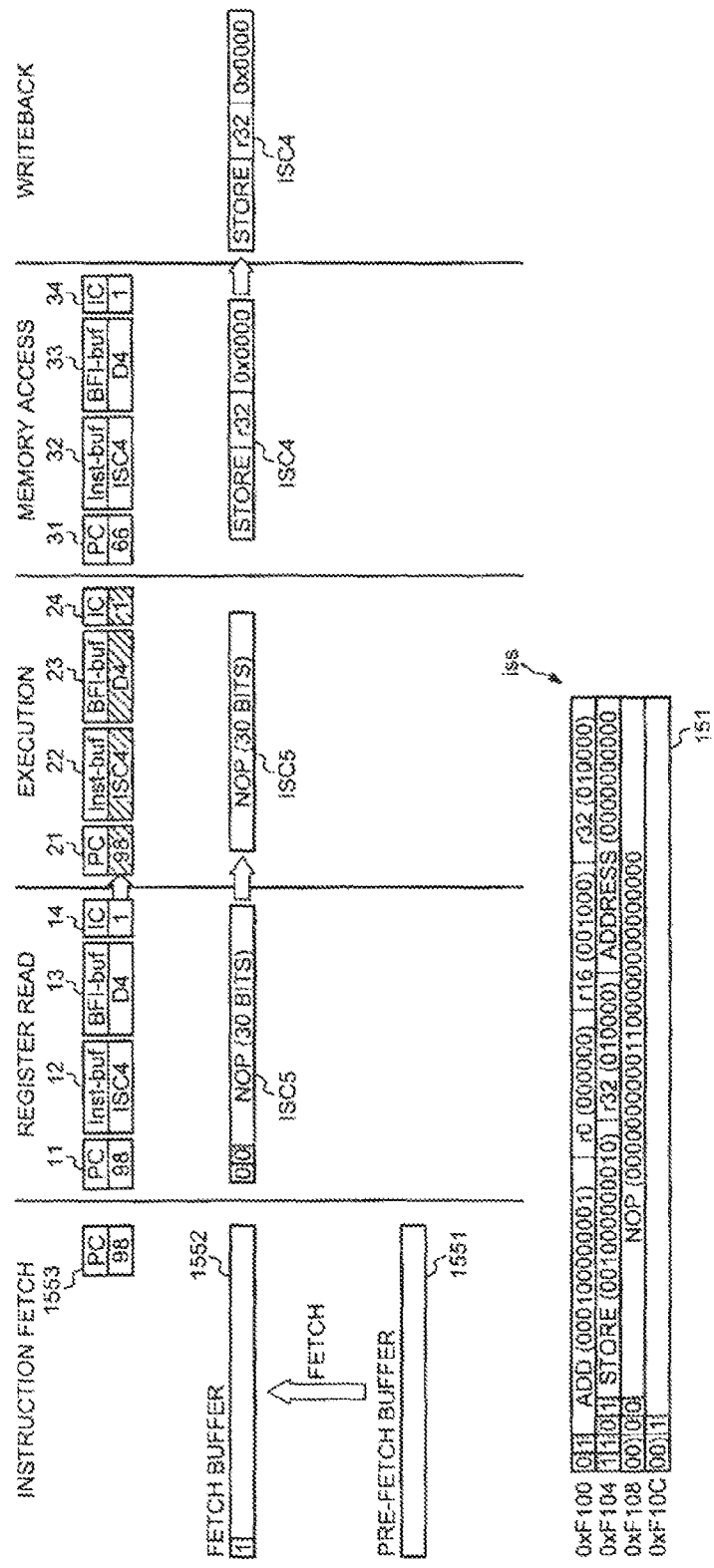

In FIG. 33, the fetch controller 155 fetches and holds in the fetch buffer 1552, which has become empty, the bit string (1 bit) in the prefetch buffer 1551. The decoder 156 transfers the instruction code ISC5 and the values of the upper recovery register 1541 to the executing unit 157. The executing unit 157 updates the intermediate recovery register 1542 to the values of the upper recovery register 1541. The executing unit 157, since the instruction code ISC5 transferred from the decoder 156 is NOP, does nothing. At the memory access unit 158, when the instruction code ISC4 is processed, processing (writeback) other than commit stage processing is performed.

Figure 34:
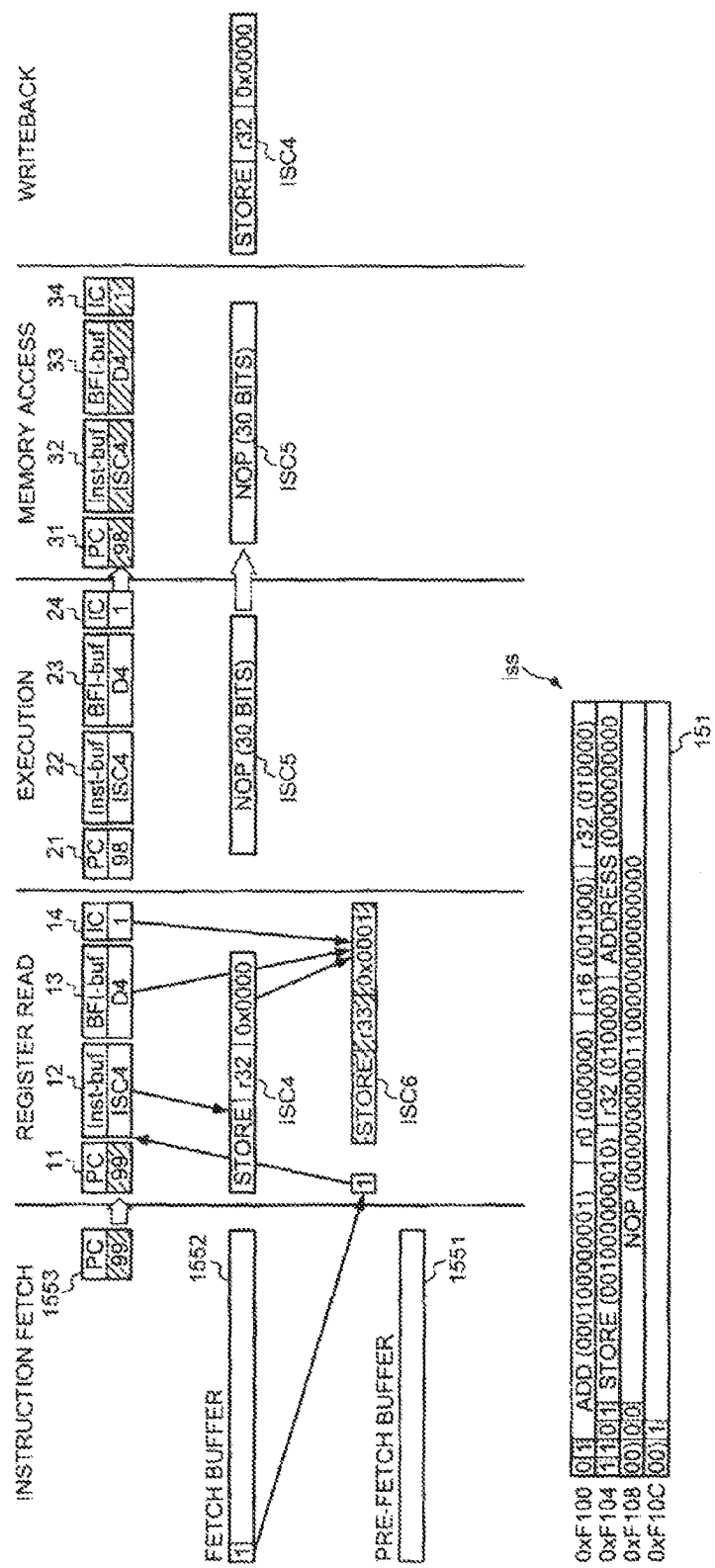

In FIG. 34, the fetch controller 155 determines whether the bit string in the fetch buffer 1552 is a non-compressed instruction. In the case of this bit string, since the head bit is "1", the head bit of the bit string held in the fetch buffer 1552 is determined to be a compressed instruction. In this case, the fetch controller 155 transfers the head bit (=1) in the fetch buffer 1552 to the decoder 156.

The fetch controller 155 updates the program counter 1553 by the number of transferred bits. In this case, since the transferred bit string is the head bit (1 bit), the value of the program counter 1553 becomes "99". The fetch controller 155 transfers the updated program counter 1553 value "99" to the upper program counter 11 of the decoder 156.

The decoder 156, upon receiving the compressed instruction transferred from the fetch controller 155, reads out the instruction code ISC4 held in the upper instruction buffer 12, the operand pattern D4 held in the upper BFI register 13, and the value "1" of the instruction counter 14. The decoder 156, via the operand updater 1600, updates the operand of the read instruction code ISC4, whereby the decoder 156 restores the original instruction code ISC6 (operation code: STORE, operands: r33, 0x0001). In this case, the updated operand becomes 0x0001. However, depending on the data size and/or memory size handled by the instruction, the value of the instruction counter 14 may be multiplied by a coefficient by the decoder block (156).

The executing unit 157 transfers the instruction code ISC5 (NOP) and the values of the intermediate recovery register 1542 to the memory access unit 158. The memory access unit 158 updates the lower recovery register 1543 to the values of the intermediate recovery register 1542. The memory access unit 158 accesses the data RAM 152, according to the transferred operation code of the instruction code. In the case of instruction code ISC5, since the instruction code is NOP nothing is done.

Figure 35:
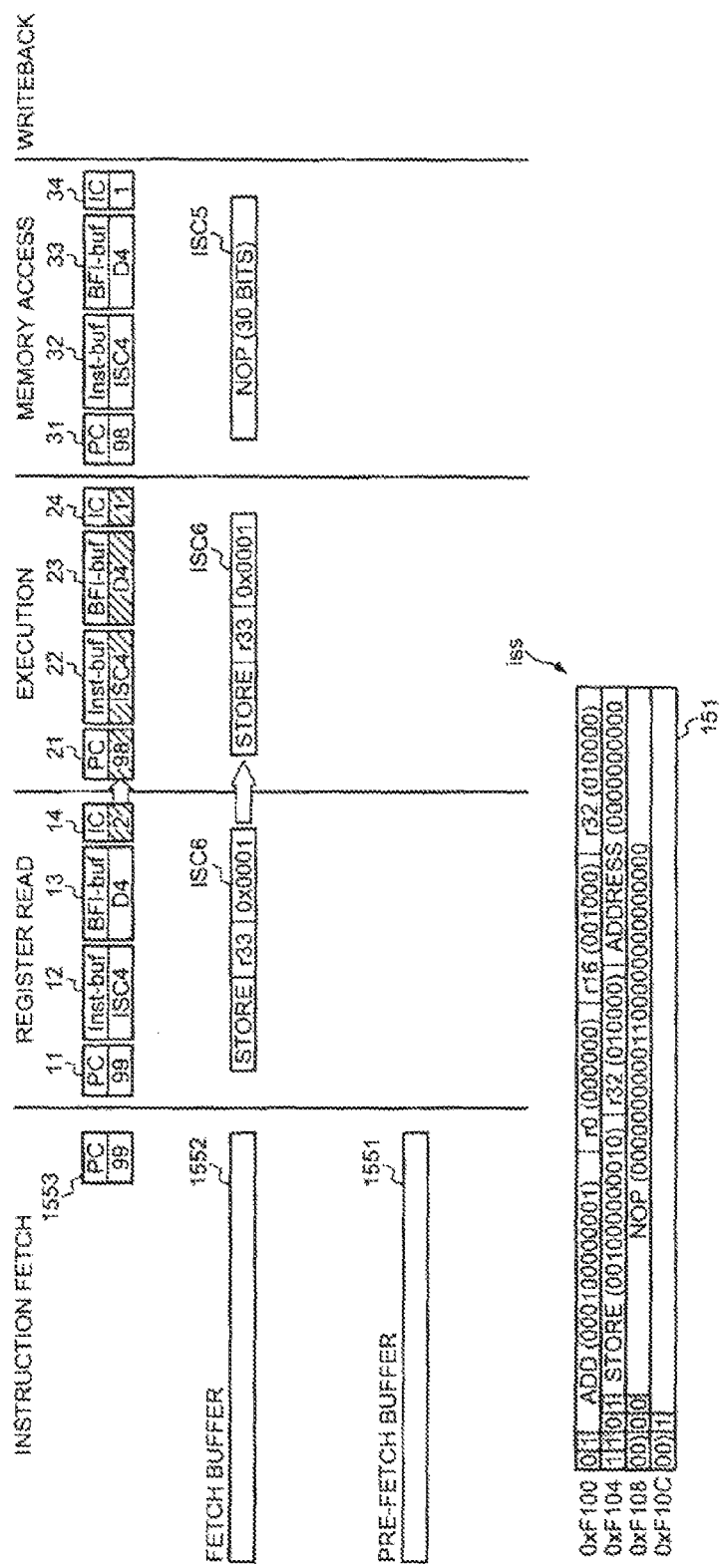

In FIG. 35, the decoder 156 transfers the restored instruction code ISC6 and the value of the upper recovery register 1541 to the executing unit 157. The decoder 156, after the transfer, increments the value of the upper instruction counter 14 by 1. The executing unit 157 updates the intermediate recovery register 1542 to the values of the upper recovery register 1541. Accordingly, the values of the upper recovery register 1541 and the values of the intermediate recovery register 1542 differ for the value "2" of the upper instruction counter 14 and the value "1" of the intermediate counter 24. By referring to the data register 159 and the data RAM 152, the executing unit 157 executes the instruction code ISC6 transferred from the decoder 156.

Figure 36:
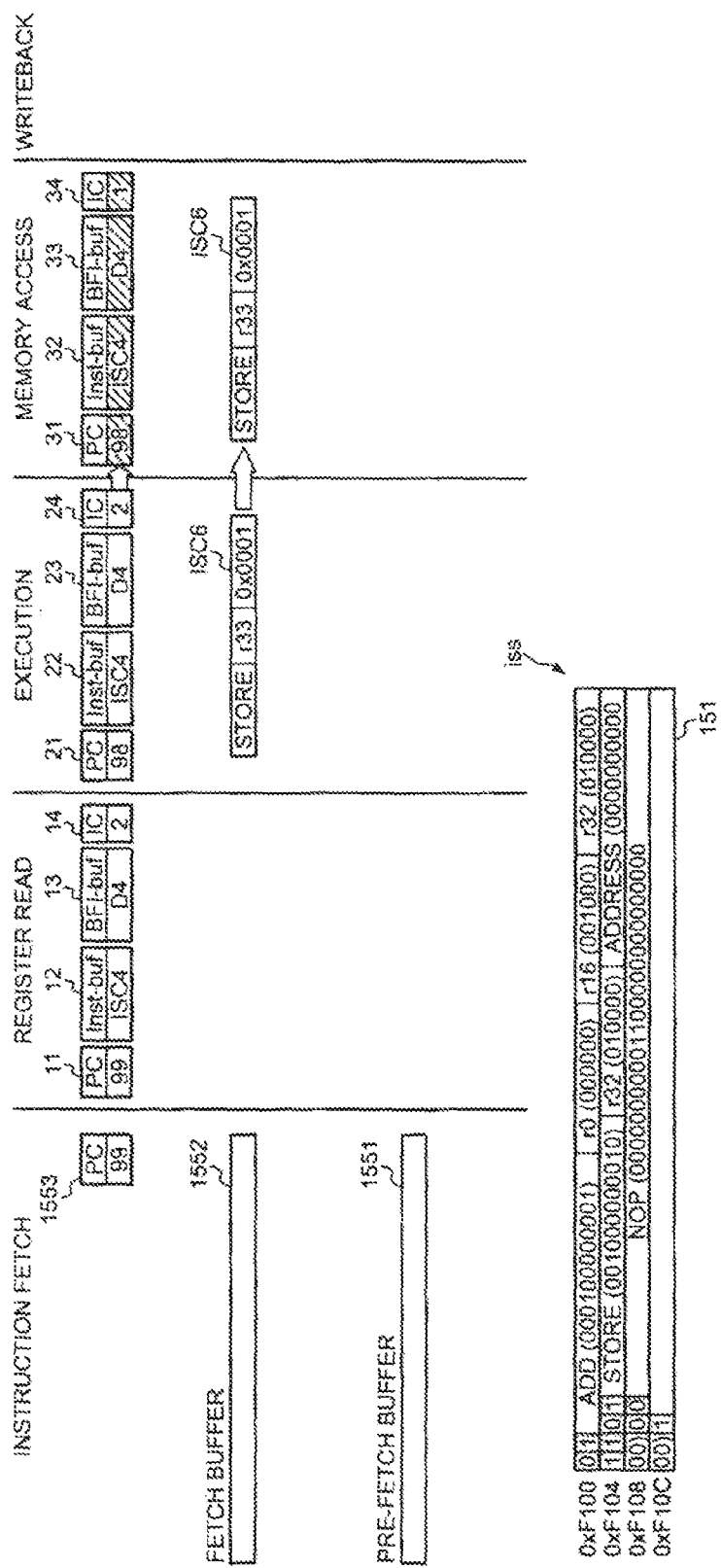

In FIG. 36, the executing unit 157 transfers the instruction code ISC6 and the values of the intermediate recovery register 1542 to the memory access unit 158. The memory access unit 158 updates the lower recovery register 1543 to the values of the intermediate recovery register 1542. The memory access unit 158 accesses the data RAM 152, according to the operation code of the transferred instruction code. In the case of the instruction code ISC6, since the data RAM 152 address 0x0001 is in the operands, the data RAM 152 address 0x0001 is accessed (STORE). At the memory access unit 158, when the instruction code ISC6 is processed, processing (writeback) other than commit stage processing is performed.

Thus, the compressed instruction sequence iss is pipeline processed, whereby the compressed instruction is restored by the decoder 156. Accordingly, the processor 102 can execute the same instructions as the instruction sequence before compression. Further, since the compressed instruction sequence iss includes compressed instructions, the number of fetches from the instruction RAM 151 can be reduced. In other words, since the number of memory access to the instruction RAM 151 is reduced, reduced power consumption can be facilitated.

Recovery processing from an interrupt occurring during the instruction execution depicted in FIGS. 20 to 36, will be described. When an interrupt occurs, the processor 102 completes commit state transition processing (writeback, . . . ) and then performs interrupt processing. In this case, concerning the commit pre-stage processing, the processor 102 temporarily saves the value of the lower recovery register 1543 and executes the interrupt processing. When the interrupt processing ends, the processor 102 uses the saved value of the lower recovery register 1543 and resumes the commit pre-stage processing. Hereinafter, a case where an interrupt occurs during the processing depicted in FIG. 31 will be described with reference to FIGS. 37 to 42.

FIGS. 37 to 42 are diagrams of an example of recovery processing for recovery from an interrupt. The processor 102, via the interrupt controller 1510, detects the occurrence of an interrupt by a surrounding module or a timer and upon doing so, issues via the controller 153, an interrupt signal to the fetch controller 155, the decoder 156, the executing unit 157, and the memory access unit 158.

Figure 37:
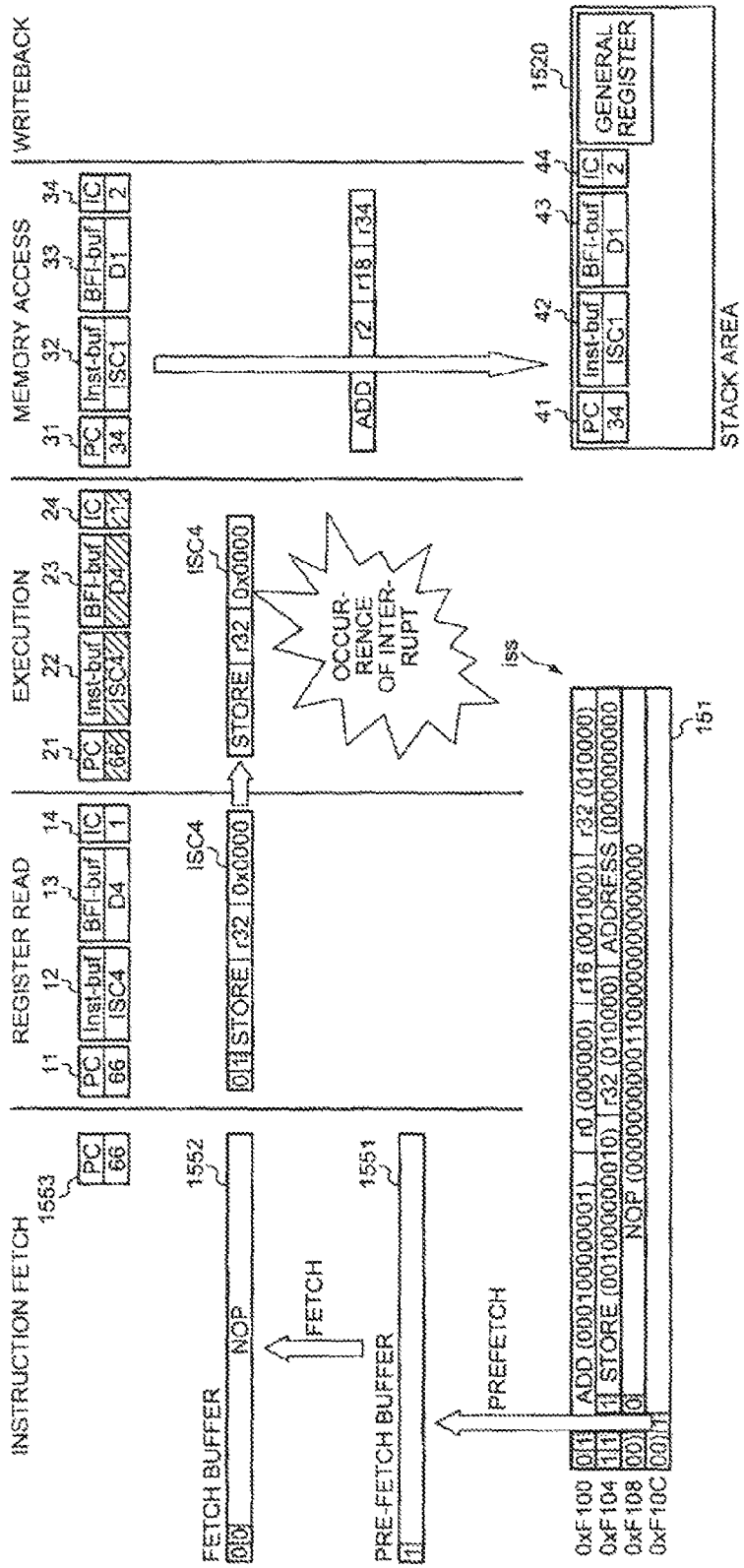
FIGS. 37 to 42 are diagrams of an example of recovery processing for recovery from an interrupt.

In FIG. 37, the memory access unit 158, upon receiving the interrupt signal, saves the value of the lower recovery register 1543 or the value of a generic register to the stack area 1520 of the data RAM 152.

Figure 38:
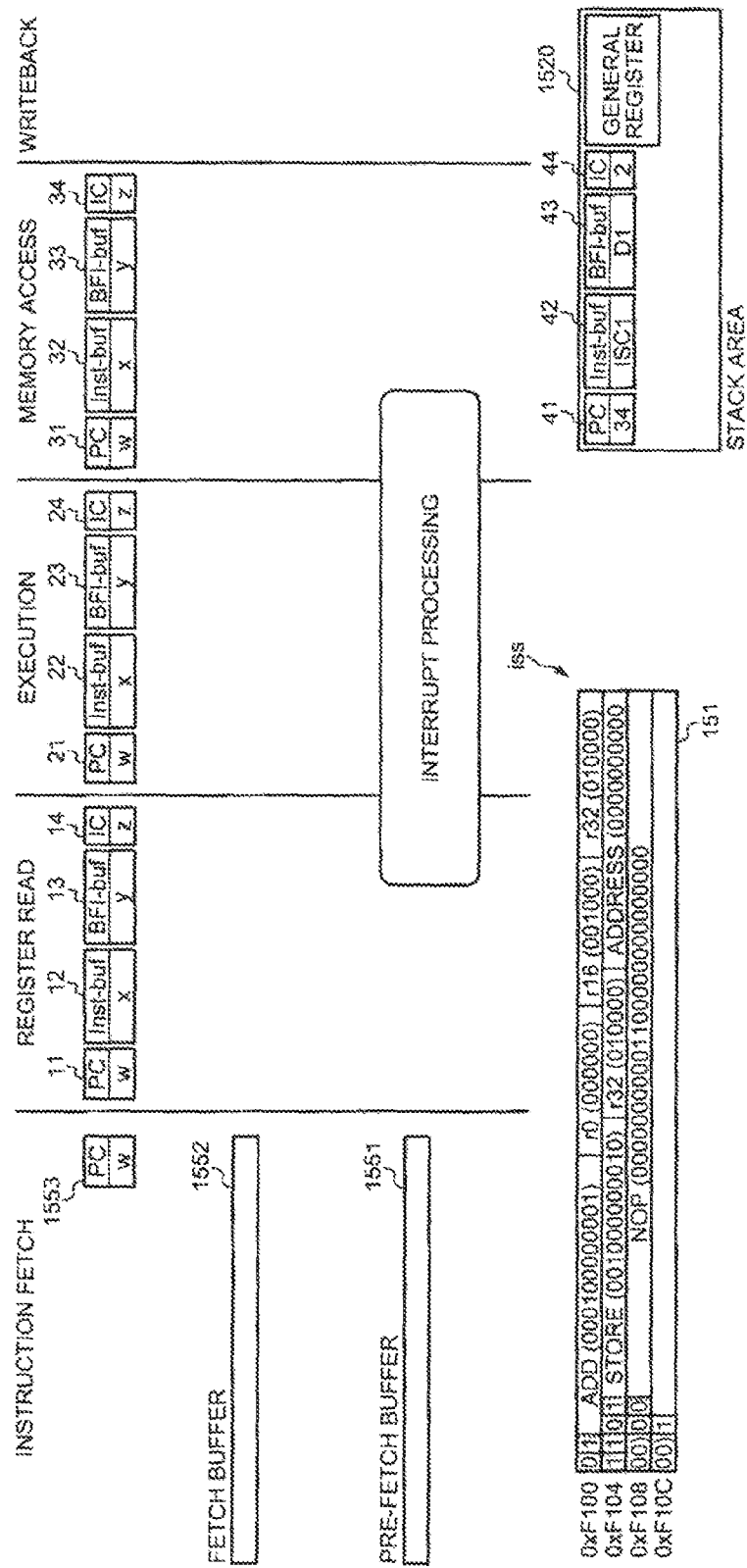

In FIG. 38, the fetch controller 155, upon receiving the interrupt signal, clears the prefetch buffer 1551 and the fetch buffer 1552, and prepares for interrupt processing. Similarly, the decoder 156, the executing unit 157, the memory access unit 158, upon receiving the interrupt signal, respectively clear the values of the upper recovery register 1541, the intermediate recovery register 1542, and the lower recovery register 1543, and prepare for interrupt processing. The processor 102 executes the interrupt processing.

Figure 39:
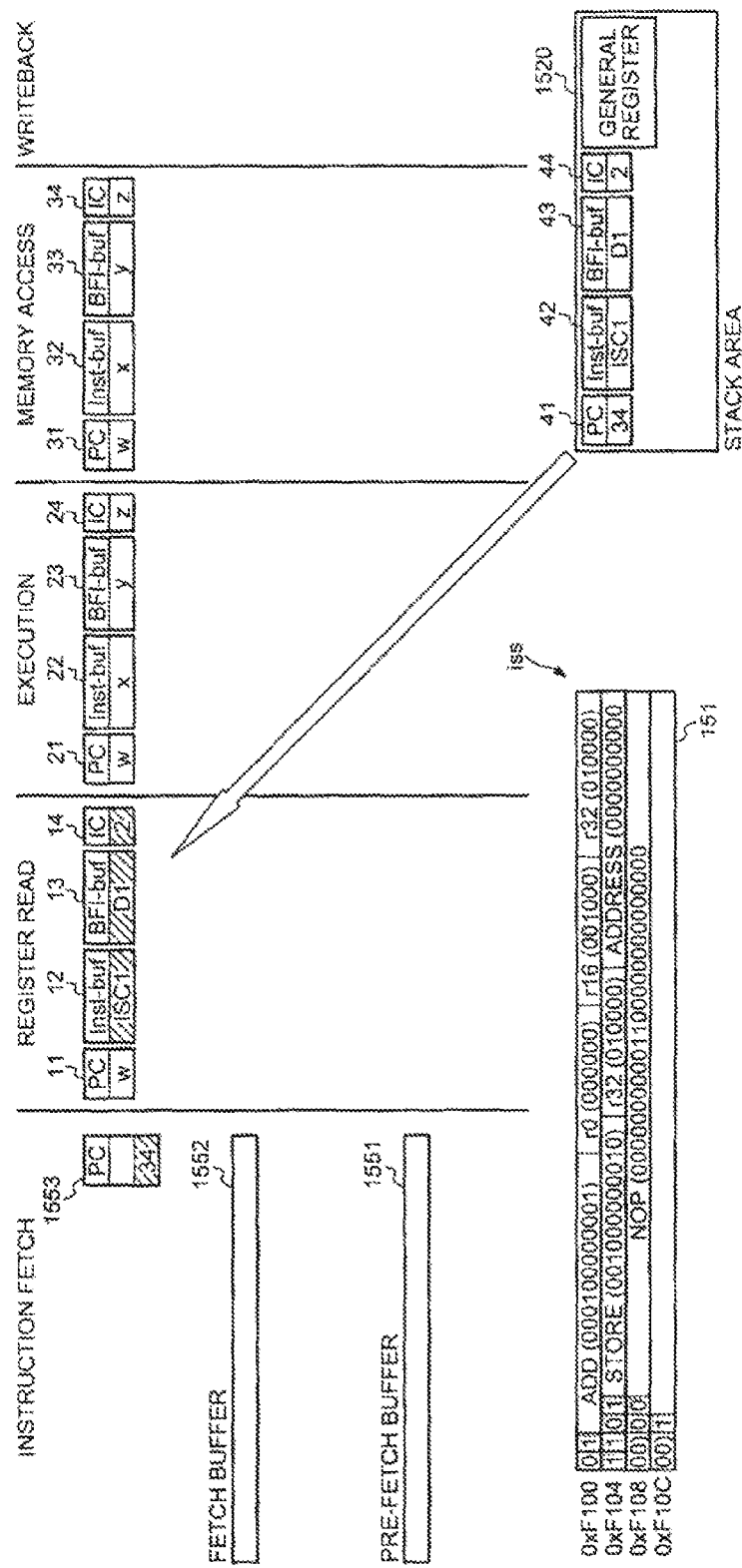

In FIG. 39, the decoder 156, upon receiving an interrupt completion signal through the interrupt controller 1510 and the controller 153, sets the lower instruction buffer 32 value (instruction code ISC1) saved in the stack area 1520, the lower BFI register 33 value (operand pattern D1), and the lower instruction counter 34 value "2" to the value of the upper instruction buffer 12, the value of the upper BFI register 13, and the value of the upper instruction counter 14, respectively. The fetch controller 155 again clears the prefetch buffer 1551 and the fetch buffer 1552, and reads in the lower program counter 31 value "34" saved in the stack area 1520.

Figure 40:
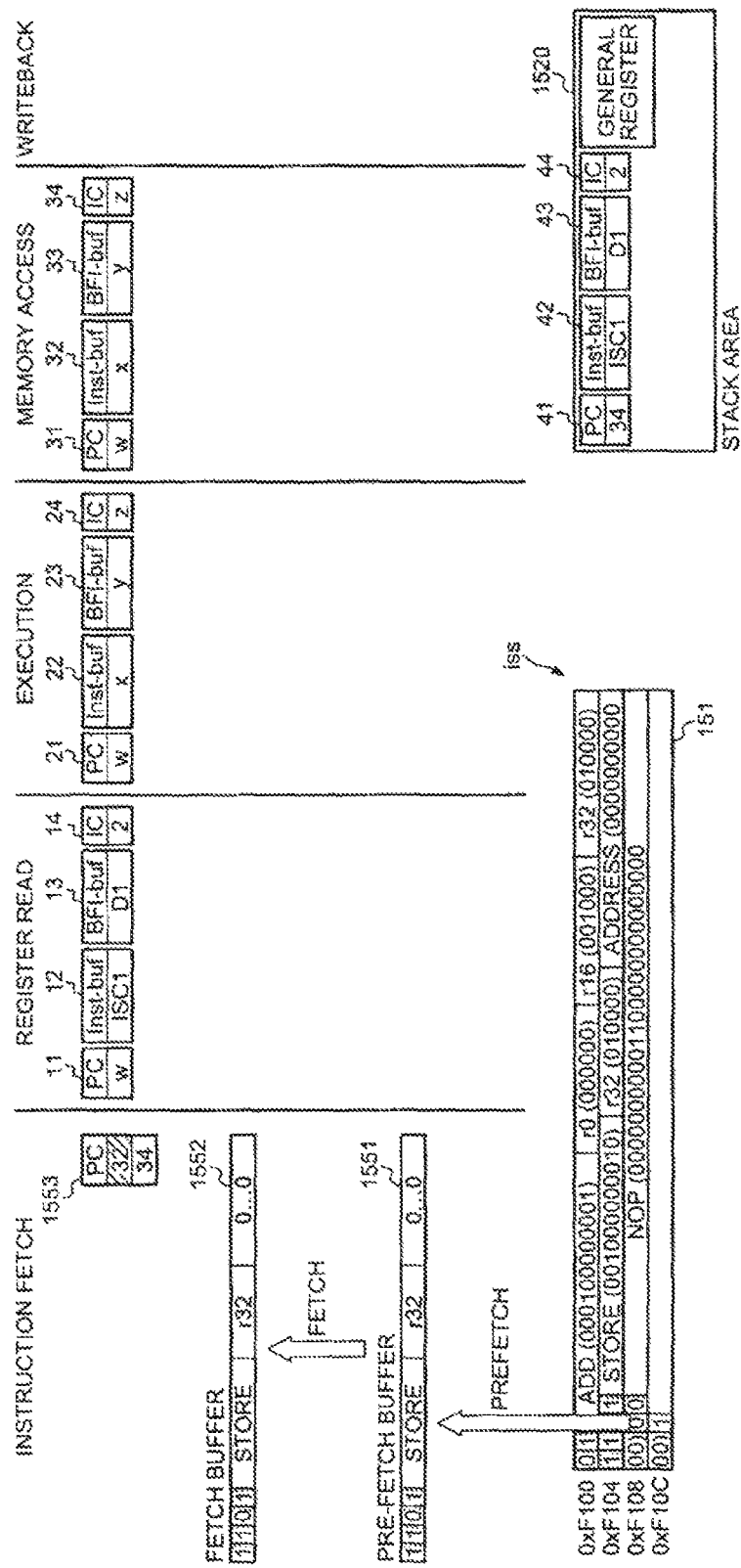

In FIG. 40, the fetch controller 155 divides the lower program counter 31 value "34" read from the stack area 1520 by the bit width (32 bits) of the fetch buffer. In this case, the quotient is "1" with a remainder of "2". The fetch controller 155 multiplies the quotient "1" by the bit width (32 bits) of the fetch buffer and thereby, identifies the bit position to be prefetched. In this case, since the quotient "1"×32 bits=32, the bit string from the 32nd bit from the head of the compressed instruction sequence, i.e., the bit string of address 0xF104 of the instruction RAM 151 is prefetched and held in the prefetch buffer 1551. The fetch controller 155 sets the program counter 1553 to "32".

Figure 41:
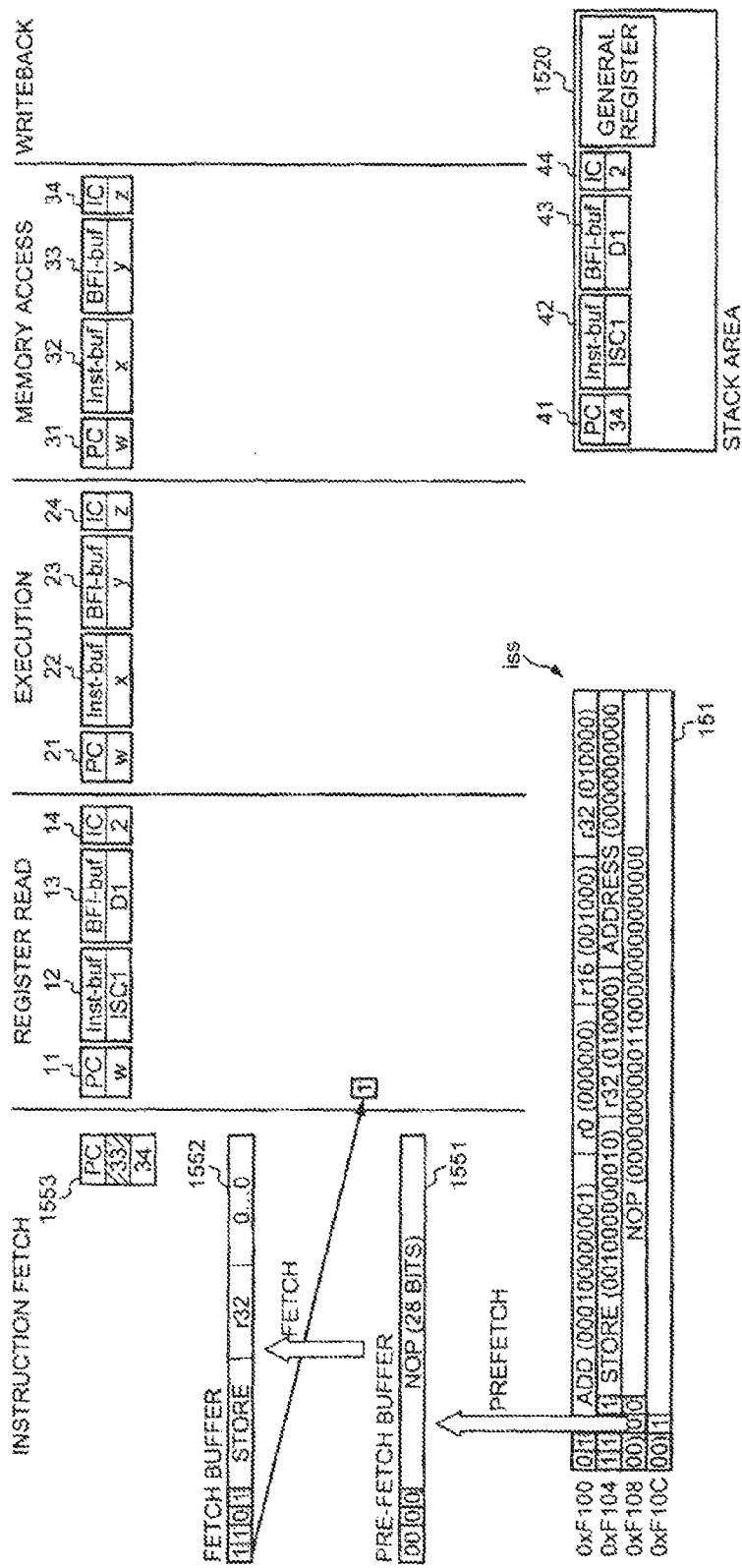

In FIG. 41, the fetch controller 155 determines whether the bit string in the fetch buffer 1552 is a non-compressed instruction. In the case of this bit string, since the head bit is "1", the head bit of the fetched bit string is determined to be a compressed instruction. In this case, the fetch controller 155 transfers the head bit in the fetch buffer 1552 to the decoder 156.

The fetch controller 155 updates the program counter 1553 by the number of bits transferred. In this case, since, the transferred bit string is 1 bit, the value of the program counter 1553 becomes "33". In this case, since this value and the lower program counter 31 value "34" saved in the stack area 1520 do not coincide, the fetch controller 155 does not transfer the updated program counter value "33" to the upper program counter 11 of the decoder 156.

The decoder 156, despite having received the compressed instruction transferred from the fetch buffer 1552, discards the compressed instruction since the value of the program counter 1553 is not received. Thus, until the value of the program counter 1553 of the fetch controller 155 and the lower program counter 31 value read from the stack area 1520 coincide, the decoder 156 discards the bit strings from the fetch buffer 1552. As a result, at an errant bit position, the instruction is not restored.

Figure 42:
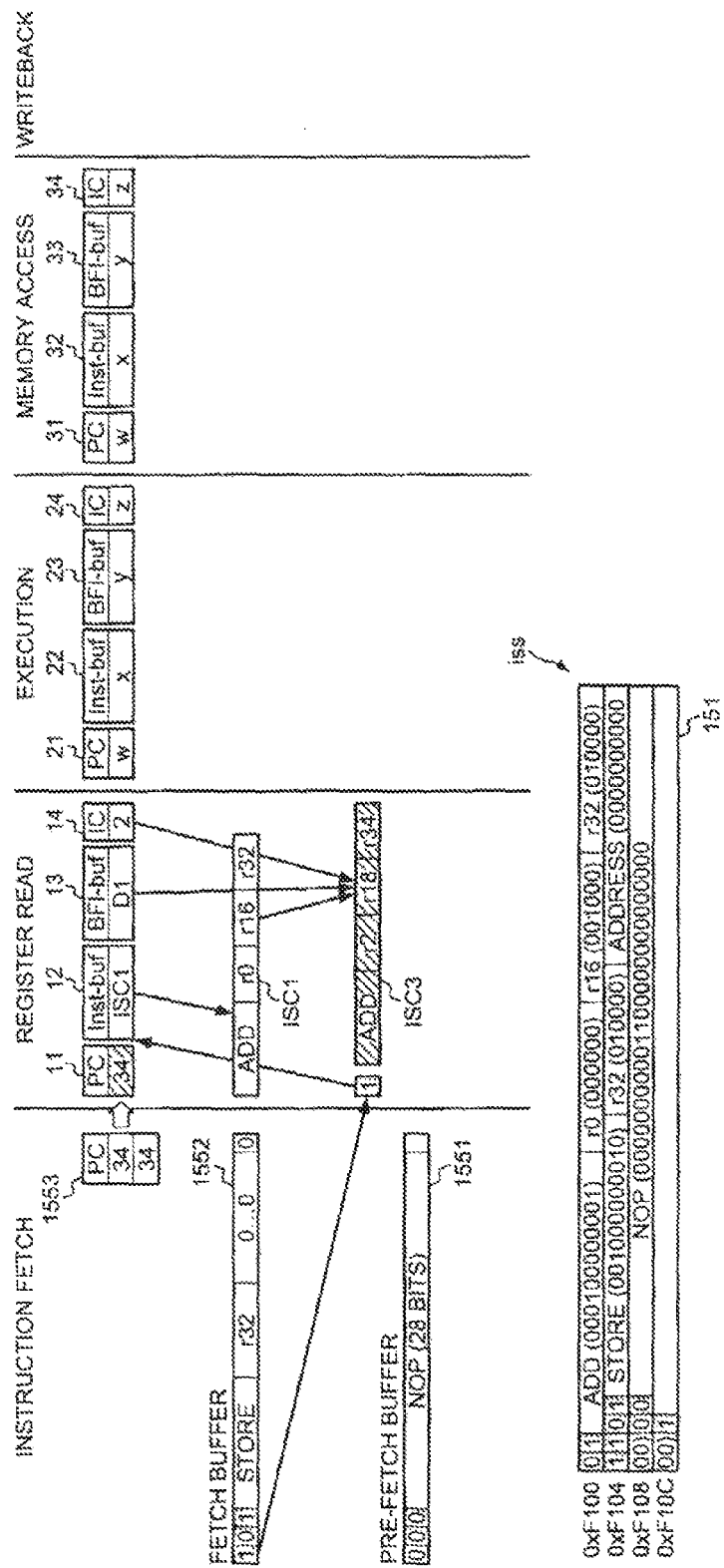

In FIG. 42, since 1 bit was transferred at the processing depicted in FIG. 40, the fetch controller 155 fetches the head bit of the prefetch buffer 1551. Subsequently, the fetch controller 155 determines whether the bit string in the fetch buffer 1552 is a non-compressed instruction. In the case of this bit string, since the head bit is "1", the head bit of the fetched bit string is determined to be a compressed instruction. In this case, the fetch controller 155 transfers the head bit in the fetch buffer 1552 to the decoder 156.

The fetch controller 155 updates the program counter 1553 by the number of transferred bits. In this case, since the transferred bit string is 1 bit, the value of the program counter 1553 becomes "34". In this case, the fetch controller 155 transfers the updated program counter 1553 value "34" to the upper program counter 11 of the decoder 156.

The decoder 156, having received the compressed instruction from the fetch buffer 1552 and the value of the program counter 1553, restores the instruction from the values of the upper recovery register 1541. Thus, the instruction code ISC2 that was processed up to the memory access unit 158 at the time of the interrupt is restored. The processing hereinafter is executed similarly to that depicted in FIGS. 28 to 36. Thus, at the proper recovery position, the instruction can be restored.

The fourth embodiment will be described. In the fourth embodiment, an example where instruction execution is performed concerning the sequence of compressed instruction groups sys depicted in FIG. 11C will be described. In the case of a sequence of compressed instruction groups sys, 1 instruction group (a non-compressed instruction group or a restored instruction group) includes N instructions (in FIG. 11A, N=4). Accordingly, the upper instruction buffer 12, the intermediate BFI register 22, and the lower instruction buffer 32 hold therein a value for each instruction. Further, in the fourth embodiment, the bit width of the prefetch buffer 1551 and the fetch buffer 1552 is assumed to be, for example, 128 bits.

Figure 43:
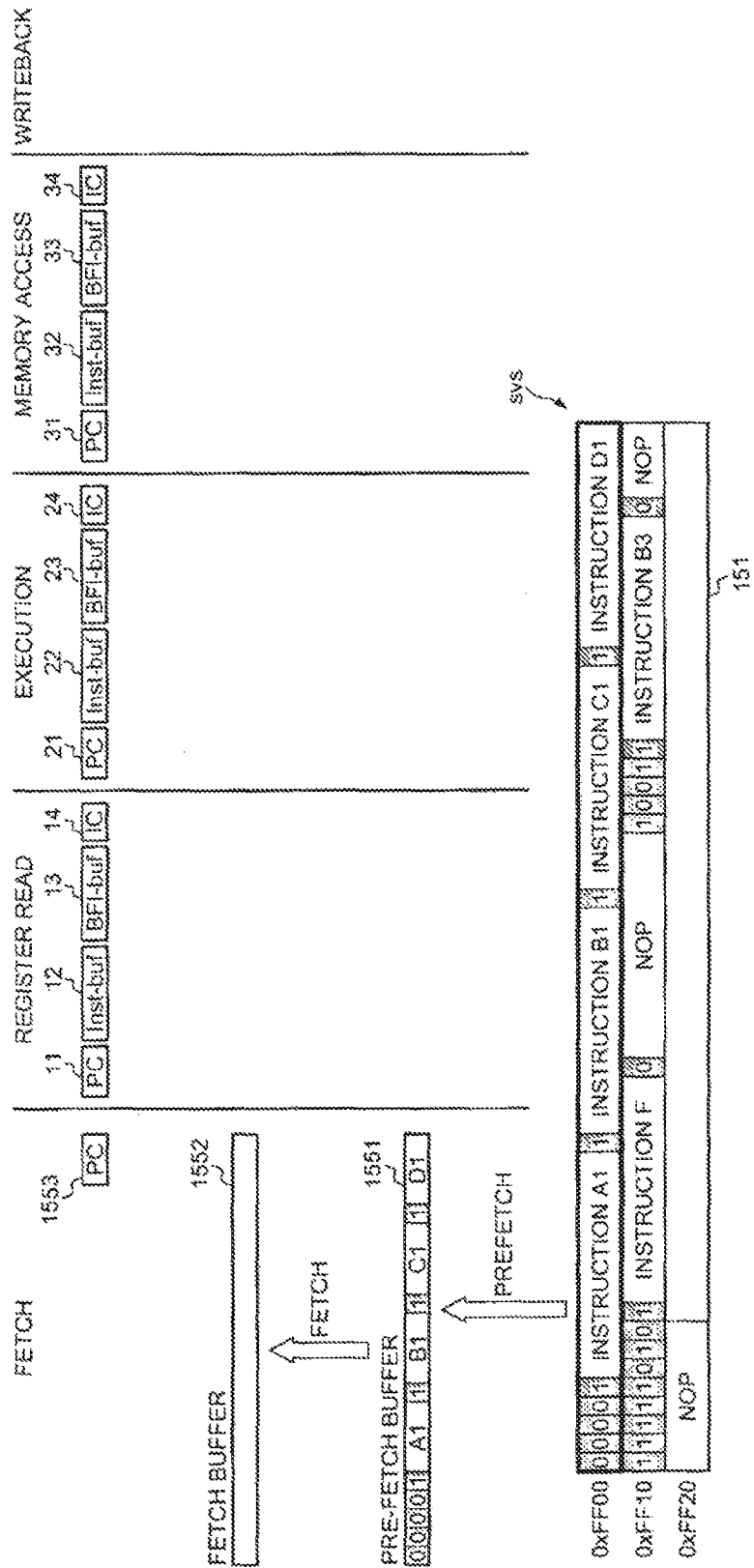
FIGS. 43 to 55 are diagrams of an example of pipeline processing according to a fourth embodiment.

FIGS. 43 to 55 are diagrams of an example of pipeline processing according to the fourth embodiment. In FIG. 43, the fetch controller 155 prefetches and holds in the prefetch buffer 1551, the bit string at address 0xFF00 in the instruction RAM 151.

Figure 44:
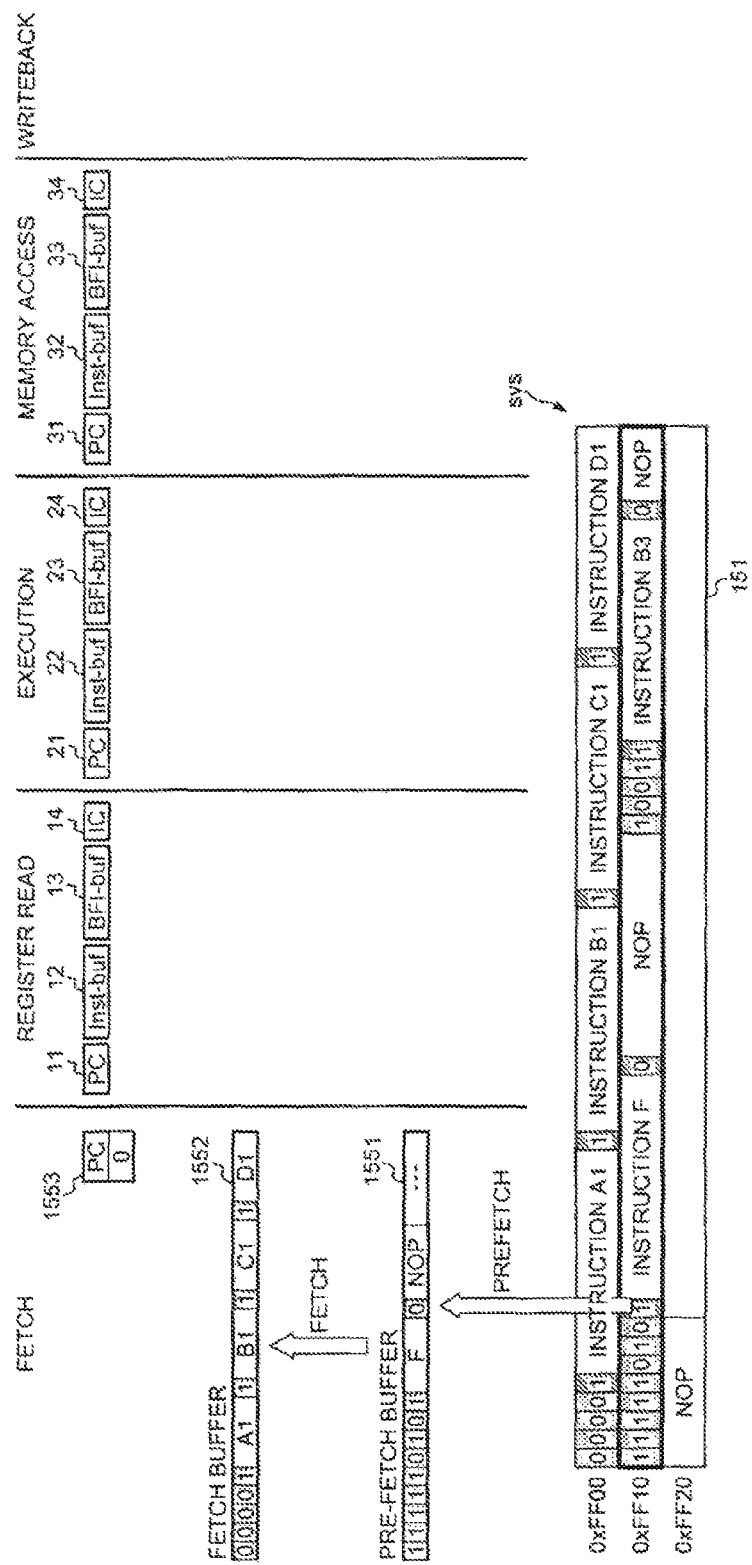

In FIG. 44, the fetch controller 155 fetches and holds in the fetch buffer, the bit string that is of address 0xFF00 of the instruction RAM 151 and that is in prefetch buffer 1551. The fetch controller 155 further prefetches and holds in the prefetch buffer 1551 that has become empty consequent to the fetching, the bit string at address 0xFF10 in the instruction RAM 151.

Figure 45:
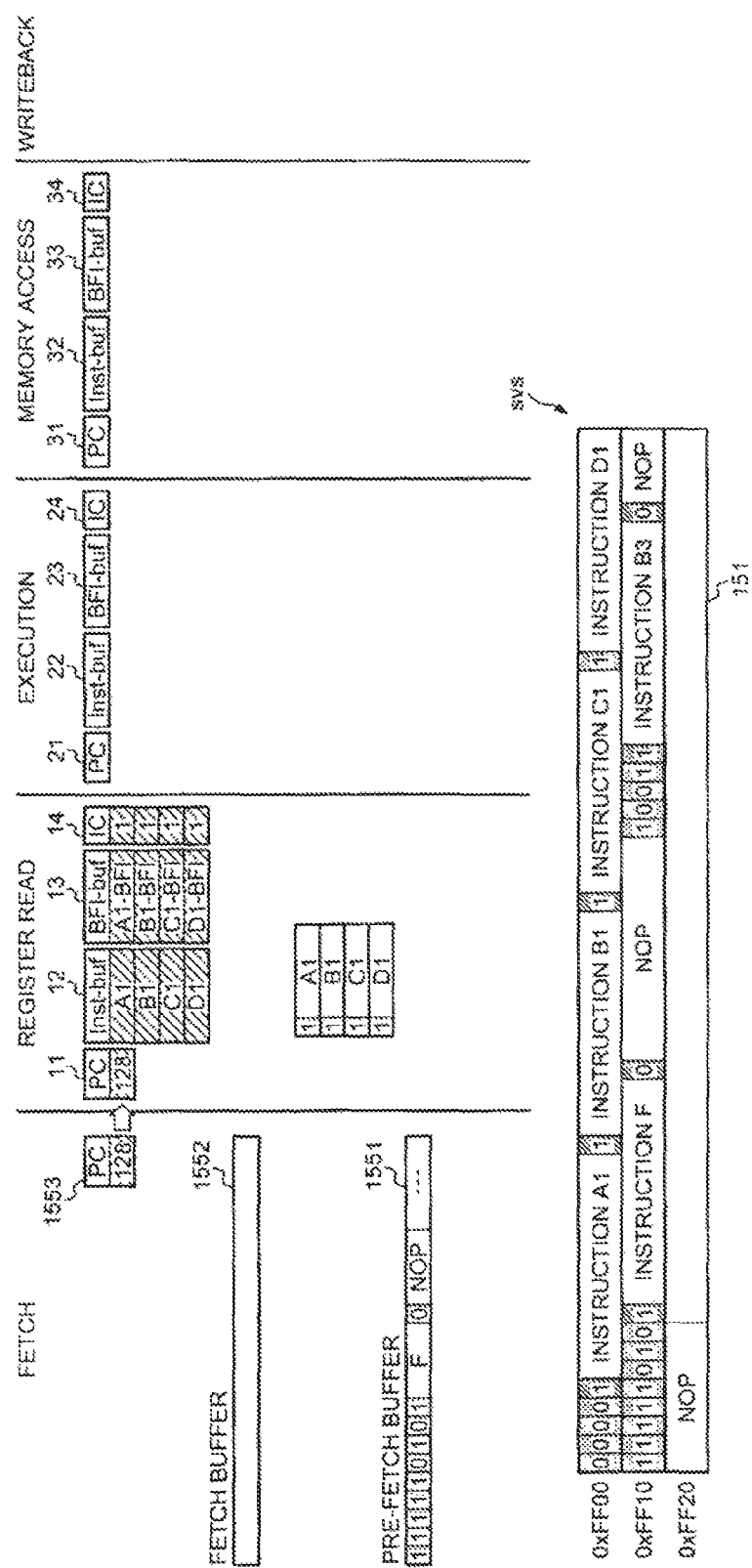

In FIG. 45, the fetch controller 155 determines whether the fetched bit string of address 0xFF00 and held in the fetch buffer 1552 is a non-compressed instruction. For example, when the first 4 bits (compression bit string) of the fetch buffer 1552 are respectively "0", the fetch controller 155 determines no-compression and when the first 4 bits are respectively "1", fetch controller 155 determines compression. In the case of the bit string at address 0xFF00, since the first 4 bits are each "0", the bit string of address 0xFF00 is determined to be a bit string of 4 non-compressed instructions. In this case, the fetch controller 155 transfers the entire bit string in the fetch buffer 1552 to the decoder 156.

The fetch controller 155 updates the program counter 1553 by the number of transferred bits. In this case, since the transferred bit string is 128 bits, the value of the program counter 1553 becomes "128". The fetch controller 155 transfers the updated program counter value "128" to the upper program counter 11 of the decoder 156.

The decoder 156, upon receiving the non-compressed instruction group transferred from the fetch controller 155, divides the non-compressed instruction group into 4 instructions. The decoder 156 refers to the storage bit (the head bit) of each resulting non-compressed instruction. In this case, since the value of the storage bit of each of the non-compressed instructions is "1" (storage), the decoder 156 holds in the upper instruction buffer 12, each of the instruction codes A1 to D1 in the non-compressed instructions.

The decoder 156 further holds in the upper BFI register 13, the operand patterns A1-BFI to D1-BFI of the instruction codes A1 to D1. The decoder 156, having received the non-compressed instructions A1 to D1, sets the instruction counter 14 for each to the initial value of "1". The decoder 156 sets the program counter value transferred from the fetch controller 155 as the upper program counter 11 value.

Figure 46:
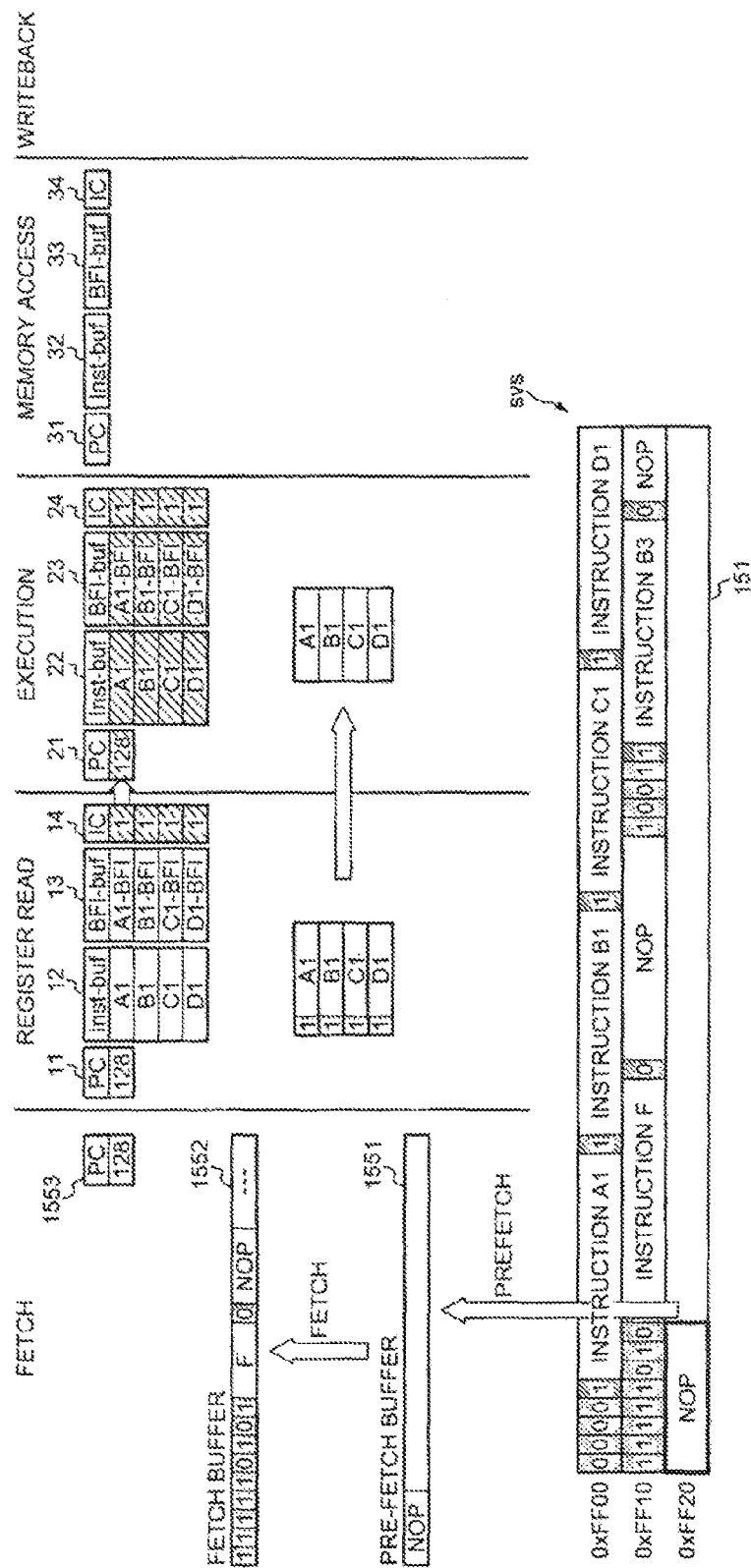

In FIG. 46, the fetch controller 155 fetches from the prefetch buffer 1551 and holds in the fetch buffer 1552, which has become empty, the bit string of address 0xFF10. The fetch controller 155 fetches and holds in the prefetch buffer 1551 that has become empty consequent to the fetching, the bit string at address 0xFF20 in the instruction RAM 151.

The decoder 156 transfers the instruction codes A1 to D1 and the value of the upper recovery register 1541 to the executing unit 157. The executing unit 157 updates the intermediate recovery register 1542 to the value of the upper recovery register 1541. By referring to the data register 159 and the data RAM 152, the executing unit 157 executes the instruction codes A1 to D1 transferred from the decoder 156.

Figure 47:
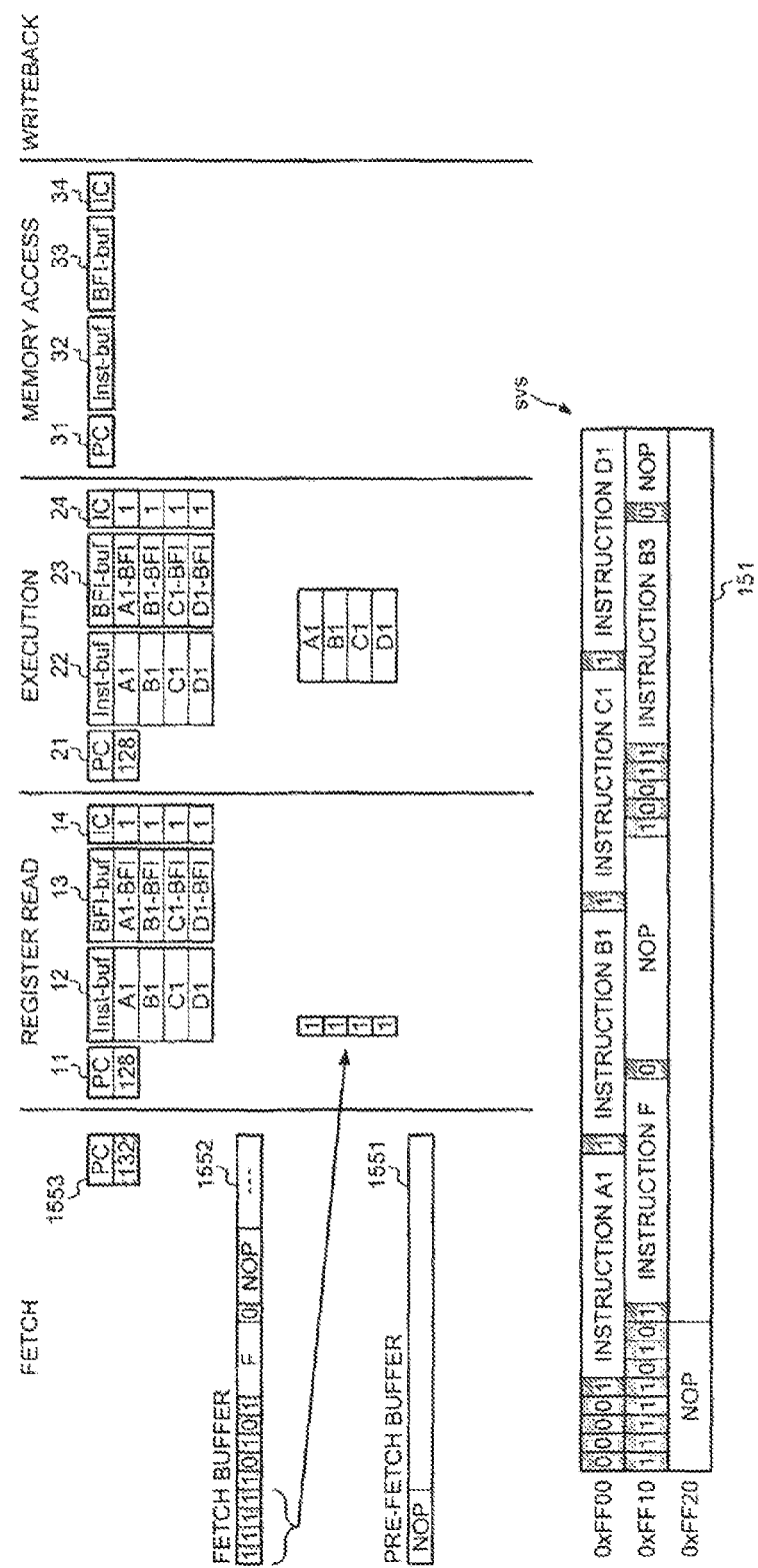

In FIG. 47, the fetch controller 155 determines whether the bit string of address 0xFF10 and held in the fetch buffer 1552 is a non-compressed instruction. In the case of the bit string of address 0xFF10, since the first 4 bits are each "1", the first 4 bits of the bit string of address 0xFF10 are determined to be a compressed instruction sequence. In this case, the fetch controller 155 transfers the first 4 bits (=1111) in the fetch buffer 1552 to the decoder 156.

The fetch controller 155 updates the program counter by the number of bits transferred. In this case, since the transferred bit string is the first 4 bits, the value of the program counter becomes "132". The fetch controller 155 transfers the updated program counter value "132" to the upper program counter 11 of the decoder 156.

Figure 48:
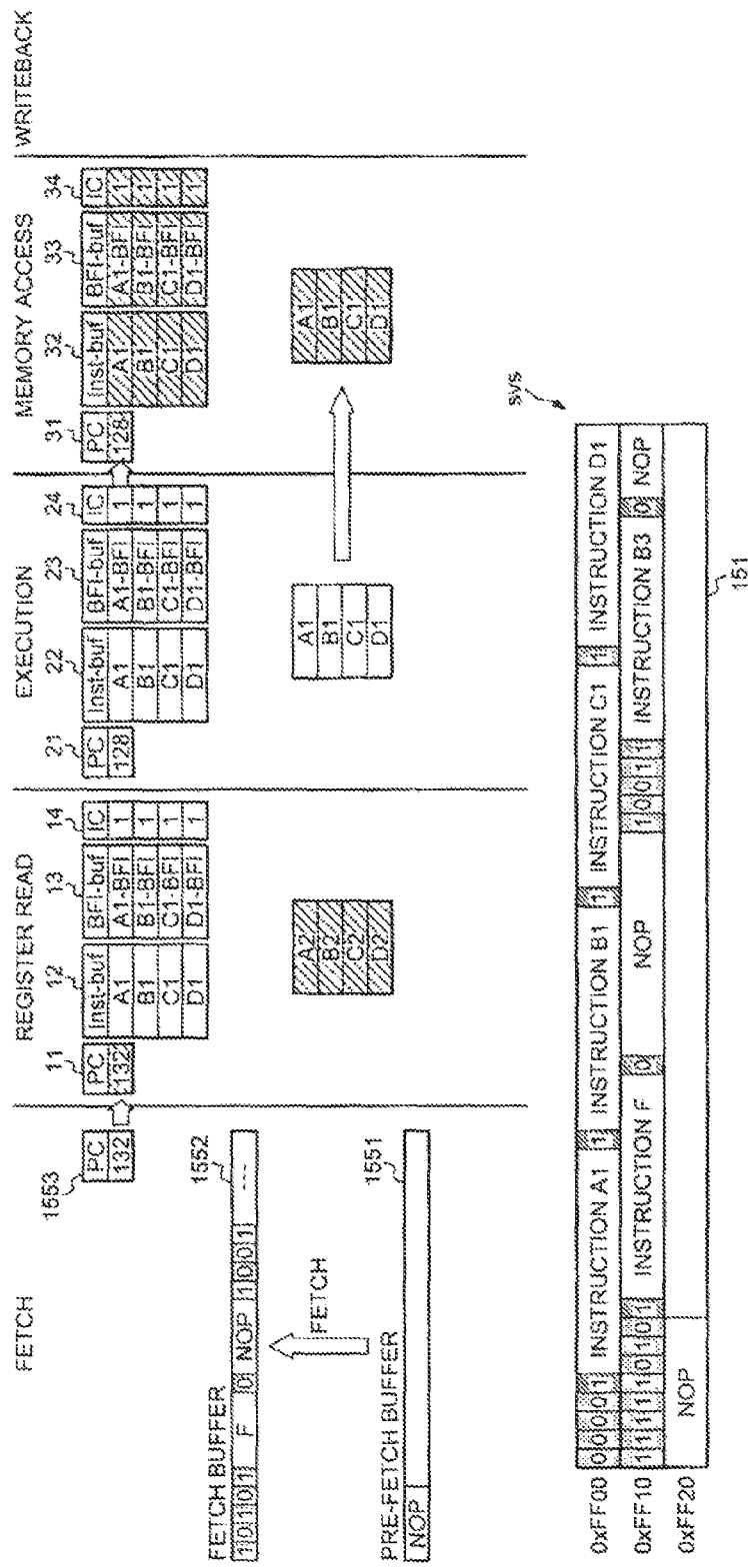

In FIG. 48, since 4 bits have become empty consequent to the transfer of the 4 compressed instruction sequences as depicted in FIG. 47, the fetch controller 155 shifts the bit string (124 bits) remaining in the fetch buffer by 4 bits, and fetches and holds in the empty area (4 bits), the first 4 bits of the prefetch buffer 1551.

The decoder 156, upon receiving the compressed instruction sequences from the fetch controller 155, reads out for each instruction, the instruction codes A1 to D1 held in the upper instruction buffer 12, the operand patterns A1-BFI to D1-BFI held in the BFI register, and the instruction counter value "1". The decoder 156, via the operand updater 1600, updates the operands of the instruction codes A1 to D1 for each instruction code, whereby the decoder 156 restores the original instruction codes A2 to D2.

The executing unit 157 transfers the instruction codes A1 to D1 and the values of the intermediate recovery register 1542 to the memory access unit 158. The memory access unit 158 updates the lower recovery register 1543 to the values of the intermediate recovery register 1542. The memory access unit 158 further accesses the data RAM 152, according to the operation code of the transferred instruction codes A1 to D1.

Figure 49:
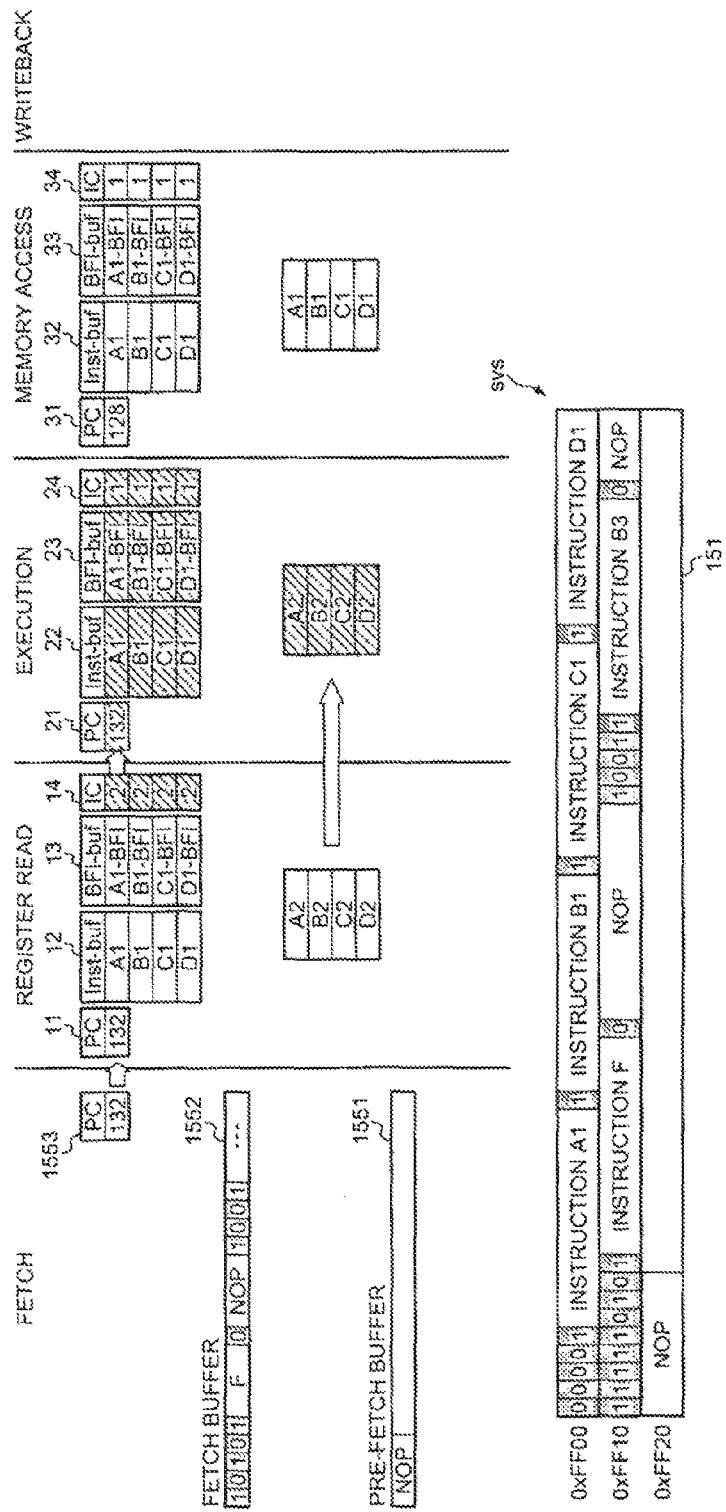

In FIG. 49, the decoder 156 transfers the restored instruction codes A2 to D2 and the value of the upper recovery register 1541 to the executing unit 157. The decoder 156, after the transfer, increments the upper instruction counters 14 by 1. The executing unit 157 updates the intermediate recovery register 1542 to the values of the upper recovery register 1541. Accordingly, the values of the upper recovery register 1541 and the values of the intermediate recovery register 1542 differ for only the upper instruction counter 14 value "2" and the intermediate instruction counter 24 value "1". By referring to the data register 159 and the data RAM 152, the executing unit 157 executes the instruction codes A2 to D2 transferred from the decoder 156.

Figure 50:
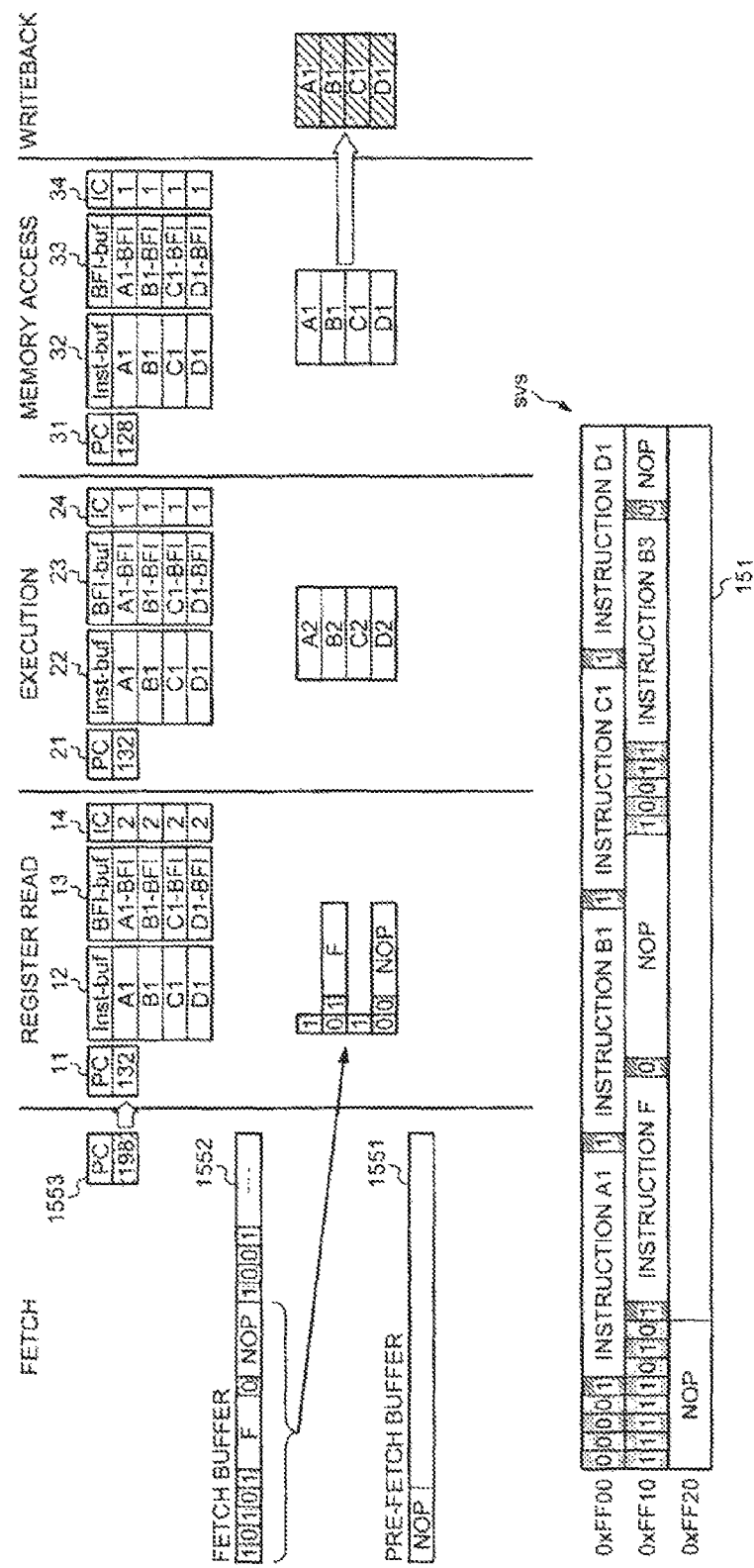

In FIG. 50, the fetch controller 155 determines whether the bit string in the fetch buffer 1552 is a non-compressed instruction group. In the case of this bit string, since the first 4 bits are "1010", the first bit and the third bit of the bit string held in the fetch buffer 1552 are determined to be compressed instructions. The second instruction is a non-compressed instruction concatenated to a bit string "1 F" that is subsequent to the first 4 bits. The fourth instruction is a non-compressed instruction concatenated to a bit string "0 NOP" that is subsequent to the first 4 bits.

The fetch controller 155 updates the program counter 1553 by the number of transferred bits. In this case, since the transferred bit string is 66 bits, the value of the program counter 1553 becomes "198". The fetch controller 155 transfers the updated program counter 1553 value "198" to the upper program counter 11 of the decoder 156. At the memory access unit 158, when the instruction codes A1 to D1 are processed, processing (writeback) other than the commit state processing is performed.

Figure 51:
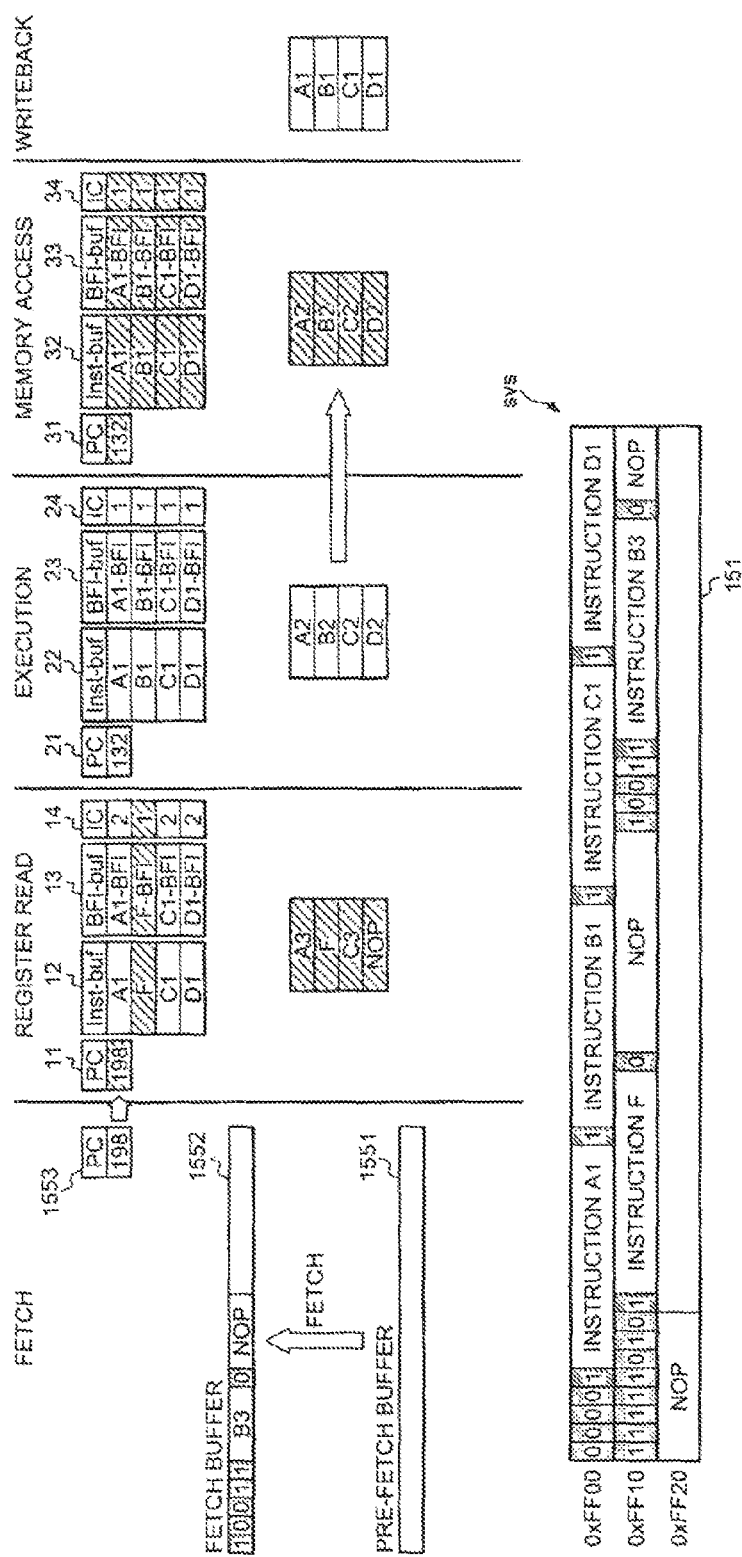

In FIG. 51, the fetch controller 155 performs a shift of 66 bits (the number of bits transferred to the decoder 156) toward the head. The decoder 156, with respect to the first and the third instructions, uses the values of the upper instruction buffer 12, the upper BFI register 13, and the upper instruction counter 14 to restore the original instructions A3, sC3. Further, with respect to the second and the fourth instructions, the decoder 156 refers to storage bits. The storage bit in the second instruction is "1" and thus, the decoder 156 updates the values of the upper instruction buffer 12, the upper BFI register 13; and the upper instruction counter 14.

The storage bit in the fourth instruction is "0" and thus, the decoder 156 does not update the values of the upper instruction buffer 12, the upper BFI register 13, and the upper instruction counter 14 with respect to the instruction code NOP.

The executing unit 157 transfers the instruction codes A2 to D2 and the value of the intermediate recovery register 1542 to the memory access unit 158. The memory access unit 158 updates the lower recovery register 1543 to the value of the intermediate recovery register 1542. The memory access unit 158 further accesses the data RAM 152, according to the operation code of the transferred instruction code.

Figure 52:
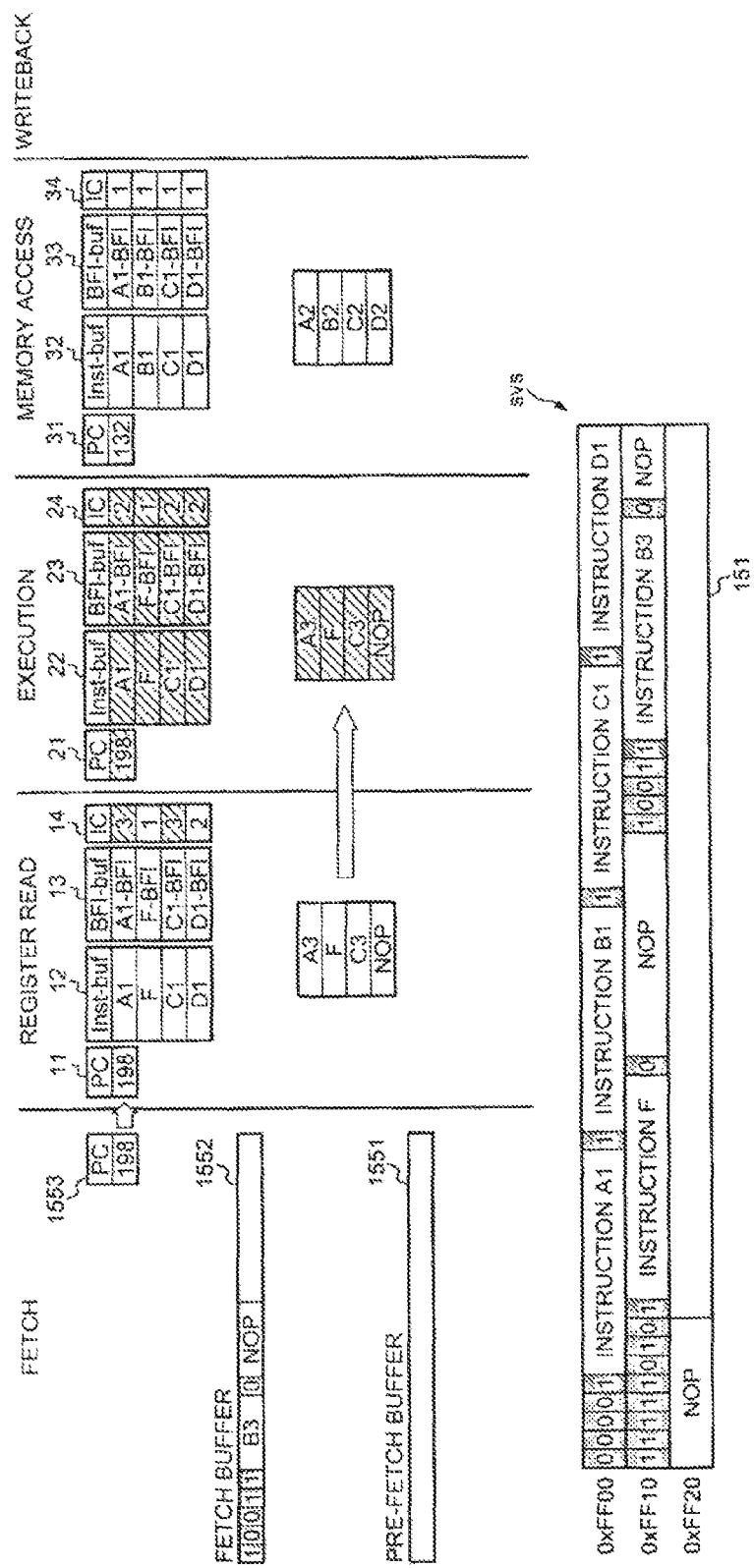

In FIG. 52, the decoder 156 transfers the instruction codes A3, F, C3, NOP and the value of the upper recovery register 1541 to the executing unit 157. The decoder 156, after the transfer, in the upper instruction counter 14, increments by 1, the first and third instruction counter values used in the operand updating. The executing unit 157 updates the intermediate recovery register 1542 to the values of the upper recovery register 1541. By referring to the data register 159 and the data RAM 152, the executing unit 157 executes the instruction codes A3, F, C3, NOP transferred from the decoder 156.

Figure 53:
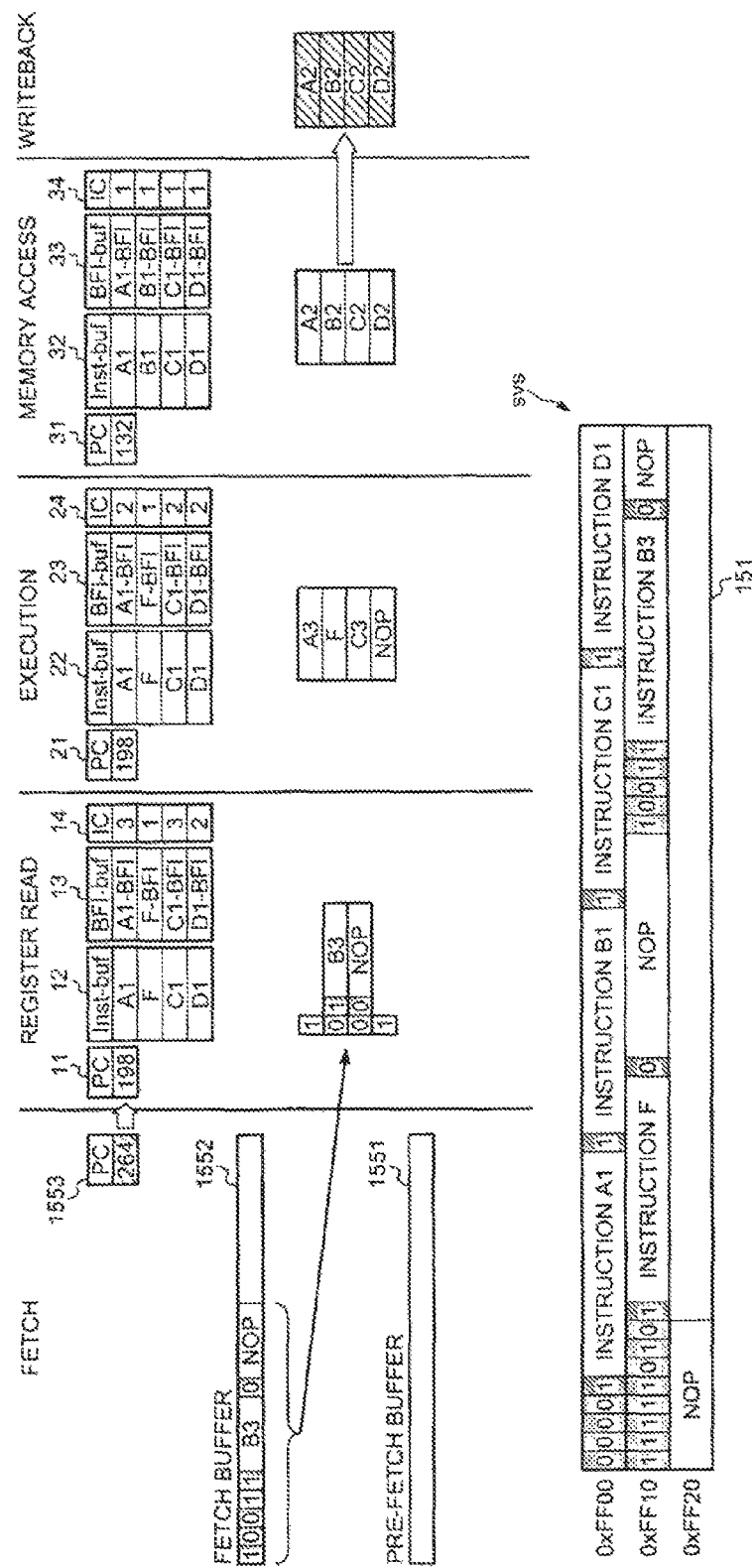

In FIG. 53, the fetch controller 155 determines whether the bit string in the fetch buffer 1552 is a non-compressed instruction group. In the case of this bit string, since the first 4 bits are "1001", the first and the fourth bits of the bit string held in the fetch buffer 1552 are determined to be compressed instructions. The second instruction is a non-compressed instruction concatenated to a bit string "1 B3" that is subsequent to the first 4 bits. The third instruction is a non-compressed instruction concatenated to a bit string "0 NOP" that is subsequent to the first 4 bits.

The fetch controller 155 updates the program counter 1553 by the number of transferred bits. In this case, since the transferred bit string is 66, the value of the program counter 1553 becomes "264". The fetch controller 155 transfers the updated program counter 1553 value "264" to the upper program counter 11 of the decoder 156. At the memory access unit 158, when the instruction codes A2 to D2 are processed, processing (writeback) other than the commit state processing is performed.

Figure 54:
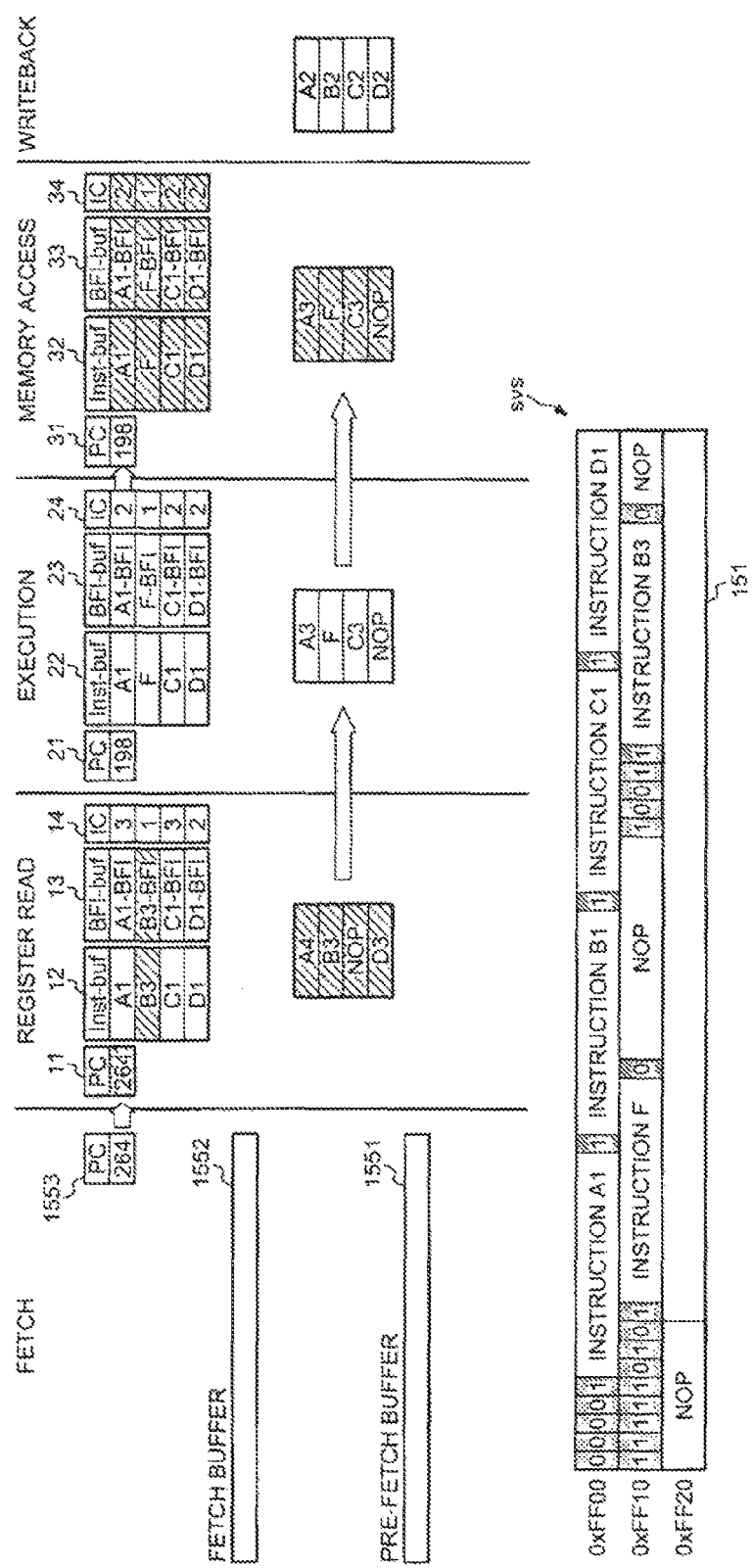

In FIG. 54, the decoder 156, with respect to the first and the fourth compressed instructions, uses the values of the upper instruction buffer 12, the upper BFI register 13, and the upper instruction counter 14 to restore the original instructions A4, D3. With respect to the second and the third instructions, the decoder 156 refers to storage bits. Since the storage bit in the second instruction is "1", the decoder 156 updates the values of the upper instruction buffer 12, the upper BFI register 13, and the upper instruction counter 14.

Further, since the storage bit in the third instruction is "0", the decoder 156 does not update the values of the upper instruction buffer 12, the upper BFI register 13, and the upper instruction counter 14, with respect to the third instruction code NOP.

The executing unit 157 transfers the instruction codes A3, F, C3, NOP and the value of the intermediate recovery register 1542 to the memory access unit 158. The memory access unit 158 updates the lower recovery register 1543 to the value of the intermediate recovery register 1542. The memory access unit 158 accesses the data RAM 152, according to the operation code of the transferred instruction code.

Figure 55:
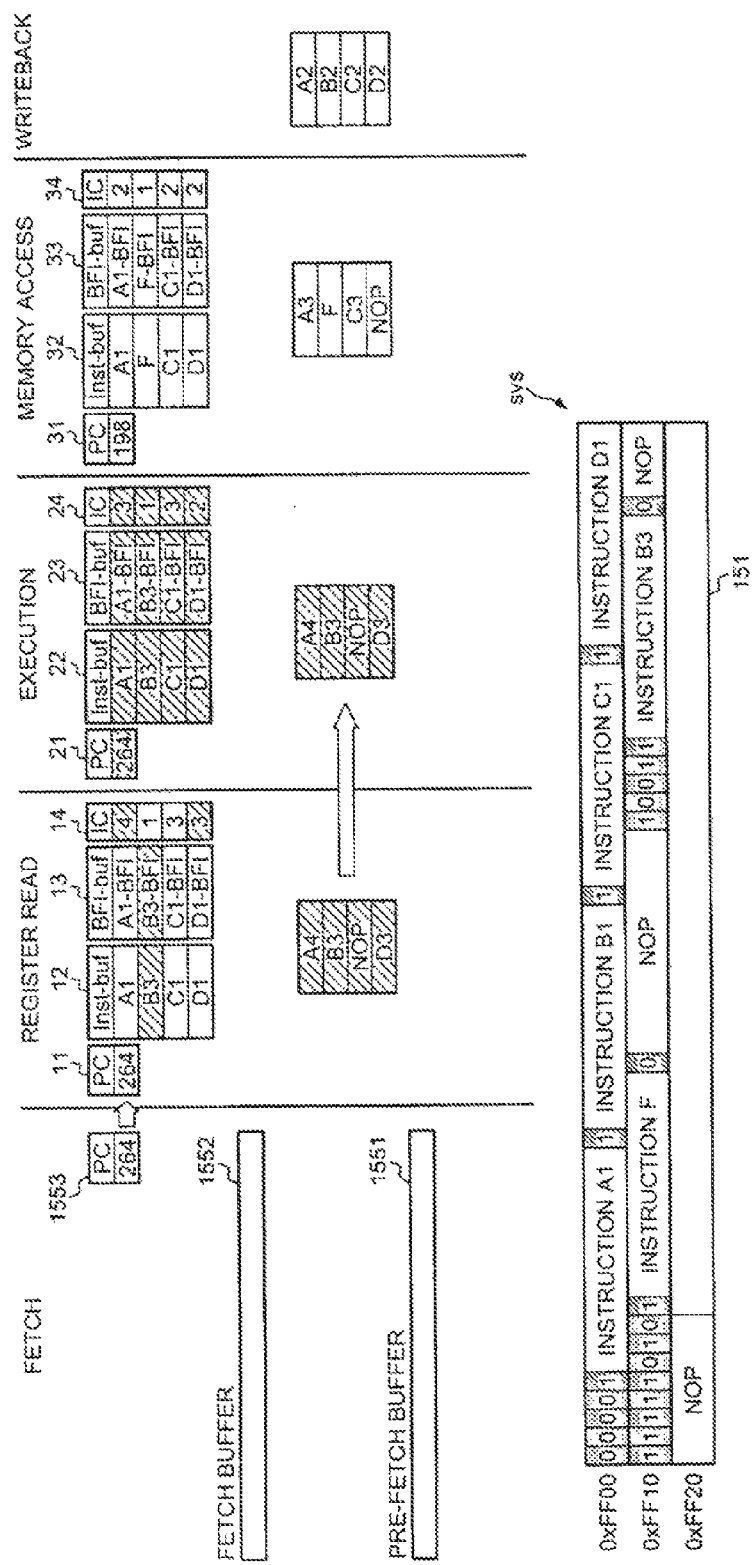

In FIG. 55, the decoder 156 transfers the instruction codes A3, F, C3, NOP and the value of the upper recovery register 1541 to the executing unit 157. The decoder 156, after the transfer, in the upper instruction counter 14, increments by 1, the first and the fourth values corresponding to the compressed instructions. The executing unit 157 updates the intermediate recovery register 1542 to the values of the upper recovery register 1541. By referring to the data register 159 and the data RAM 152, the executing unit 157 executes the instruction codes A3, F, C3, NOP transferred from the decoder 156.

Thus, by pipeline processing a sequence of compressed instruction groups sys, the sequence of compressed instruction groups sys can be restored by the decoder 156. Accordingly, the processor 102 can execute in parallel, a group of instructions that are the same as the sequence of instruction groups before compression. Further, since the sequence of compressed instruction groups sys includes compressed instructions, the number of fetches from the instruction RAM 151 can be reduced. In other words, the number of memory accesses to the instruction RAM 151 can be reduced, thereby enabling reduced power consumption to be facilitated.

Recovery processing from an interrupt occurring during the instruction execution depicted in FIGS. 43 to 55 will be described. When an interrupt occurs, the processor 102 completes commit state transition processing (writeback, . . . ) and then performs interrupt processing. In this case, concerning the commit pre-stage processing, the processor 102 temporarily saves the value of the lower recovery register 1543 and executes the interrupt processing. When the interrupt processing ends, the processor 102 uses the saved value of the lower recovery register 1543 and resumes the commit pre-stage processing. Hereinafter, a case where an interrupt occurs during the processing depicted in FIG. 55 will be described with reference to FIGS. 56 to 64.

FIGS. 56 to 64 are diagrams of an example of recovery processing for recovery from an interrupt. The processor 102, via the interrupt controller 1510, detects the occurrence of an interrupt by a surrounding module or timer and upon doing so, issues via the controller 153, an interrupt signal to the fetch controller 155, the decoder 156, the executing unit 157, and the memory access unit 158.

Figure 56:
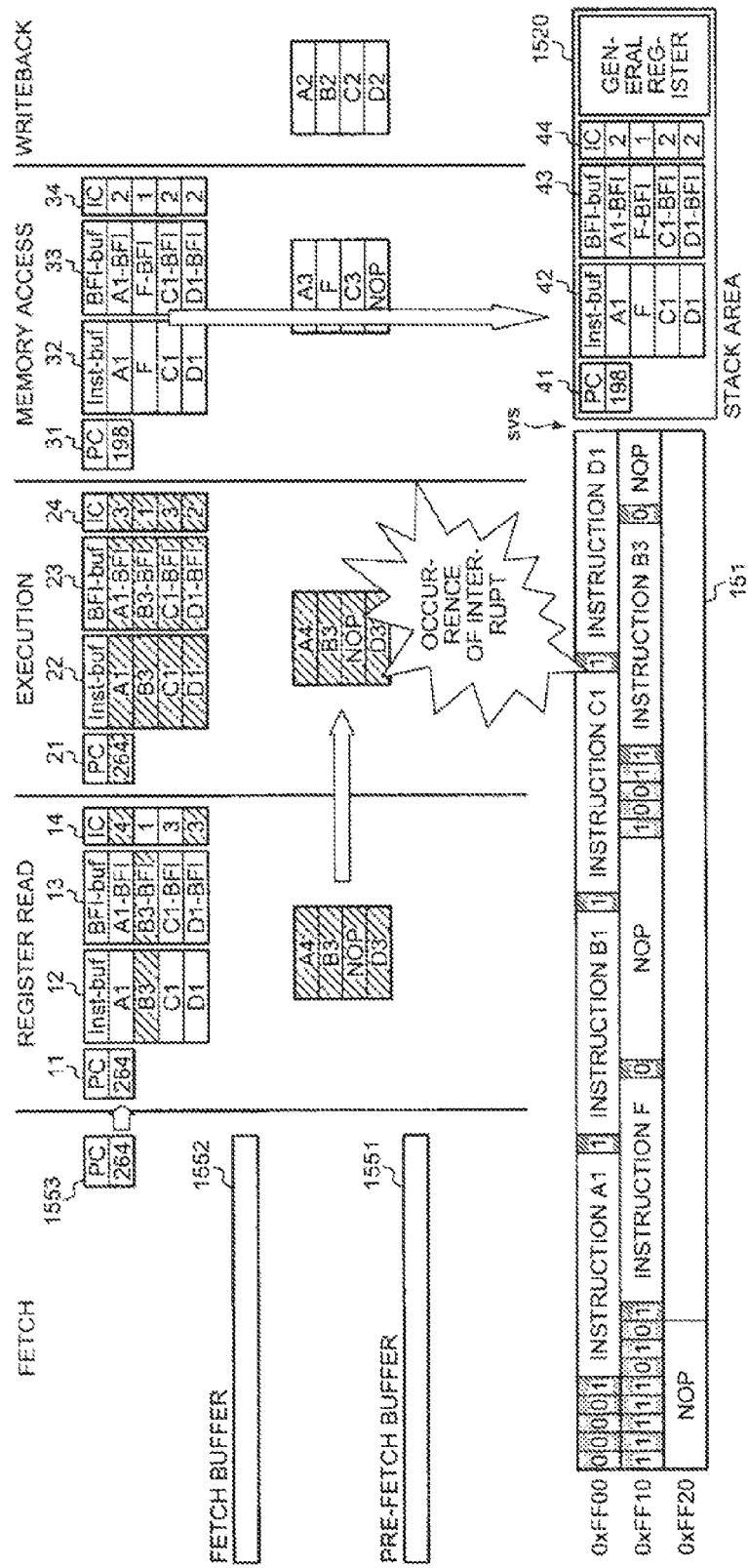

In FIG. 56, the memory access unit 158, upon receiving the interrupt signal, saves the values of the lower recovery register 1543 or the value of a generic register (not depicted) to the stack area 1520 of the data RAM 152.

Figure 57:
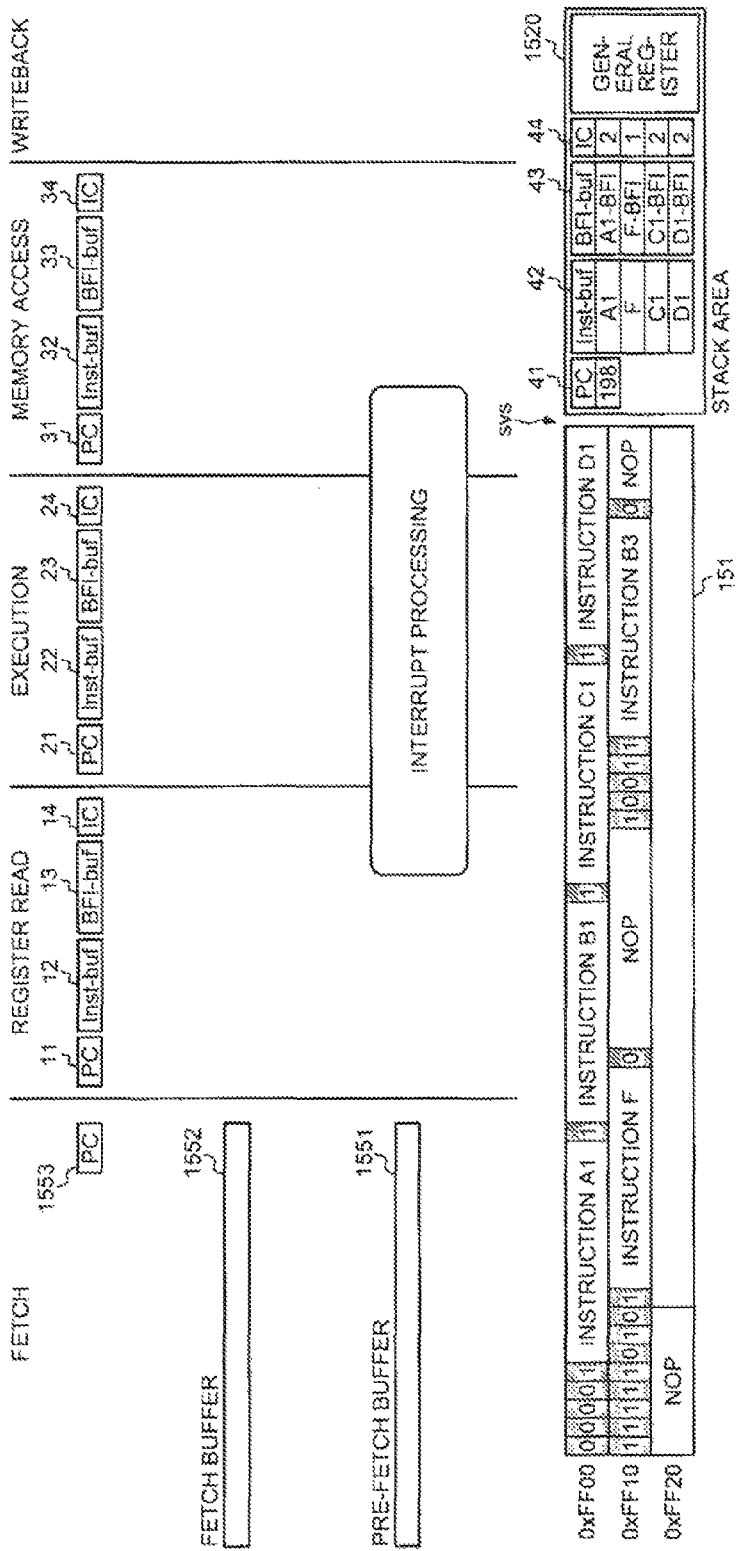

In FIG. 57, the fetch controller 155, upon receiving the interrupt signal, clears the prefetch buffer 1551 and the fetch buffer 1552, and prepares for interrupt processing. Similarly, the decoder 156, the executing unit 157, and the memory access unit 158, upon receiving the interrupt signal, respectively clear the values of the upper recovery register 1541, the intermediate recovery register 1542, and the lower recovery register 1543, and prepare for interrupt processing. The processor 102 executes the interrupt processing.

Figure 58:
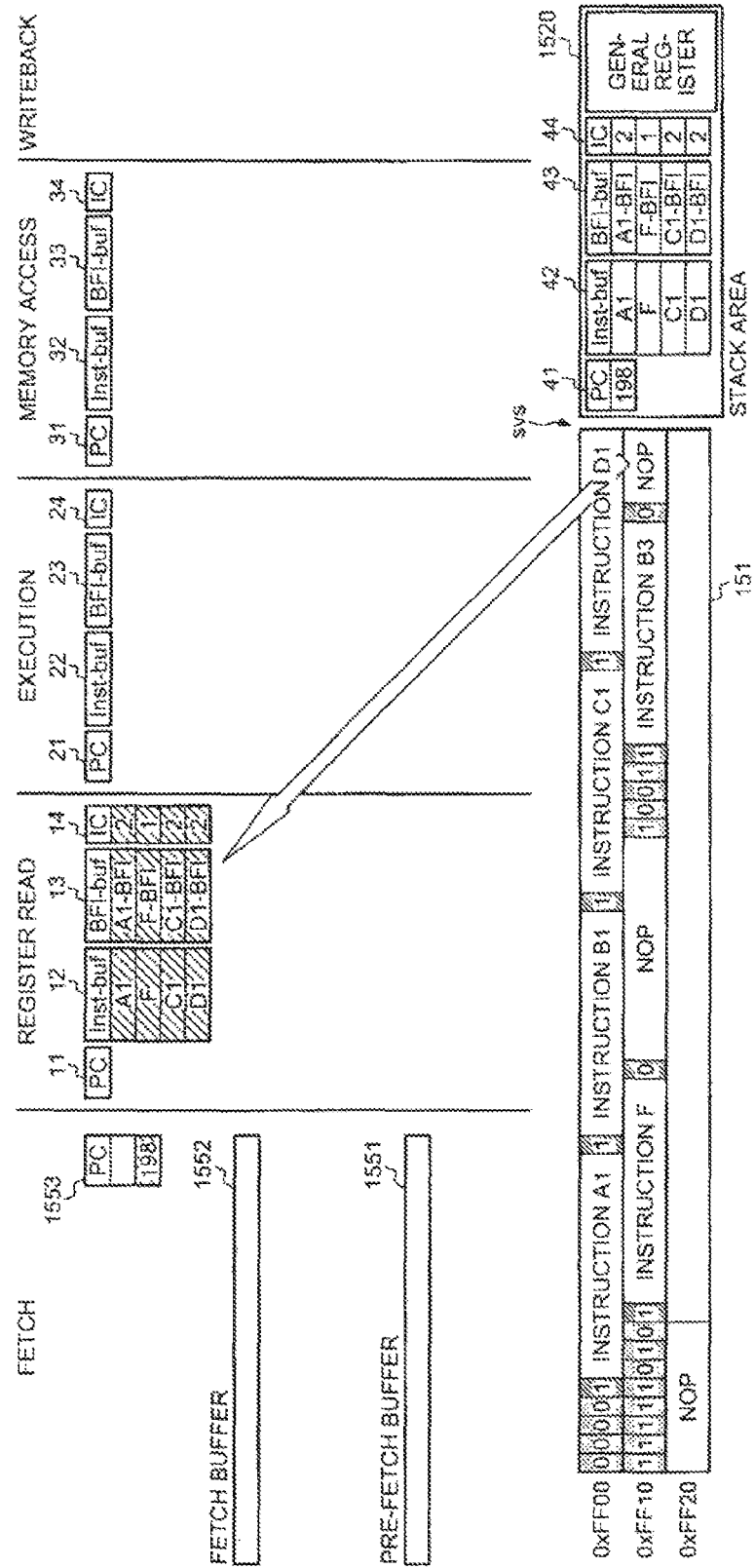

In FIG. 58, the decoder 156, upon receiving the interrupt completion signal through the interrupt controller 1510 and the controller 153, sets the lower instruction buffer 32 values (instruction codes Al, F, C1, D1) saved in the stack area 1520, the lower BFI register 33 values (operand patterns A1-BFI, F-BFI, C1-BFI, D1-BFI), and the lower instruction counter 34 values "2, 1, 2, 2" to the value of the upper instruction buffer 12, the value of the upper BFI register 13, and the value of the upper instruction counter 14. The fetch controller 155 again clears the prefetch buffer 1551 and the fetch buffer 1152, and reads in the lower program counter value "198" saved in the stack area 1520.

Figure 59:
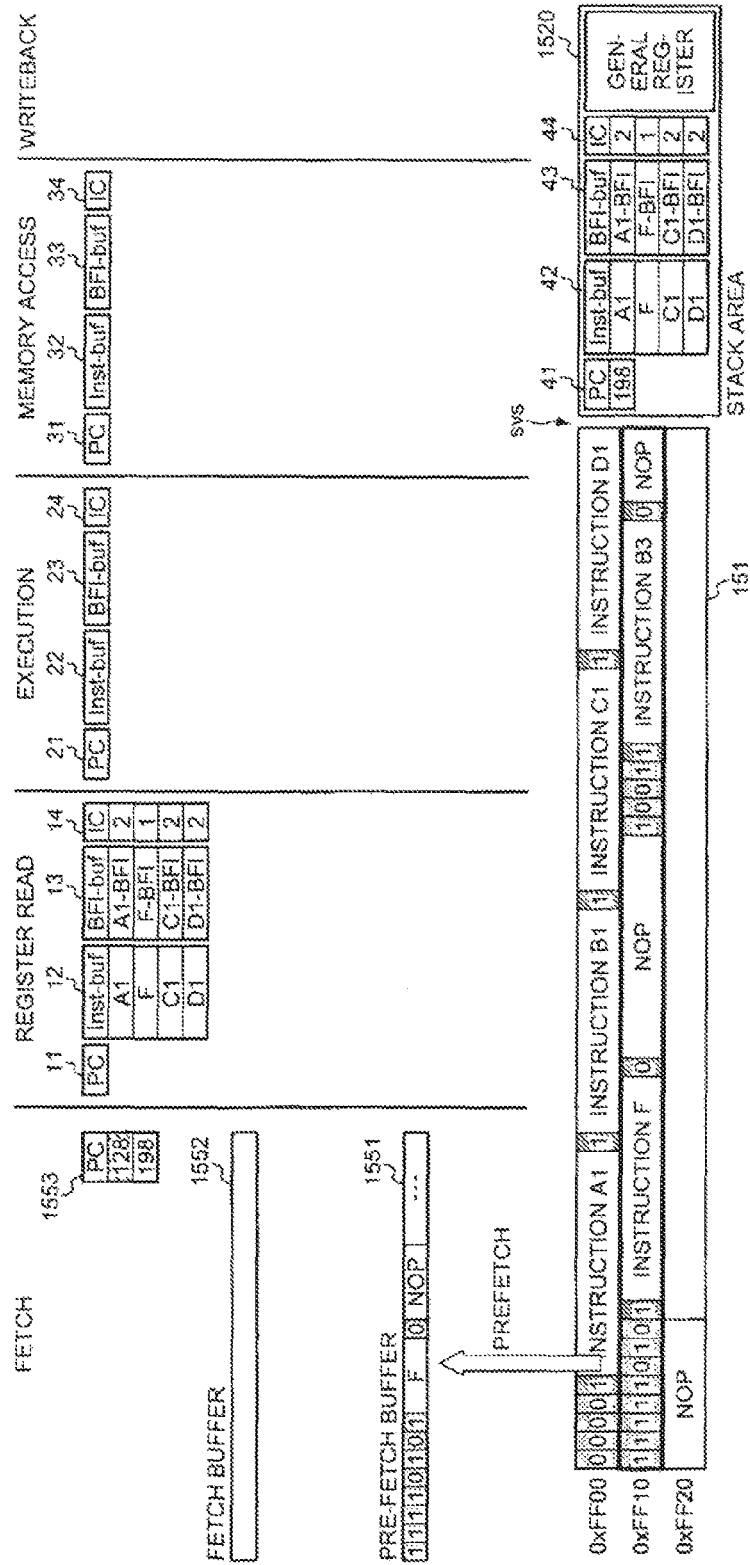

In FIG. 59, the fetch controller 155 divides the lower program counter 31 value "198" read from the stack area 1520, by the bit width (128 bits) of the fetch buffer. In this case, the quotient is "1" with a remainder of "70". The fetch controller 155 multiplies the quotient "1" by the bit width (128 bits) of the fetch buffer and thereby, identifies the bit position to be fetched. In this case, since the quotient "1"×128 bits=128, the bit string from the 128th bit from the head of the sequence of compressed instruction groups, i.e., the bit string of address 0xFF10 of the instruction RAM 151, is prefetched and held in the prefetch buffer 1551. The fetch controller 155 sets the program counter 1553 to "128".

Figure 60:
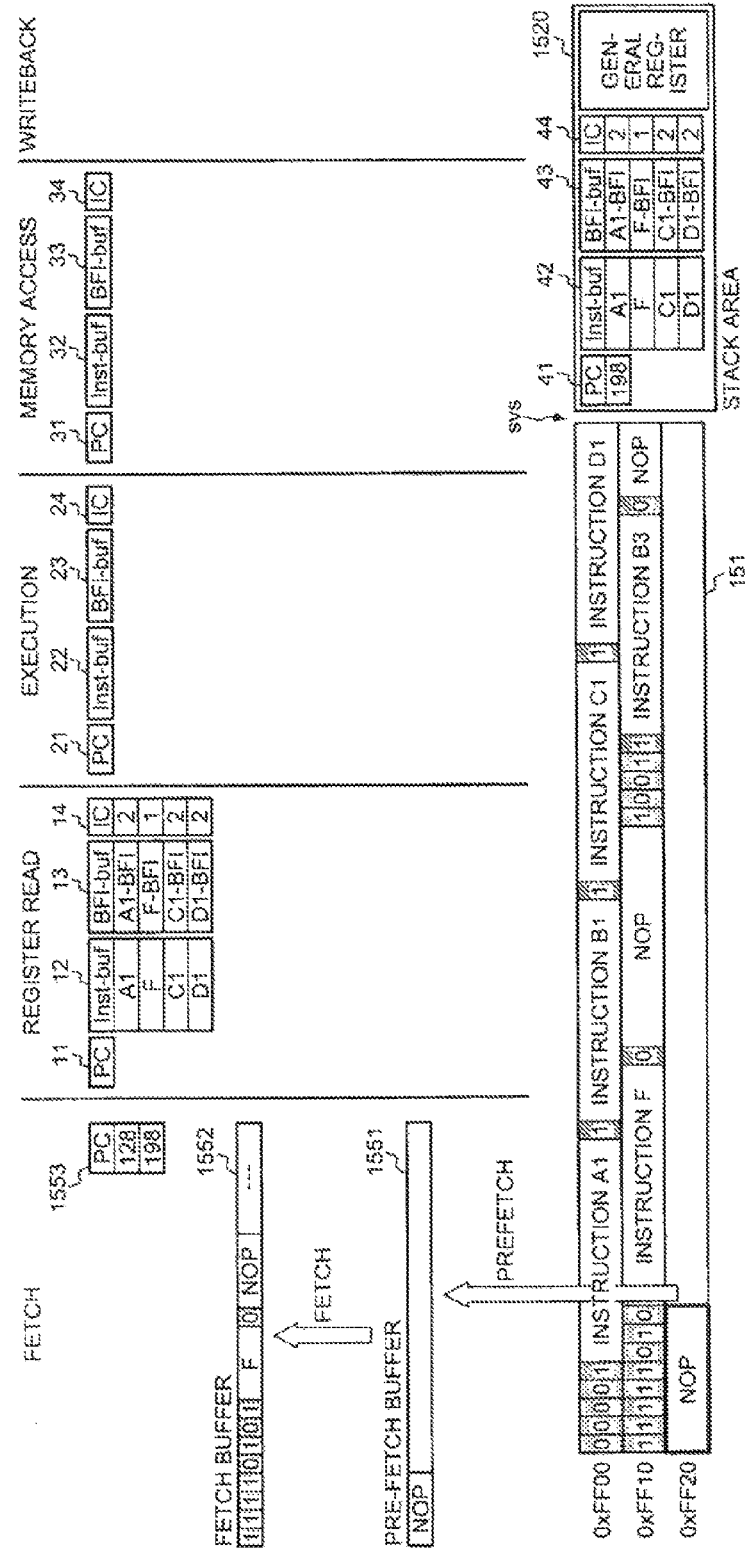

In FIG. 60, the fetch controller 155 fetches and holds in the fetch buffer 1552, the bit string in the prefetch buffer 1551. The fetch controller 155 determines whether the bit string in the fetch buffer 1552 is a non-compressed instruction group. In the case of this bit string, since the first 4 bits are "1111", the first 4 bits are determined to be compressed instruction groups. In this case, the fetch controller 155 transfers the first 4 bits (=1111) in the fetch buffer 1552 to the decoder 156.

The fetch controller 155 updates the program counter 1553 by the number of bits transferred. In this case, since the transferred bit string is 4 bits, the value of the program counter 1553 becomes "132". In this case, since this value and the lower program counter 31 value "198" saved in the stack area 1520 do not coincide, the fetch controller 155 does not transfer the updated program counter value "132" to the upper program counter 11 of the decoder 156.

The decoder 156, despite having received the compressed instruction groups from the fetch buffer 1552, discards the compressed instruction groups since the value of the program counter 1553 is not received. Thus, until the value of the program counter 1553 of the fetch controller 155 and the lower program counter 31 value read from the stack area 1520 coincide, the decoder 156 discards the bit strings from the fetch buffer 1552. As a result, at an errant bit position, the instruction is not restored.

Figure 61:
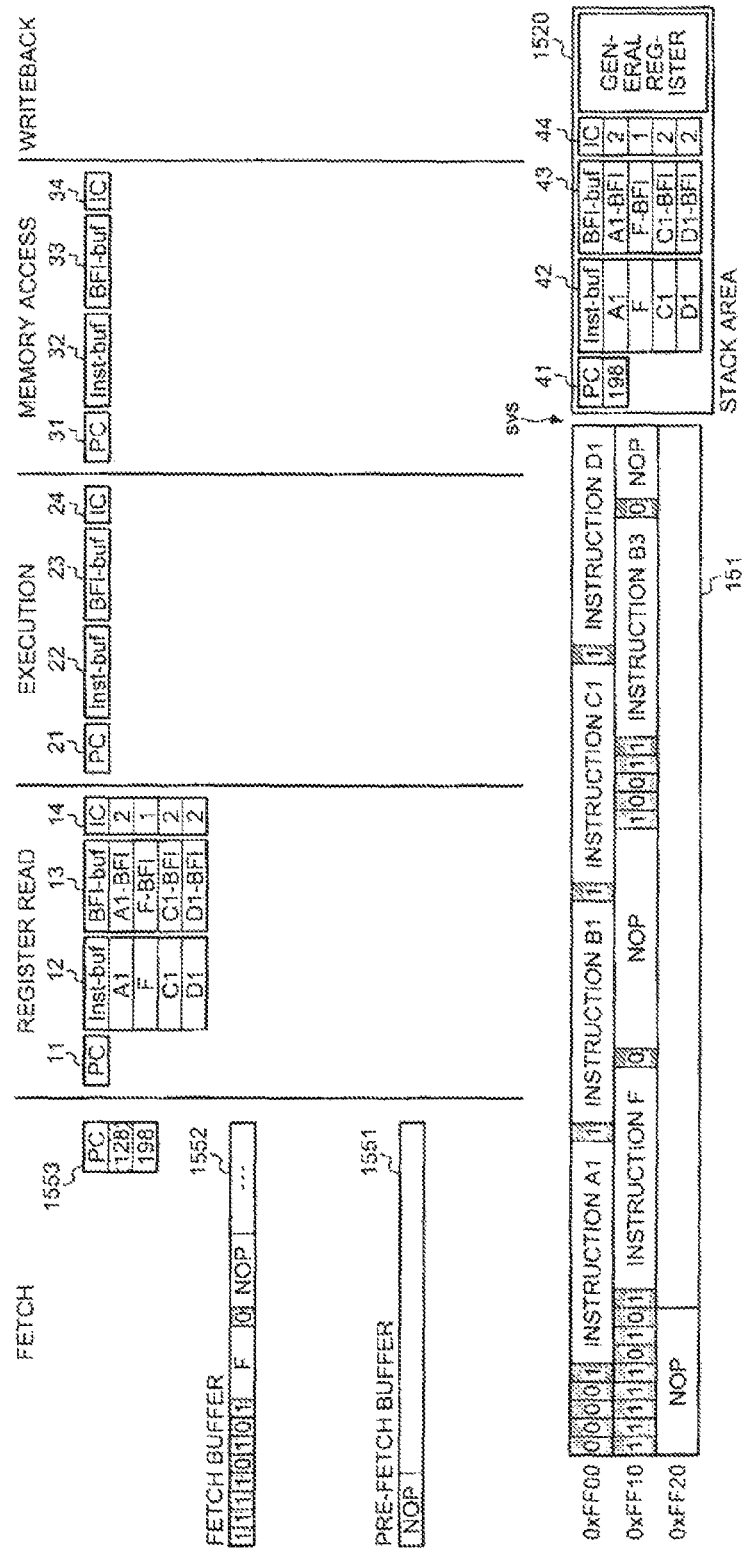
Figure 62:
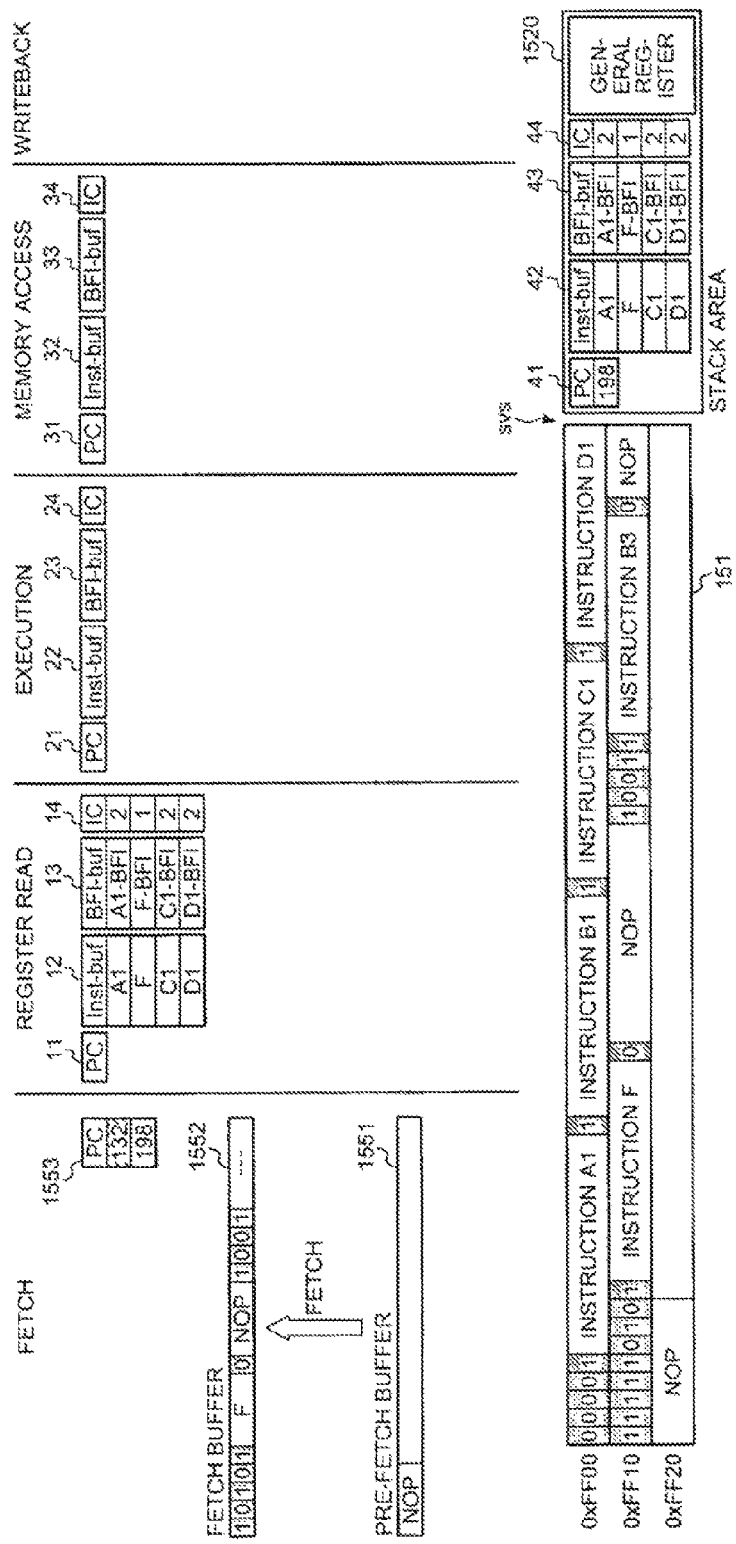

In FIG. 62, since 4 bits were transferred at the processing depicted in FIG. 61, the fetch controller 155 fetches the first 4 bits of the prefetch buffer 1551. Subsequently, the fetch controller 155 determines whether the bit string in the fetch buffer 1552 is a non-compressed instruction. In the case of this bit string, since the first and the third bits are "1", the first and the third bits of the fetched bit string are determined to be compressed instructions.

Figure 63:
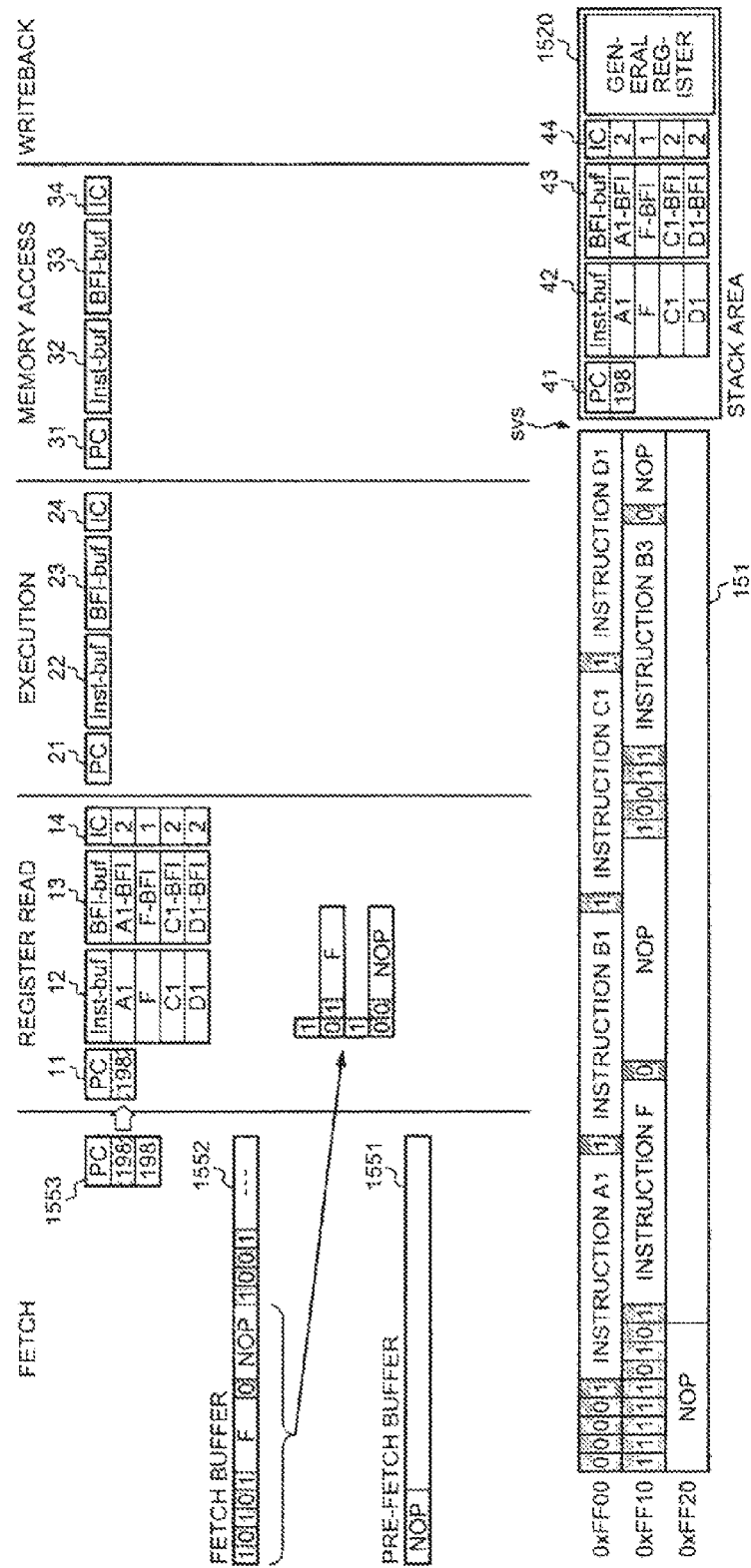

In FIG. 63, the fetch controller 155 transfers the first 66 bits in the fetch buffer 1552 to the decoder 156. The fetch controller 155 updates the program counter 1553 by the number of bits transferred. In this case, since the transferred bit string is 66 bits, the value of the program counter 1553 becomes "198". In this case, since this value and the lower program counter 31 value "198" saved in the stack area 1520 coincide, the fetch controller 155 transfers the updated program counter value "198" to the upper program counter 11 of the decoder 156.

In FIG. 64, the decoder 156, having received the bit string from the fetch buffer 1552 and the program counter 1553 value "198", restores the instructions from the values of the upper recovery register 1541. Thus, the instruction codes A3, C3 that were processed up to the memory access unit 158 at the time of the interrupt are restored. The processing hereinafter is executed similarly to that depicted in FIGS. 51 to 55. Thus, at the proper recovery position, the instruction can be restored.

In this manner, according to the second embodiment, since an instruction sequence/a sequence of instruction groups that include compressed instructions can be restored while being executed, the number of fetches from the instruction RAM 151 can be reduced. The number of fetches from the instruction RAM 151 becomes shorter than the original instruction sequence/sequence of instruction groups, the higher the instruction compression efficiency, i.e., the greater the number of compressed instructions is. For example, in the case of the third embodiment, since a maximum of 32 compressed instructions can be acquired by 1 fetching and consequently, 32×32 non-compressed instructions (1024 bits) are fetched by 1 memory access.

Further, in the case of the fourth embodiment, since a maximum of 32 compressed instruction groups can be acquired by 1 fetching, 32×32 non-compressed instruction groups (1024 bits) are fetched by 1 memory access. Therefore, since the number of accesses to the instruction RAM 151 decreases, reduced power consumption is enabled.

Further, when transitioning to the subsequent stage at each stage of commit pre-stage, the processor 102 also passes, by pipeline processing, the recovery register values to the subsequent stage. Consequently, even if an interrupt occurs during execution, by saving the value of the recovery register at the memory access of the last stage of commit pre-stage, recovery can be performed using the saved recovery register value, after the completion of the interrupt.

Thus, even if an instruction sequence/a sequence of instruction groups that are to be executed are also compressed, by indicating the instruction that is before transition to the commit state and re-executing from an instruction fetch, the state before the interrupt can be recovered.

Further, according to second embodiment, when a compressed instruction is restored, since restoration is performed within the processor 102 and without access to an external memory such as a dictionary memory, excessive memory accesses become unnecessary and there is no increase in the number of memory accesses. Therefore, reduced power consumption can be facilitated. Further, when the same operation code occurs successively, since coding in which register numbers and/or memory addresses (which are operands) consecutively numbered is used, when a programmer creates instruction code, by varying the operands in a consistent manner when the same operation code occurs successively, reduced power consumption at the time of instruction compression and execution can be facilitated.

In the second embodiment, although the restoration of instruction code was described to be performed at a register read stage by the decoder 156, the restoration at register read may be performed at a fetch stage. In this case, the upper recovery register 154 and the operand updater 1600 are included in the fetch controller 155; and the data holding and reading performed with respect to the upper recovery register 154 at the register read stage in the operand updating processing by the operand updater 1600 is executed by the fetch controller 155. Further, in this case, the decoder 156 performs typical decoder processing and reading from data registers.

As described, the processor 102 according to the embodiments reduces the number of memory accesses by collectively fetching a sequence of compressed instructions in a memory. Further, the compression apparatus, the compression method, and the computer product improve the efficiency at which an instruction code group is compressed consequent to a reduction in the number of memory accesses by the processor 102.

The compression method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor having access to a memory storing a compressed instruction sequence that includes compression information indicating that an instruction having operation code identical to that of the preceding instruction and having operand continuity with the preceding instruction has been compressed, the processor comprising:
- a fetcher that fetches a given bit string from the memory and determines whether the given bit string is a non-compressed instruction, where upon determining the given bit string to be a non-compressed instruction, further transfers the given bit string and upon determining the given bit string to not be a non-compressed instruction, further transfers the compression information located at the head of the given bit string;
- a decoder that upon receiving the non-compressed instruction transferred from the fetcher, holds in a buffer, instruction code and an operand pattern of the non-compressed instruction and executes setting processing of setting a value of an instruction counter to an initial value, the value of the instruction counter indicating a consecutive count of consecutive instructions having identical operation codes and operands with regularity, and upon receiving the compression information transferred from the fetcher, restores the instruction code based on the instruction code held in the buffer, the value of the instruction counter, and the operand pattern;
- an executor that executes the instruction code from the decoder; and
- a memory accessor that accesses the memory according to an execution result obtained by the executor, wherein:
  - the fetcher updates the value of a program counter by the number of bits transferred to the decoder and transfers the updated value of the program counter to the decoder,
  - the decoder, upon receiving the transferred compression information and before updating the value of the instruction counter by the updating processing, copies to a buffer in the executor, the instruction code held in the buffer, the operand pattern, the value of the instruction counter, and the value of the program counter from the fetcher, and
  - the executor, prior to copying by the decoder, copies to a buffer in the memory accessor, the instruction code, the operand pattern, the value of the instruction counter, and the value of the program counter in the buffer of the executor.

2. The processor according to claim 1, wherein the decoder, in the updating processing, based on the operand pattern, extracts an operand from the instruction code held in the buffer and by updating the extracted operand by the value of the instruction counter, restores the instruction code.

3. The processor according to claim 1, wherein:
- the memory accessor, when an interrupt occurs, saves the instruction code, the operand pattern, the value of the instruction counter, and the value of the program counter copied to the buffer of the memory accessor,
- the fetcher, when processing for the interrupt has been completed, fetches based on the saved value of the program counter, a bit string that corresponds to an instruction that was subject to processing at the memory accessor when the interrupt occurred, and determines whether the fetched bit string is a non-compressed instruction, where upon determining the fetched bit string to be a non-compressed instruction, further transfers the fetched bit string and upon determining the fetched bit string to not be a non-compressed instruction, further transfers the compression information located at the head of the fetched bit string, and
- the decoder, when the processing for the interrupt has been completed, copies to the buffer of the decoder, the saved instruction code, operand pattern, and the value of the instruction counter.

4. A non-transitory computer-readable medium storing therein a compression program that causes a processor to execute a process, the processor including a fetcher, a decoder, an executor, and a memory accessor, the process comprising:
- fetching, by the fetcher, a given bit string from a compressed instruction sequence that includes compression information indicating that an instruction having operation code identical to that of the preceding instruction and having operand continuity with the preceding instruction has been compressed;
- determining, by the fetcher, whether the given bit string is a non-compressed instruction, where upon determining the given bit string to be a non-compressed instruction, further transferring the given bit string to the decoder and upon determining the given bit string to not be a non-compressed instruction, further transferring the compression information located at the head of the given bit string to the decoder;
- upon receiving the transferred non-compressed instruction, holding, by the decoder, instruction code and an operand pattern of the non-compressed instruction in a buffer and executing setting processing of setting a value of an instruction counter to an initial value, the value of the instruction counter indicating a consecutive count of consecutive instructions having identical operation codes and operands with regularity, and upon receiving the transferred compression information, restoring the instruction code based on the instruction code held in the buffer, the value of the instruction counter, and the operand pattern;
- executing, by the executor, the instruction code from the decoder; and
- accessing, by the memory accessor, the compressed instruction sequence according to an execution result obtained by the executor, wherein:
  - the fetcher updates the value of a program counter by the number of bits transferred to the decoder and transfers the updated value of the program counter to the decoder;
  - the decoder, upon receiving the transferred compression information and before updating the value of the instruction counter by the updating processing, copies to a buffer in the executor, the instruction code held in the buffer, the operand pattern, the value of the instruction counter, and the value of the program counter from the fetcher, and
  - the executor, prior to copying by the decoder, copies to a buffer in the memory accessor, the instruction code, the operand pattern, the value of the instruction counter, and the value of the program counter in the buffer of the executor.

5. The non-transitory computer-readable medium according to claim 4, wherein:
- the decoder, in the updating processing, based on the operand pattern, extracts an operand from the instruction code held in the buffer and by updating the extracted operand by the value of the instruction counter, restores the instruction code.

6. The non-transitory computer-readable medium according to claim 4, wherein:
- the memory accessor, when an interrupt occurs, saves the instruction code, the operand pattern, the value of the instruction counter, and the value of the program counter copied to the buffer of the memory accessor, the fetcher, when processing for the interrupt has been completed, fetches based on the saved value of the program counter, a bit string that corresponds to an instruction that was subject to processing at the memory accessor when the interrupt occurred, and determines whether the fetched bit string is a non-compressed instruction, where upon determining the fetched bit string to be a non-compressed instruction, further transfers the fetched bit string and upon determining the fetched bit string to not be a non-compressed instruction, further transfers the compression information located at the head of the fetched bit string, and the decoder, when the processing for the interrupt has been completed, copies to the buffer of the decoder, the saved instruction code, operand pattern, and the value of the instruction counter.

7. A compression apparatus, comprising:

a memory storing a compressed instruction sequence that includes compression information indicating that an instruction having operation code identical to that of the preceding instruction and having operand continuity with the preceding instruction has been compressed; and a processor having access to the memory, the processor comprising:

a fetcher that fetches a given bit string from the memory and determines whether the given bit string is a non-compressed instruction, where upon determining the given bit string to be a non-compressed instruction, further transfers the given bit string and upon determining the given bit string to not be a non-compressed instruction, further transfers the compression information located at the head of the given bit string;

a decoder that upon receiving the non-compressed instruction transferred from the fetcher, holds in a buffer, instruction code and an operand pattern of the non-compressed instruction and executes setting processing of setting a value of an instruction counter to an initial value, the value of the instruction counter indicating a consecutive count of consecutive instructions having identical operation codes and operands with regularity, and upon receiving the compression information transferred from the fetcher, restores the instruction code based on the instruction code held in the buffer, the value of the instruction counter, and the operand pattern;

an executor that executes the instruction code from the decoder; and a memory accessor that accesses the memory according to an execution result obtained by the executor, wherein:

the fetcher updates the value of a program counter by the number of bits transferred to the decoder and transfers the updated value of the program counter to the decoder, the decoder, upon receiving the transferred compression information and before updating the value of the instruction counter by the updating processing, copies to a buffer in the executor, the instruction code held in the buffer, the operand pattern, the value of the instruction counter, and the value of the program counter from the fetcher, and the executor, prior to copying by the decoder, copies to a buffer in the memory accessor, the instruction code, the operand pattern, the value of the instruction counter, and the value of the program counter in the buffer of the executor.

8. The compression apparatus according to claim 7, wherein:

the decoder, in the updating processing, based on the operand pattern, extracts an operand from the instruction code held in the buffer and by updating the extracted operand by the value of the instruction counter, restores the instruction code.

9. The compression apparatus according to claim 7, wherein:

the memory accessor, when an interrupt occurs, saves the instruction code, the operand pattern, the value of the instruction counter, and the value of the program counter copied to the buffer of the memory accessor, the fetcher, when processing for the interrupt has been completed, fetches based on the saved value of the program counter, a bit string that corresponds to an instruction that was subject to processing at the memory accessor when the interrupt occurred, and determines whether the fetched bit string is a non-compressed instruction, where upon determining the fetched bit string to be a non-compressed instruction, further transfers the fetched bit string and upon determining the fetched bit string to not be a non-compressed instruction, further transfers the compression information located at the head of the fetched bit string, and the decoder, when the processing for the interrupt has been completed, copies to the buffer of the decoder, the saved instruction code, operand pattern, and the value of the instruction counter.

10. A compression method executed by a processor, the processor having access to a memory storing a compressed instruction sequence that includes compression information indicating that an instruction having operation code identical to that of the preceding instruction and having operand continuity with the preceding instruction has been compressed, the compression method comprising:

fetching, by a fetcher, a given bit string from the memory and determining whether the given bit string is a non-compressed instruction, where upon determining the given bit string to be a non-compressed instruction, further transferring the given bit string to a decoder and upon determining the given bit string to not be a non-compressed instruction, further transferring the compression information located at the head of the given bit string to the decoder;

upon receiving the non-compressed instruction transferred from the fetcher, holding, by the decoder, instruction code and an operand pattern of the non-compressed instruction in a buffer and executing setting processing of setting a value of an instruction counter to an initial value, the value of the instruction counter indicating a consecutive count of consecutive instructions having identical operation codes and operands with regularity, and upon receiving the compression information transferred from the fetcher, restoring the instruction code based on the instruction code held in the buffer, the value of the instruction counter, and the operand pattern;

executing, by an executor, the instruction code from the decoder; and accessing, by a memory accessor, the memory according to an execution result obtained by the executor, wherein:
the fetcher updates the value of a program counter by the number of bits transferred to the decoder and transfers the updated value of the program counter to the decoder,
the decoder, upon receiving the transferred compression information and before updating the value of the instruction counter by the updating processing, copies to a buffer in the executor, the instruction code held in the buffer, the operand pattern, the value of the instruction counter, and the value of the program counter from the fetcher, and
the executor, prior to copying by the decoder, copies to a buffer in the memory accessor, the instruction code, the operand pattern, the value of the instruction counter, and the value of the program counter in the buffer of the executor.

11. The compression method according to claim 10, wherein:
the decoder, in the updating processing, based on the operand pattern, extracts an operand from the instruction code held in the buffer and by updating the extracted operand by the value of the instruction counter, restores the instruction code.

12. The compression method according to claim 10, wherein:
the memory accessor, when an interrupt occurs, saves the instruction code, the operand pattern, the value of the instruction counter, and the value of the program counter copied to the buffer of the memory accessor,
the fetcher, when processing for the interrupt has been completed, fetches based on the saved value of the program counter, a bit string that corresponds to an instruction that was subject to processing at the memory accessor when the interrupt occurred, and determines whether the fetched bit string is a non-compressed instruction, where upon determining the fetched bit string to be a non-compressed instruction, further transfers the fetched bit string and upon determining the fetched bit string to not be a non-compressed instruction, further transfers the compression information located at the head of the fetched bit string, and
the decoder, when the processing for the interrupt has been completed, copies to the buffer of the decoder, the saved instruction code, operand pattern, and the value of the instruction counter.

* * * * *